United States Patent
Ohkawa et al.

(10) Patent No.: US 6,728,015 B2
(45) Date of Patent: *Apr. 27, 2004

(54) BAR CODE READER

(75) Inventors: Masanori Ohkawa, Kawasaki (JP);
Toshiyuki Ichikawa, Kawasaki (JP);
Hiroshi Watanuki, Kawasaki (JP);
Kozo Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/265,403

(22) Filed: Oct. 7, 2002

(65) Prior Publication Data

US 2003/0090805 A1 May 15, 2003

Related U.S. Application Data

(60) Continuation of application No. 09/025,631, filed on Feb. 18, 1998, now Pat. No. 6,462,880, which is a division of application No. 08/766,627, filed on Dec. 13, 1996, now Pat. No. 5,936,218.

(30) Foreign Application Priority Data

Dec. 14, 1995 (JP) .............................................. 7-325475

(51) Int. Cl.⁷ .......................... G02B 26/08; G06K 7/10
(52) U.S. Cl. ................... 359/216; 359/204; 235/462.39
(58) Field of Search ................................ 359/216–219, 359/205, 204; 250/234–236; 235/462.01, 462.17, 462.32, 462.33, 462.36, 462.38, 462.39

(56) References Cited

U.S. PATENT DOCUMENTS

| | | |
|---|---|---|
| 3,225,177 A | 12/1965 | Stites et al. |
| 3,622,758 A | 11/1971 | Schanne |
| 3,705,755 A | 12/1972 | Baer |

(List continued on next page.)

FOREIGN PATENT DOCUMENTS

| | | |
|---|---|---|
| DE | 27 57 235 | 7/1979 |
| DE | 36 09 669 | 10/1986 |
| EP | 0 040 973 | 12/1981 |
| EP | 0 273 554 | 7/1988 |
| JP | 60-238811 | 11/1985 |
| JP | 61-233876 | 10/1986 |
| JP | 01-228075 | 9/1989 |
| JP | 02-053194 | 2/1990 |

*Primary Examiner*—James Phan
(74) *Attorney, Agent, or Firm*—Staas & Halsey LLP

(57) ABSTRACT

A bar code reader having two reading windows, i.e., a bottom window and a side window. An increased number of scanning lines are used for constituting scanning patterns for scanning bar codes, and the arrangement of the optical system is contrived to decrease the whole size of the bar code reader and, particularly, to decrease the depth of the bar code reader. A source of laser light, a splitter for splitting the laser beam emitted from the laser light source into two, a reflection mirror for transmitting one beam from the splitter to a polygon mirror, the polygon mirror which rotates to scan the incident laser beam, a mirror system for emitting the beam reflected by the polygon mirror through the reading window, and a focusing member for focusing the beam reflected by the bar code onto a detector that detects the beam reflected by the bar code, are arranged on the same line in the bar code reader. By using a concave mirror, furthermore, the beam reflected by the bar code is folded back to one detector. The light-receiving surface of another detector is faced downward to receive the beam reflected by the bar code through Fresnel lens and mirror, thereby to decrease the depth of the bar code reader. Furthermore, the beam passage from the reflection mirror goes through the lower surface of the polygon mirror intersecting the axis of rotation of the polygon mirror.

1 Claim, 50 Drawing Sheets

U.S. PATENT DOCUMENTS

| | | |
|---|---|---|
| 3,728,677 A | 4/1973 | Munson |
| 3,812,325 A | 5/1974 | Schmidt |
| 3,818,444 A | 6/1974 | Connell |
| 3,916,158 A | 10/1975 | Sansone et al. |
| 3,947,816 A | 3/1976 | Rabedeau |
| 3,958,104 A | 5/1976 | Zuckerman |
| 4,224,509 A | 9/1980 | Cheng |
| 4,564,853 A | 1/1986 | Egan |
| 4,587,407 A | 5/1986 | Ahmed et al. |
| 4,652,732 A | 3/1987 | Nickl |
| 4,679,184 A | 7/1987 | Yoshida et al. |
| 4,681,394 A | 7/1987 | Noguchi |
| 4,686,678 A | 8/1987 | Ohta et al. |
| 4,786,798 A | 11/1988 | Lonsdale |
| 4,795,224 A | 1/1989 | Goto |
| 4,797,866 A | 1/1989 | Yoshikawa |
| 4,927,247 A | 5/1990 | Tanaka et al. |
| 4,982,205 A | 1/1991 | Hasegawa |
| 5,000,529 A | 3/1991 | Katoh et al. |
| 5,009,472 A | 4/1991 | Morimoto |
| 5,028,103 A | 7/1991 | Fukasawa et al. |
| 5,042,619 A | 8/1991 | Kohno |
| 5,054,866 A | 10/1991 | Tomita et al. |
| 5,073,702 A | 12/1991 | Schuhmacher |
| 5,177,345 A | 1/1993 | Baitz |
| 5,206,491 A | 4/1993 | Katoh et al. |
| 5,212,710 A | 5/1993 | Kaneda et al. |
| 5,229,588 A | 7/1993 | Detwiler et al. |
| 5,245,170 A | 9/1993 | Aritake et al. |
| 5,251,060 A | 10/1993 | Uenishi et al. |
| 5,252,814 A | 10/1993 | Tooley |
| 5,343,332 A | 8/1994 | Oono et al. |
| 5,359,588 A | 10/1994 | Fujita et al. |
| 5,373,492 A | 12/1994 | Miyamoto et al. |
| 5,459,308 A | 10/1995 | Detwiler et al. |
| 5,479,011 A | 12/1995 | Rudeen et al. |
| 5,491,328 A | 2/1996 | Rando |
| 5,572,367 A | 11/1996 | Jung et al. |
| 5,636,049 A | 6/1997 | Kawata et al. |
| 5,663,980 A | 9/1997 | Adachi |
| 5,684,289 A | 11/1997 | Detwiler et al. |
| 5,693,930 A | 12/1997 | Katoh et al. |
| 5,696,617 A | 12/1997 | Ohkawa et al. |
| 5,705,802 A | 1/1998 | Bobba et al. |
| 5,844,707 A | 12/1998 | Minakuchi et al. |
| 5,917,660 A | 6/1999 | Ohtaki |
| 5,936,218 A * | 8/1999 | Ohkawa et al. ........ 235/162.39 |

* cited by examiner

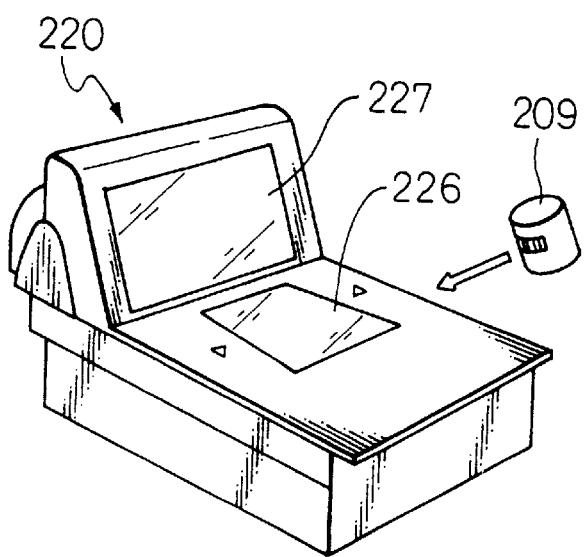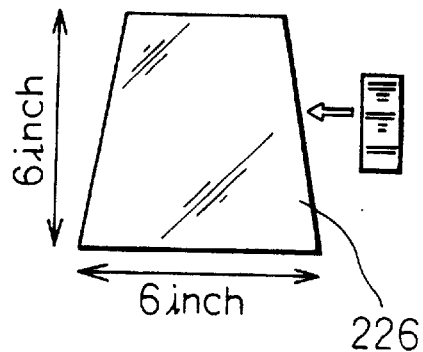

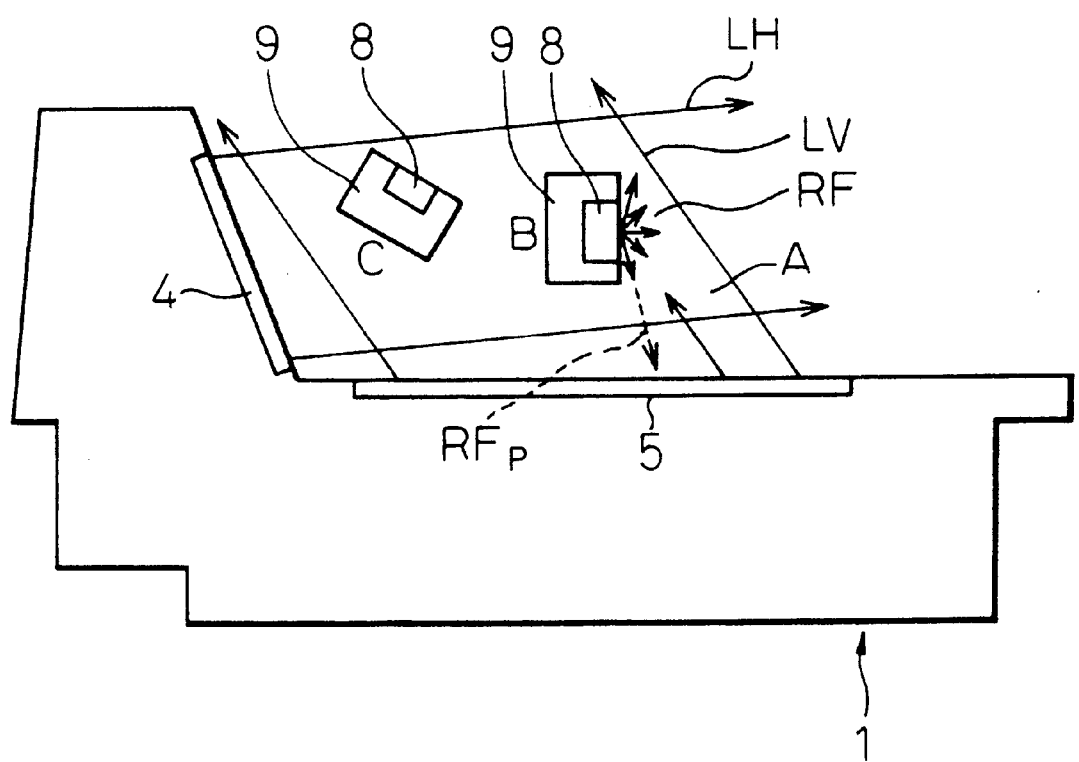

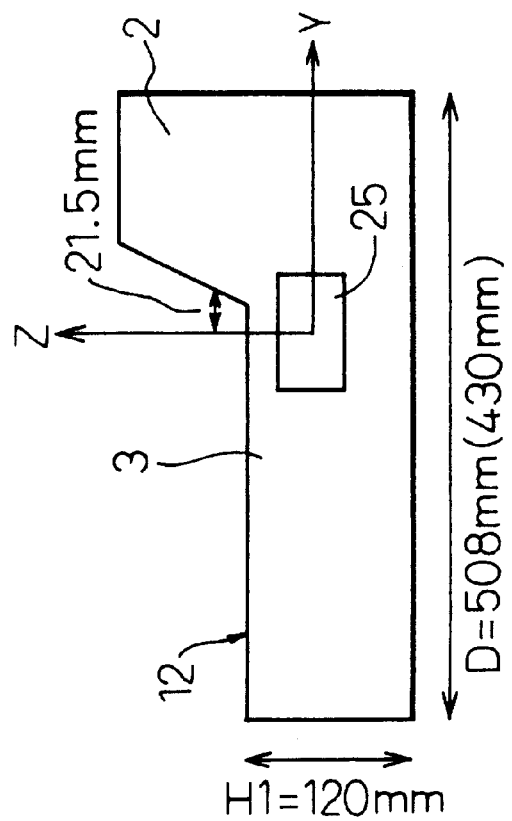
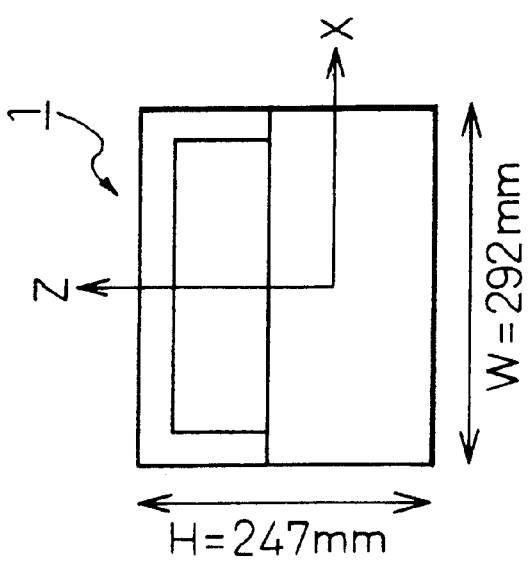

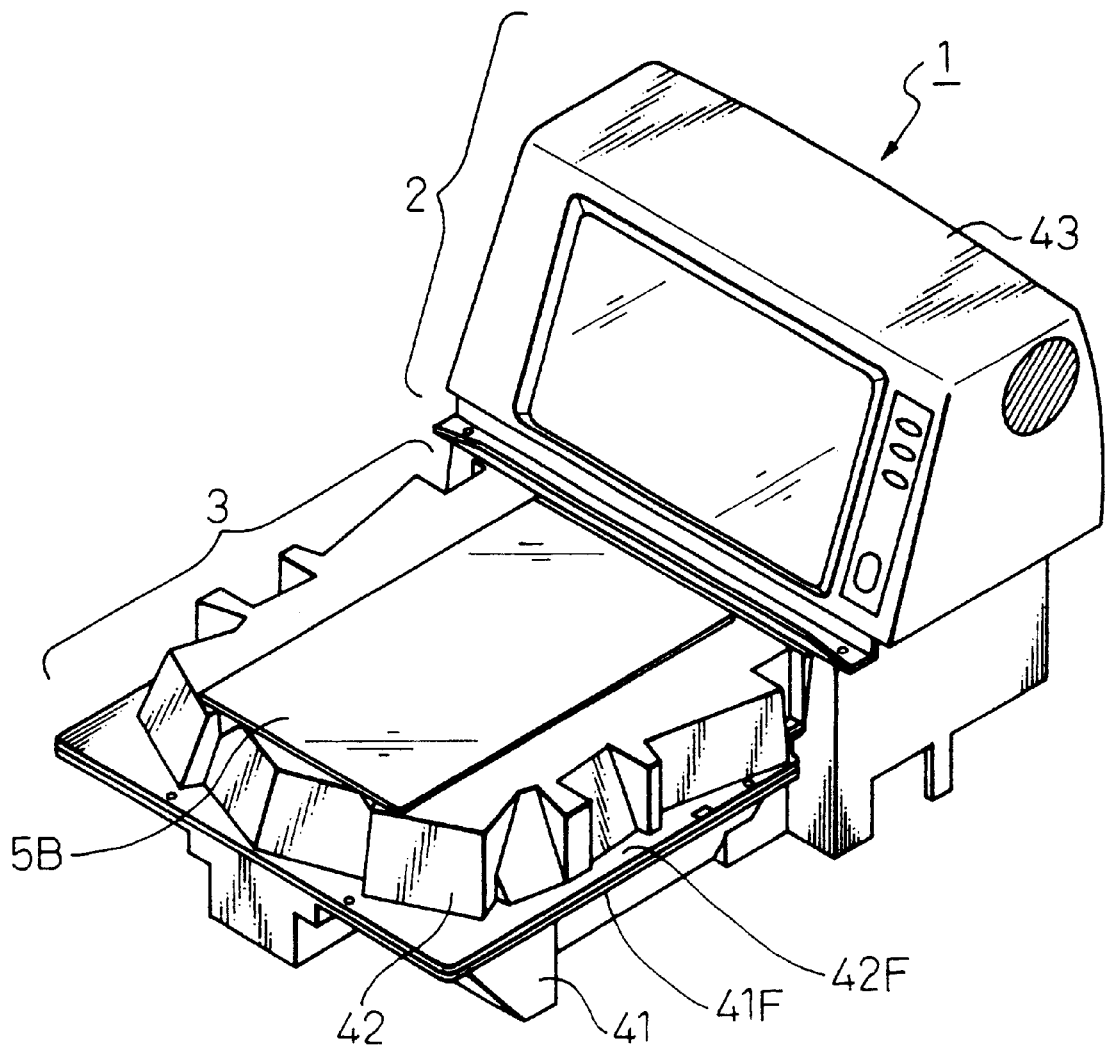

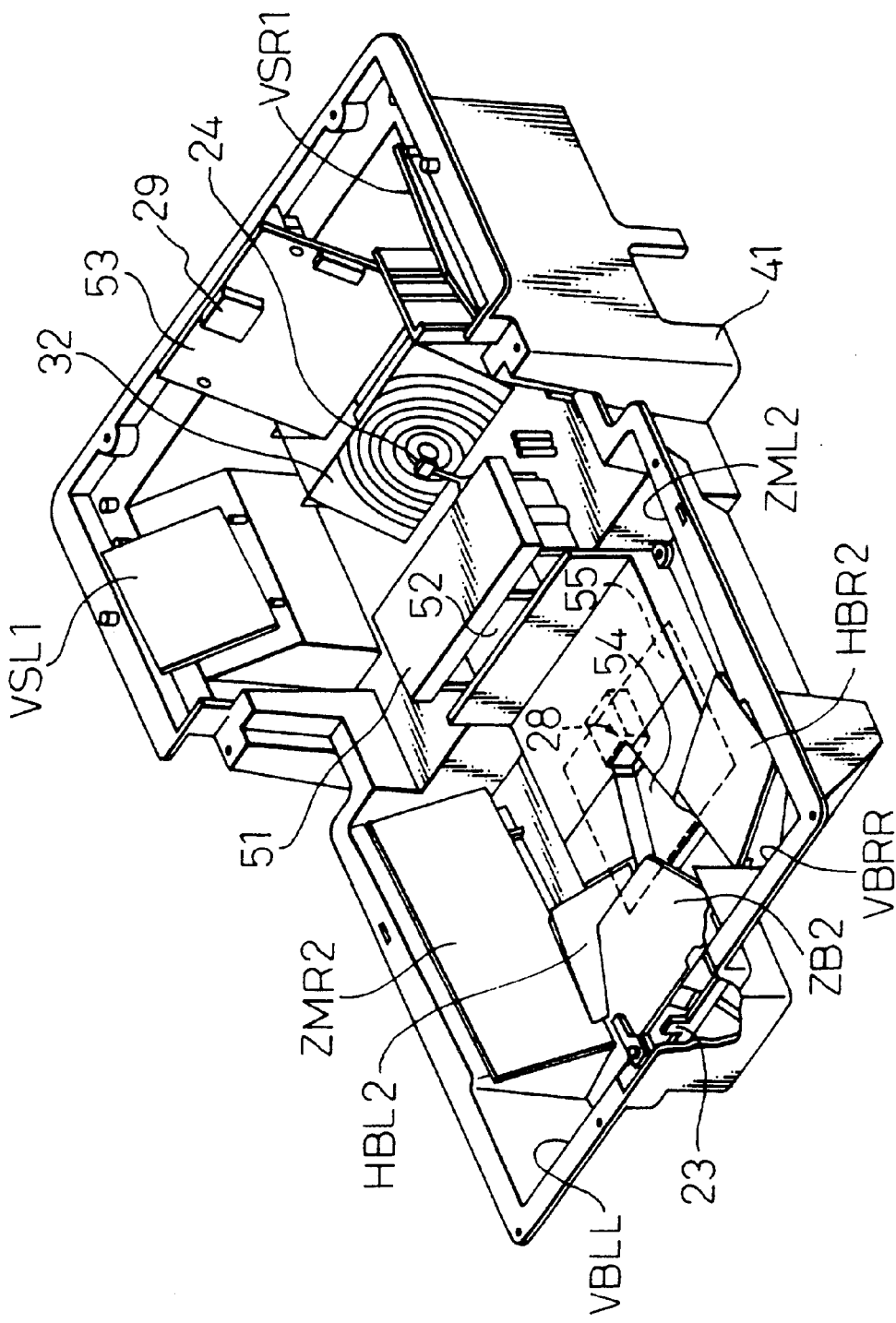

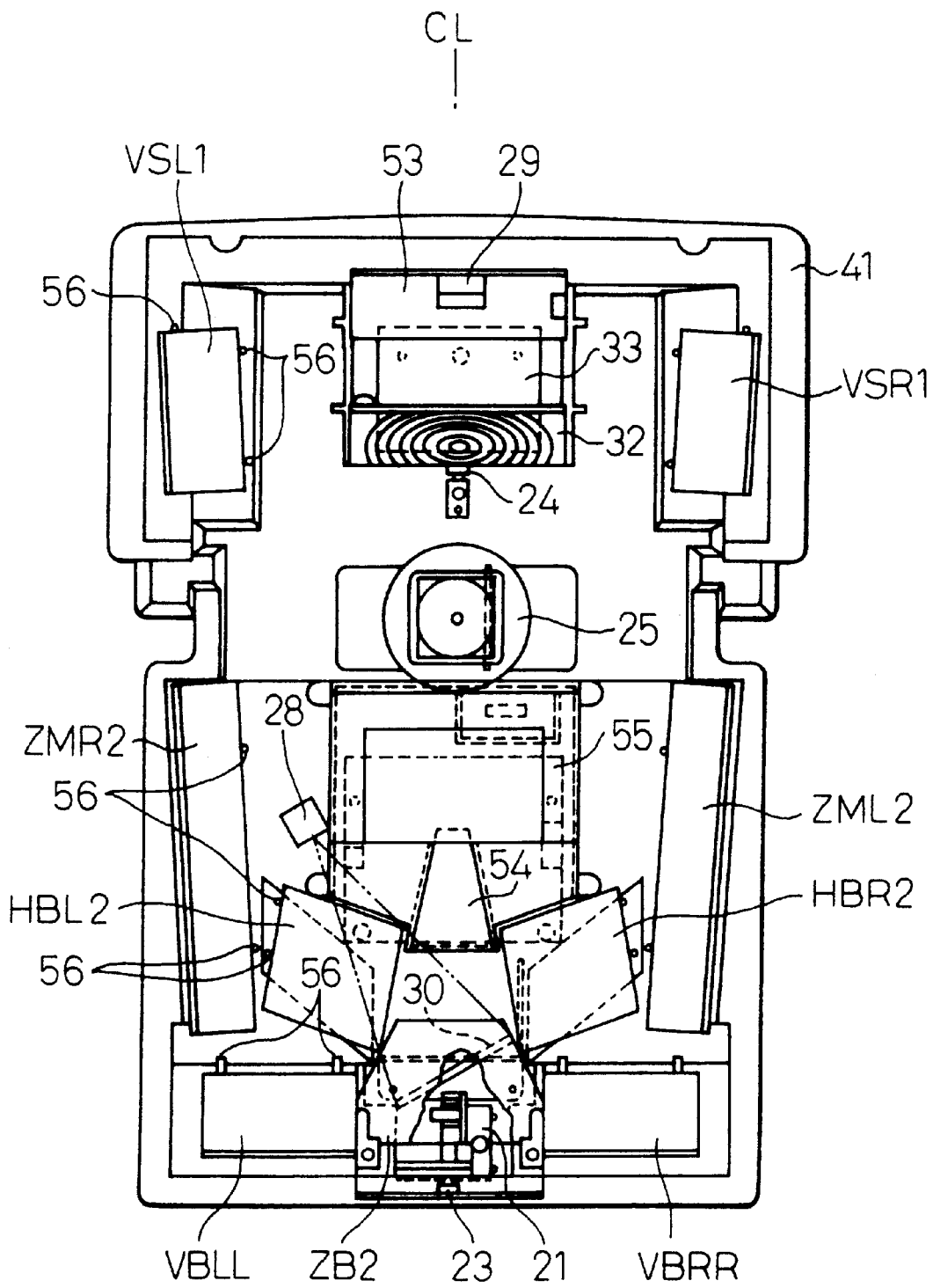

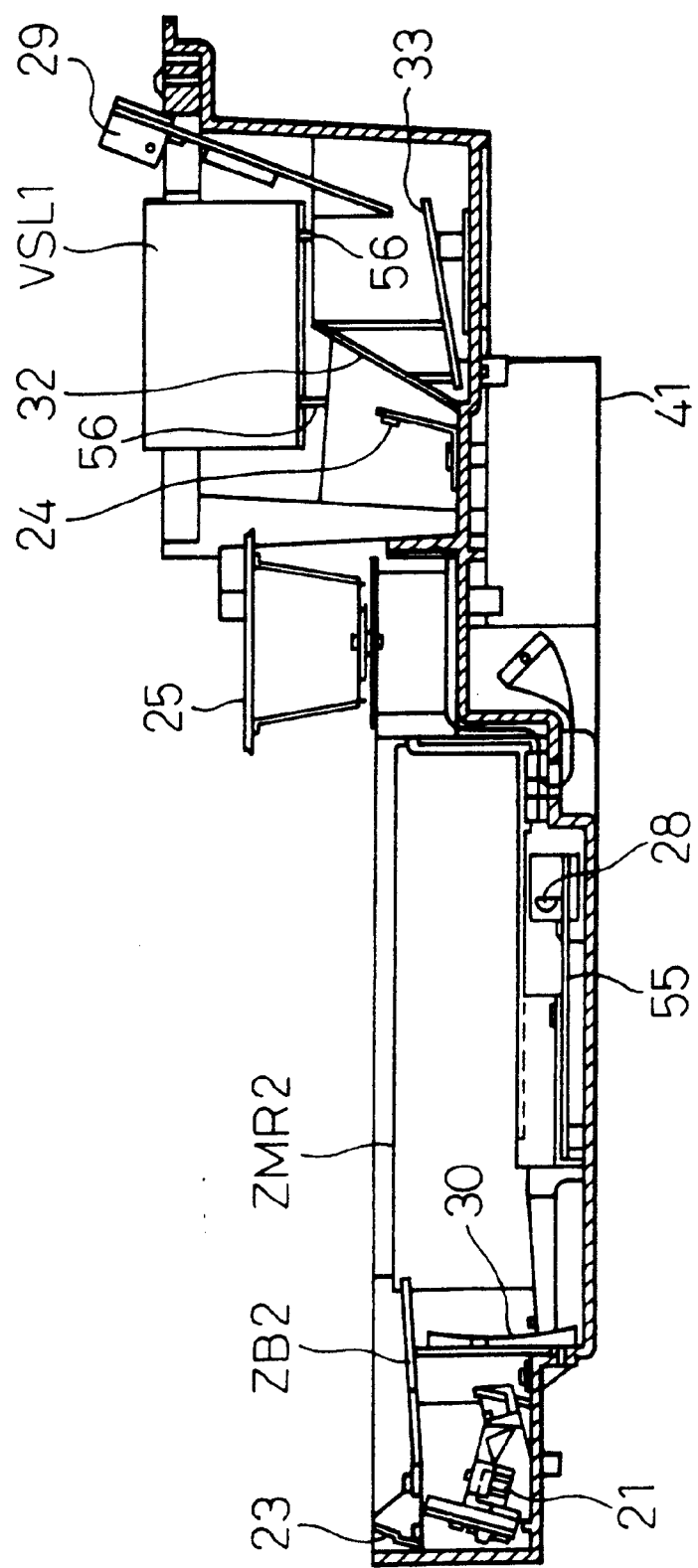

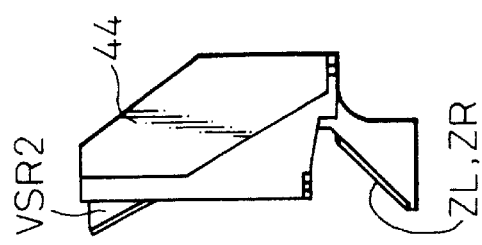
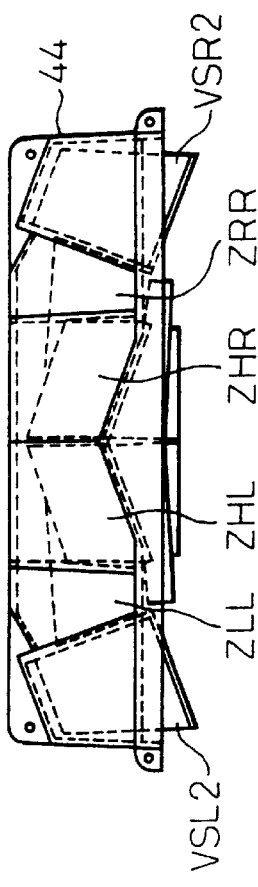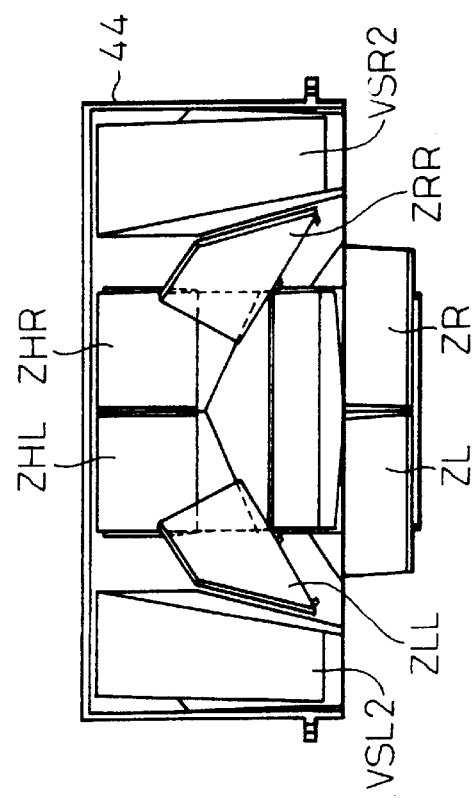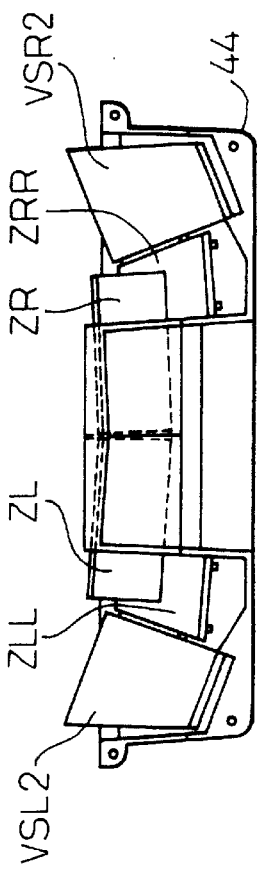

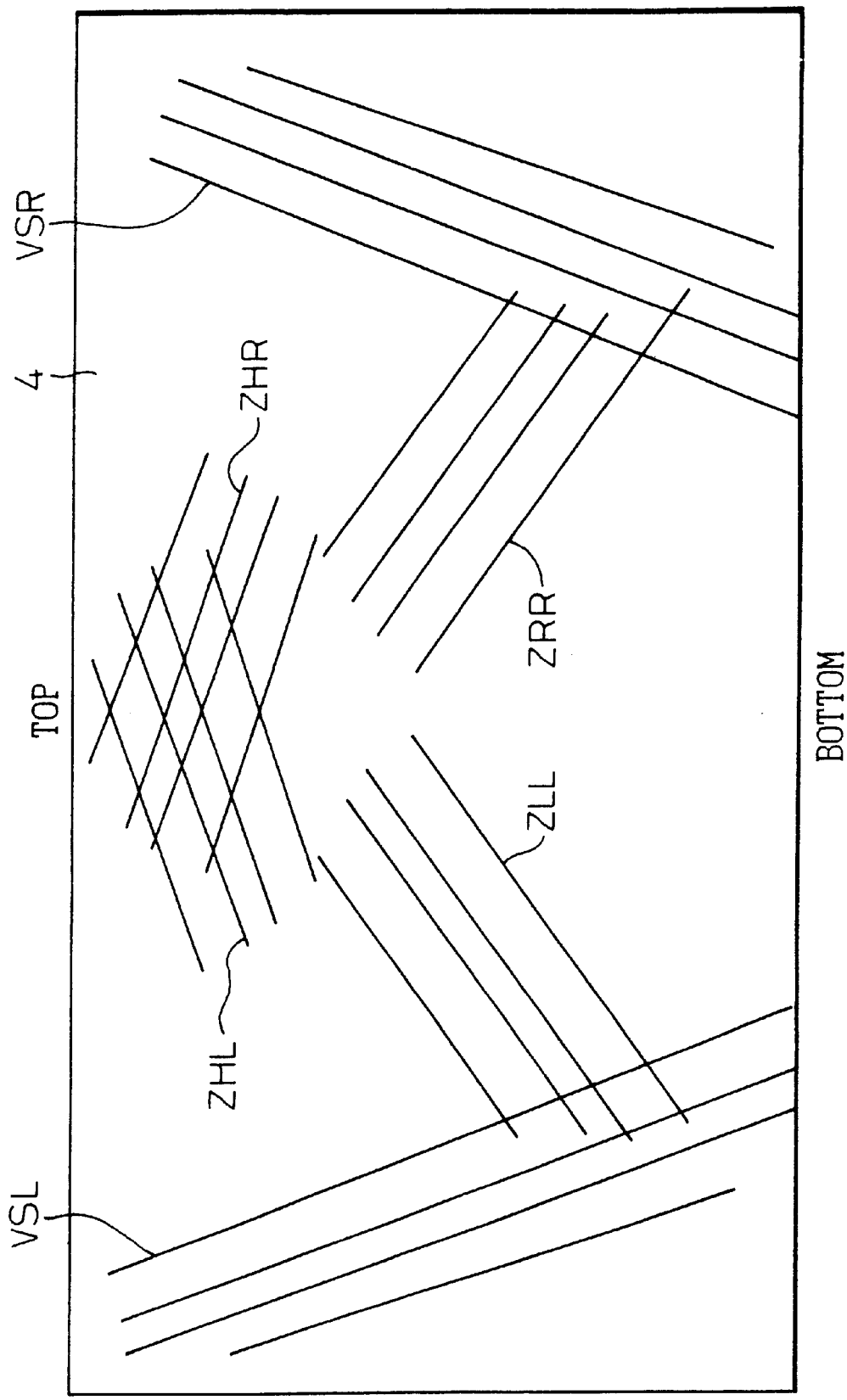

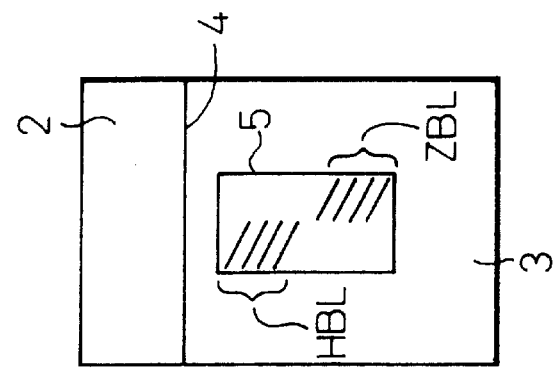
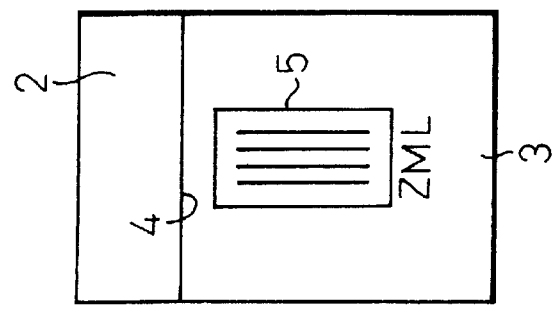
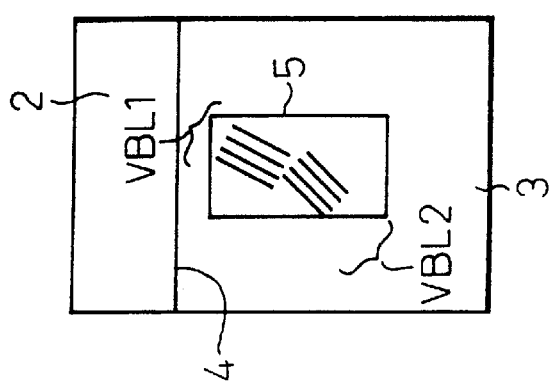
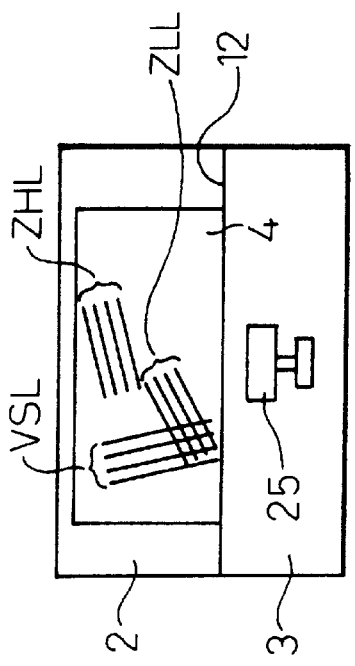

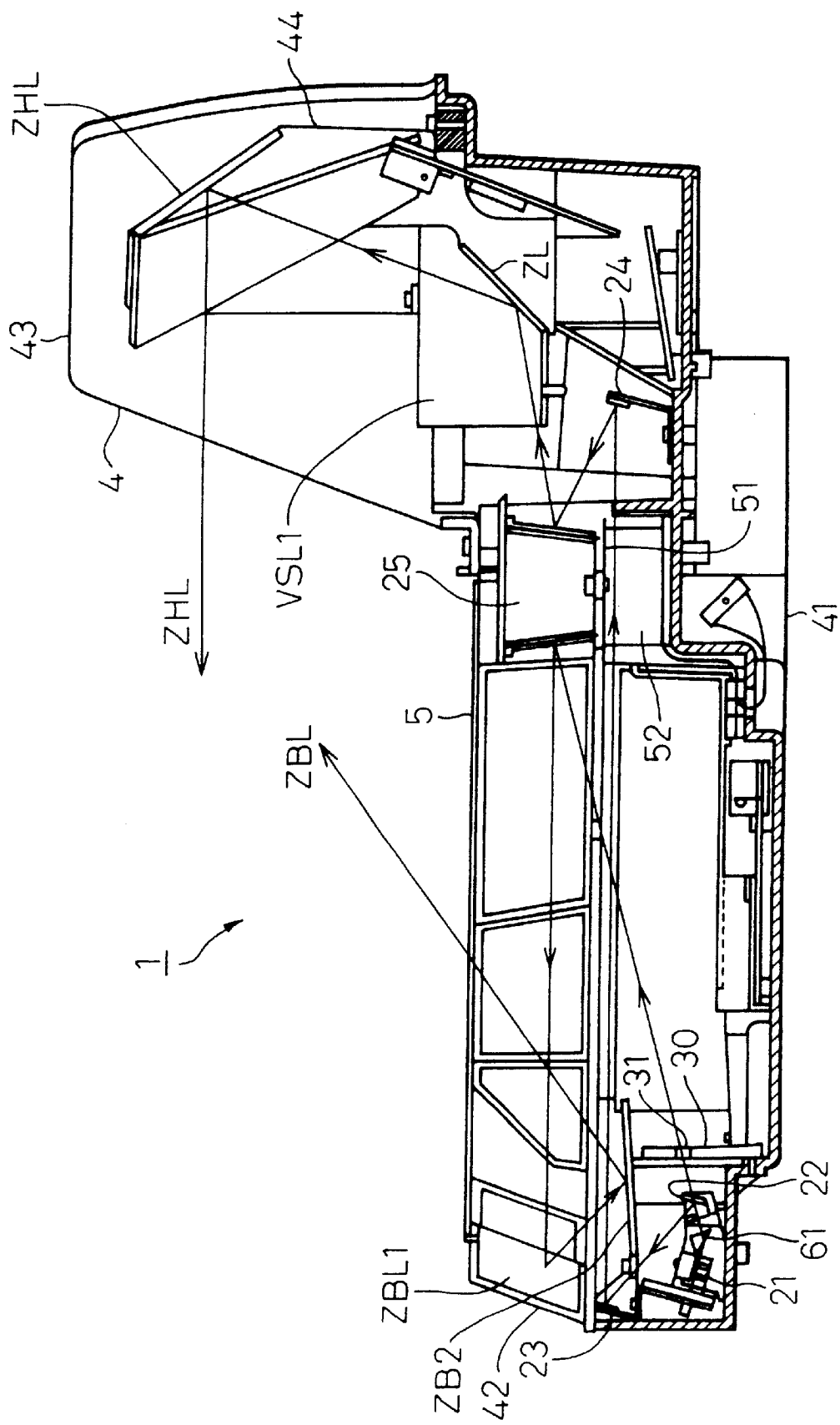

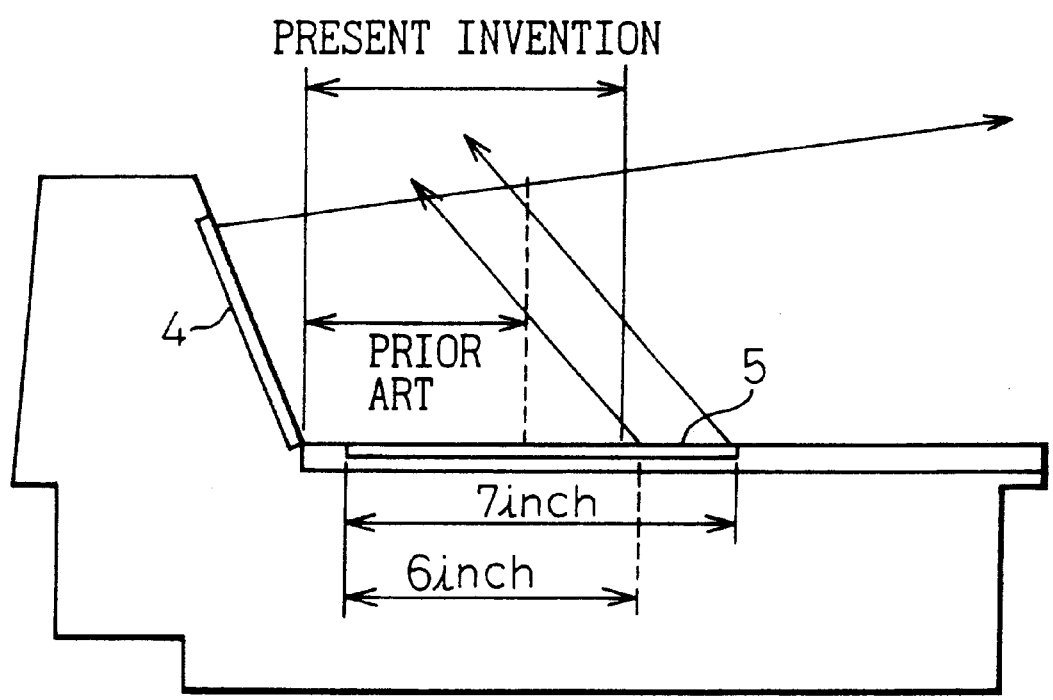

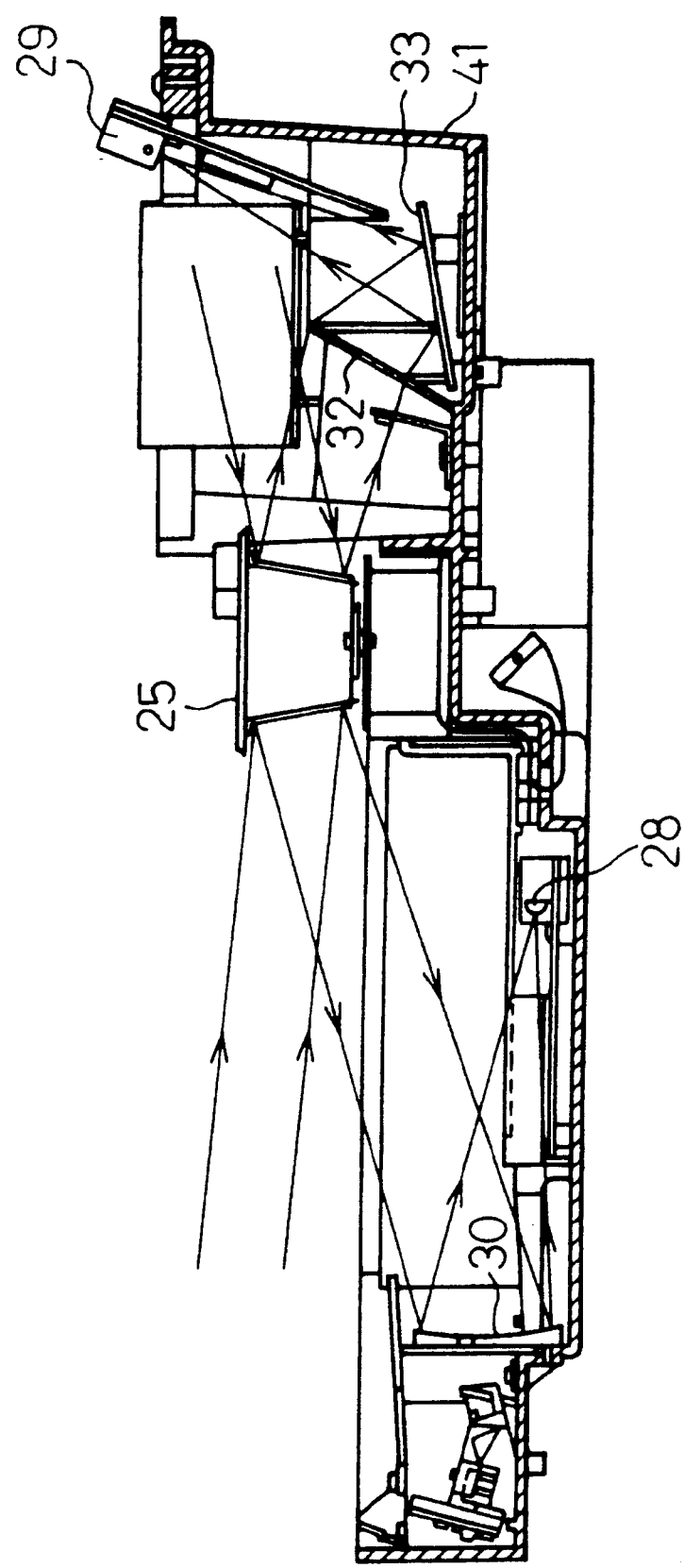

Fig.44A
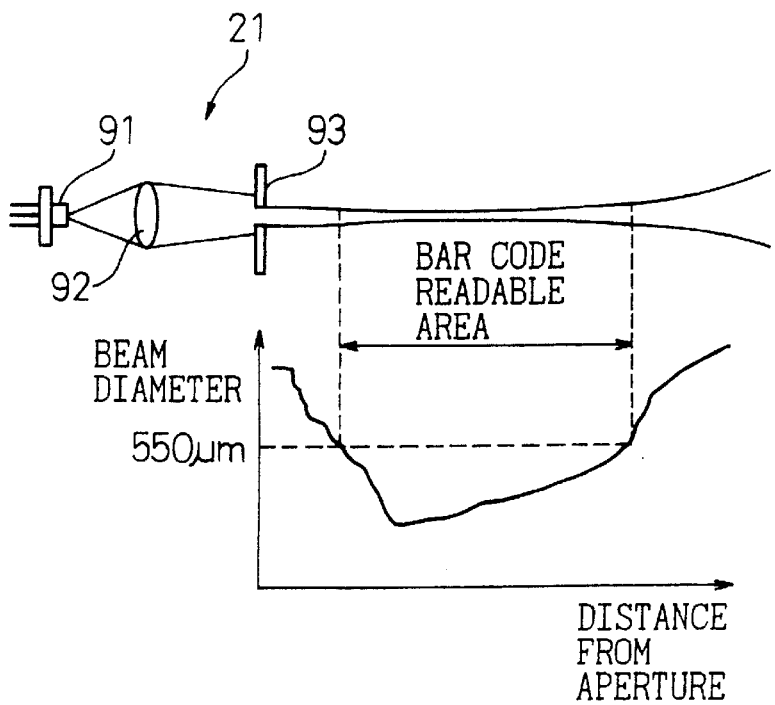
Fig.44B
Fig.45
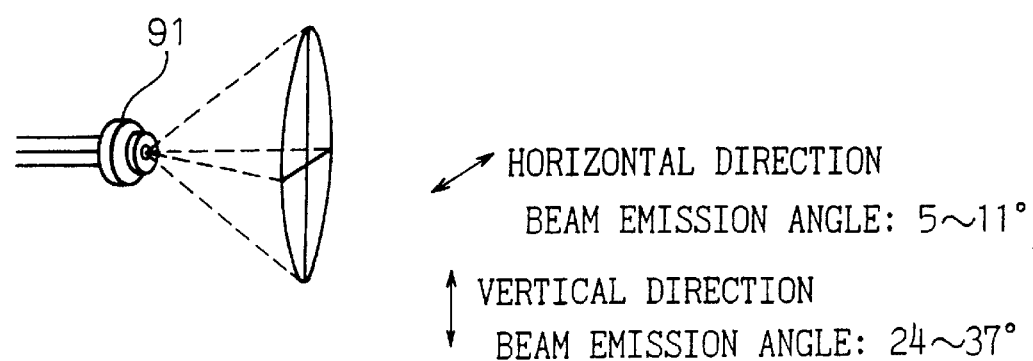

(HORIZONTAL DIRECTION)

(VERTICAL DIRECTION)

Fig.52
⟨VERTICAL DIRECTION (BEAM EMISSION ANGLE IS LARGE)⟩
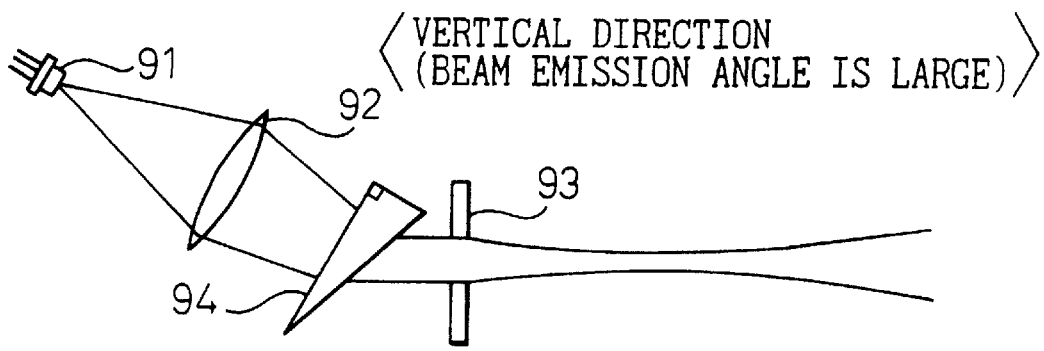
Fig.53A    Fig.53B
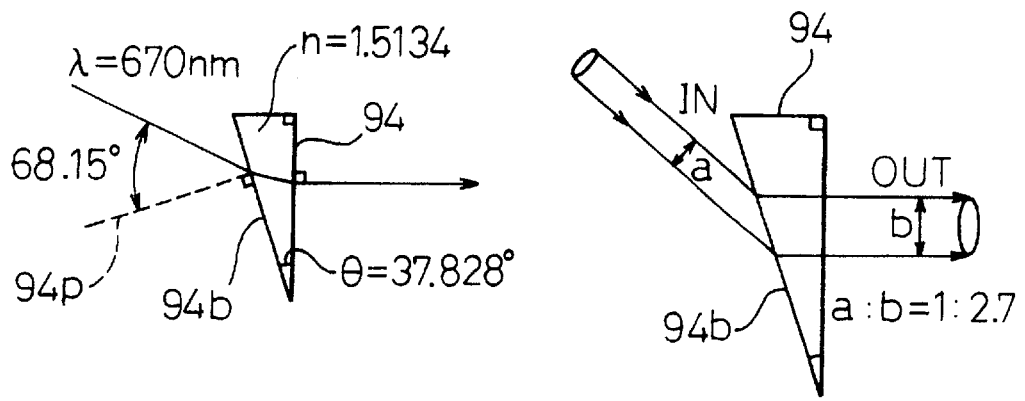
Fig.54A    Fig.54B
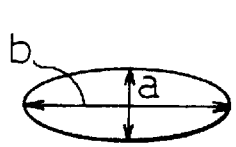
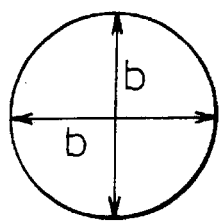

(HORIZONTAL DIRECTION (BEAM EMISSION ANGLE IS SMALL))

BAR CODE READER

CROSS-REFERENCE TO RELATED APPLICATIONS

This is a continuation of prior application Ser. No. 09/025,631, filed Feb. 18, 1998 now U.S. Pat. No. 6,462,880 which is a prior division of application Ser. No. 08/766,627, filed Dec. 13, 1996, now U.S. Pat. No. 5,936,218, of which this application claims priority under 35 U.S.C. §120.

BACKGROUND OF THE INVENTION

1. Field of the Invention

The present invention relates to a bar code, reader and, more particularly, to a bar code reader used for a POS (point-of-sale) system which is installed on a counter of a store and is used for reading bar codes. The bar codes are attached to goods and are read.

2. Description of the Related Art

In POS systems and in physical distribution systems, so far, it has been a widely accepted practice to exactly calculate and manage goods by reading bar codes. The bar codes are attached to the goods and are read by using a bar code reader.

In such a bar code reader, a ray of light such as laser light is emitted onto the bar code, which is attached to the article by printing or the like method. Thus the bar code reader scans the bar code surface, and the laser light reflected by the bar code is detected to read the bar code.

FIG. 1A is a diagram illustrating a conventional bar code reader in a perspective manner so that the internal structure can be seen. The bar code reader employs a source of laser light, such as a semiconductor laser, as a source of light.

In FIG. 1A, reference numeral 201 denotes a laser module constituted by a laser beam source and lenses. Reference numeral 202 is a polygon mirror, which is a polyhedral mirror having a plurality of reflection planes. The polygon mirror 2021s rotated by a motor 207. The laser beam emitted from the laser module 201 is reflected by a small plane mirror provided at the center of a concave mirror 203 and arrives at the reflection plane of the polygon mirror 202. The laser beam is reflected by the reflection plane of the polygon mirror 202. Here, however, since the polygon mirror 202 is rotating, the laser beam is scanned, for example, in the clockwise direction in the drawing.

Reference numeral 204 denotes mirrors for splitting the scanning line and on which is incident the laser beam scanned by the polygon mirror 202. The laser beam is downwardly reflected by the scanning line-splitting mirrors 204, upwardly reflected by a bottom mirror 205 of nearly a V-shape, and is emitted through a reading window 206.

The laser beam emitted from the reading window 206 scans the article that passes over the bar code reader. The laser beam, after having scanned the article, is reflected by the surface of the article to which the bar code is attached, and is caused to be incident on the bar code reader through the reading window 206.

Light reflected by the bar code of the article and incident on the bar code reader, is reflected by the bottom mirror 205, scanning line-splitting mirrors 204 and polygon mirror 202, and is caused to be incident on the concave mirror 203. The concave mirror 203 focuses the laser beam reflected and diffused by the bar code toward a light detector 208. The laser beam received by the light detector 208 is decoded by a decoding circuit in the bar code reader and is output to an external unit.

The bar code reader shown in FIG. 1A has only one reading window 206. Such a bar code reader can be installed on an accounting counter in a store in two ways. That is, the bar code reader is installed so that the reading window 206 is in flush with the surface of the accounting counter, or the bar code reader is so installed that the reading window 206 is nearly vertical to the surface of the accounting counter.

When the bar code reader of FIG. 1A is installed on the accounting counter, there is offered only one reading window 206 as described above. When the article is passed over the bar code reader at the accounting counter to read the bar code attached to the article, the bar code is not scanned by the scanning light unless the bar code faces the reading window 206, and the bar code is otherwise not read out. This is because in conventional bar code readers, a limitation is imposed on the range scanned by the scanning light or on the direction in which the scanning light is emitted.

To solve the above problem, a bar code reader has in recent years been devised having a plurality of reading windows. Such a bar code reader emits the scanning light through the respective reading windows to scan the article having bar code from a plurality of different directions.

FIGS. 1B and 1D illustrate appearances of bar code readers 210 and 220 in which the above-mentioned countermeasure is taken. These bar code readers 210 and 220 are provided with reading windows (hereinafter referred to as bottom windows) 216, 226 formed in the bottom surface of the device, and reading windows (hereinafter referred to as side windows) 217, 227 formed in the side surface erected at an angle nearly vertical to the bottom windows 216, 226. Scanning light is emitted from the bottom windows 216, 226 toward the upper side windows 217, 227. On the other hand, scanning light is emitted in nearly the horizontal direction (toward the operator) from the side windows 217, 227.

As shown in FIGS. 1C and 1E, the difference between the bar code readers 210 and 220 is that the bottom window 216 of the bar code reader 210 has a size of 5 inches×4 inches, whereas the bottom window 226 of the bar code reader 220 is of a trapezoidal shape having a size of 6 inches×6 inches.

As described above, a plurality of reading windows are provided, and the scanning light is emitted in a plurality of directions through the respective reading windows. Therefore, the article 209 passing on the bar code readers 210, 220 is irradiated with scanning light from a plurality of directions, and the probability for scanning the bar code is enhanced compared with when a bar code reader having only one reading window is used.

FIG. 1F illustrates a calculation counter (check-out counter) 230 on which the above-mentioned bar code reader 220 is installed. On the check-out counter 230 is installed the bar code reader 220. The operator P stands at a position facing the side window 227.

On the upper side of the side window 227 is provided a key board 222 for inputting data related to the goods to which no bar code has been attached. A belt conveyer 233 exists on the upstream side of the check-out counter 230 to carry the goods to the position of the bar code reader 220. Reference numeral 235 denotes a guide plate for guiding the goods onto the bottom window 226 of the bar code reader 220.

As the article is carried to the position of the bar code reader 220 and passes by the bar code reader 220, the bar code is read out irrespective of the direction of the bar code attached to the article. A POS terminal 234 is provided by the side of the operator P, and calculation processing is executed by the POS terminal 234.

FIG. 1G illustrates a bar code readable area of the bar code readers 210 and 220 of FIGS. 1B and 1D. Here, the hatched region RP represents the region where the scanning beams emitted from the side windows 217, 227 and the bottom windows 216, 226 are focused. In this region the bar code is read out even when the bar code is turned in the horizontal direction by 360 degrees. Thus, since the scanning beams are emitted from the two reading windows, the bar code readable area is broadened. Besides, even when the bar code surface does not completely face one reading window, the bar code can be read out.

However, even such bar code readers have problems as described below. In the case of the bar code reader 210 shown in FIGS. 1B and 1C, for example, the bottom window 216 has a size of 4 inches×5 inches. Thus, the bar code reader 210 shown in FIGS. 1B and 1C has a narrow bottom window 216, and a pattern (hereinafter referred to as scanning pattern) is constituted by a small number of scanning lines emitted from the bottom window 216.

In the case of the bar code reader 220 shown in FIGS. 1D and 1E, furthermore, the bottom window 226 has a size of 6 inches×6 inches, which is larger than the size of the bottom window 216 of the bar code reader 210 shown in FIGS. 1B and 1C. However, the bottom windows 216, 226 are usually constituted by a reinforced glass which resists falling articles, and are, hence, expensive. Therefore, the bar code reader 220 of FIGS. 1D and 1E becomes expensive.

Various optical systems are arranged in a bar code reader, and the arrangement must be so contrived that the reader does not become bulky. However, in the conventional bar code readers and, particularly, in the bar code readers 210, 220 which read the bar code through two surfaces (i.e., through the bottom windows 216, 226 and the side windows 217, 227), a total of two laser beam sources are provided: a laser beam source for the bottom windows 216, 226 and another laser beam source for the side windows 217, 227. Therefore, arrangement of the optical systems for accomplishing a desirable reading ability involves various limitations and problems, resulting in an increase in the size of the device and an increase in the cost of production.

SUMMARY OF THE INVENTION

The object of the present invention is to provide a bar code reader for reading bar codes using a bottom window and a side window, wherein only one source of light is employed to emit laser beam from the bottom window or the side window. The arrangement of the optical systems in the bar code reader is so contrived that the device is not bulky, and the device is fabricated at a reduced cost. Another object of the present invention is to read the bar code attached to an article maintaining an improved precision by increasing the number of scanning patterns emitted from the bottom window.

According to the present invention, in particular, it is possible to increase the number of scanning lines for constituting a scanning pattern emitted from the bottom window compared with that of the conventional devices. This is accomplished by the arrangement of mirrors for forming scanning patterns.

According to the present invention, furthermore, the external size of the device and, particularly, the depth can be decreased compared with the conventional devices. This makes it possible to install the reader even on a narrow accounting counter.

In the present invention, a source of light, scanning means, focusing means and the like constituting an optical system are arranged on the center line of the device (i.e., in a specified plane) so as to share the same optical axis. In particular, the ray of light guided by the reflector is caused to intersect the axis of rotation of the scanning means, since the axis of station is included in the specified plane. Therefore, no extra space needs be formed in the reader for conducting the ray of light, and the device can be realized in a small size. Moreover, the ray of light conducted by the reflection mirror is allowed to pass under the scanning means, making it possible to decrease the height of the device.

The light detector is so disposed on the bottom surface of a bottom scanner portion that the light-receiving surface is faced in the horizontal direction and is so disposed in the side scanner portion that the light-receiving surface is faced downwards, in order to effectively utilize space in the device. In this case, the light detector does not intercept the passage of rays of light such as scanning lines. Accordingly, limitation on the length of the scanning lines, on the direction and on the angle can be decreased to realize a scanning pattern for reading the bar code more efficiently.

In the present invention, furthermore, the frame of the bottom scanner unit is divided into upper and lower portions, and the mirrors for forming the scanning patterns are mounted on the inside of the frame. Therefore, no additional mechanism is necessary for arranging the mirrors in space inside the device; i.e., space in the device is effectively utilized.

Moreover, since the depth of the bottom window is increased compared with the conventional bar code readers, the area for reading bar codes can be broadened compared with that of the conventional devices, and it becomes more probable that the bar code can be read compared to the conventional devices.

To focus light reflected by the bar code and guided to the detector, furthermore, the optical passage of the reflected beam is folded by using a concave mirror, making it possible to shorten the length of the passage of the reflected beam.

According to the present invention, furthermore, the beam diameter of a semiconductor laser of either the vertical direction or the horizontal direction is changed by using a rectangular prism, but the other beam diameter is not changed; i.e., the beam diameters are set to be nearly the same in both the horizontal direction and the vertical direction. According to this constitution, the laser beam is less intercepted (squeezed) by, for example, an aperture, and the diameter of the laser beam is not deformed.

In particular, use of the rectangular prism makes it possible to reduce the size of the laser module.

With the source of laser beam, means for changing the beam diameter and means for splitting the beam being contained in a module, furthermore, there is no need to bring the optical axes of each of the portions into alignment.

BRIEF DESCRIPTION OF THE DRAWINGS

The present invention will be more clearly understood from the description as set forth below with reference to the accompanying drawings, wherein:

FIG. 1D is a perspective view illustrating appearance of another conventional bar code reader having two reading windows;

FIG. 1E is a diagram illustrating the size of a bottom window of FIG. 1D;

FIG. 4 is a diagram illustrating a bar code readable area by the bar code reader of FIG. 2A;

FIG. 5A is a front view illustrating an outer size of the bar code reader of FIG. 2A;

FIG. 5B is a side view illustrating an outer size of the bar code reader of FIG. 2A;

FIG. 7 is a perspective view illustrating a state of when a cover is removed from a bottom scanner portion of the bar code reader of FIG. 2A;

FIG. 9 is a perspective view illustrating the internal constitution of a lower frame of the bar code reader of FIG. 7;

FIG. 10B is a plan view illustrating the constitution of the lower frame of FIG. 9 according to a modified embodiment;

FIG. 11 is a side sectional view of the lower frame of FIG. 10A;

FIG. 13A is a plan view of a mirror frame shown in FIGS. 8A and 8B;

FIG. 13B is a front view of the mirror frame shown in FIGS. 8A and 8B;

FIG. 13C is a bottom view of the mirror frame shown in FIGS. 8A and 8B;

FIG. 13D is a side view of the mirror frame shown in FIGS. 8A and 8B;

FIG. 20 is a diagram illustrating the whole scanning patterns emitted through the side window;

FIGS. 21A to 21C are diagrams illustrating some of the scanning patterns emitted through the bottom window;

FIG. 21D is a diagram illustrating some of the scanning patterns emitted through the side window 4;

FIG. 22 is a diagram illustrating the passages of rays of light from when a laser beam emitted from a VLD module is reflected by the polygon mirror until when it is emitted through the bottom window and the side window;

FIG. 27 is a diagram comparing the bar code readable area of the bar code reader of the present invention with that of the conventional bar code reader;

FIG. 28 is a diagram illustrating the passages until the beam reflected by the bar code arrives at the detector in the bar code reader;

FIG. 44A is a diagram illustrating the internal constitution of the VLD module and the state of laser beam emitted from the VLD module;

FIG. 44B is a diagram of characteristics illustrating the bar code readable area as a distance from the aperture when the laser beam has an optimum diameter;

FIG. 45 is a diagram illustrating a difference in the diameter of the beam emitted from a semiconductor laser depending upon the vertical direction and the horizontal direction;

FIGS. 48A and 48B are diagrams illustrating a problem arising when use is made of a collimator lens having a small f-value, wherein FIG. 48A is a diagram illustrating a change in the diameter of the laser beam in the vertical direction, and FIG. 48B is a diagram illustrating a change in the laser beam in the horizontal direction;

FIGS. 49A and 49B are diagrams illustrating a problem arising when use is made of a collimator lens having a large f-value, wherein FIG. 49A is a diagram illustrating a change in the diameter of the laser beam in the horizontal direction, and FIG. 49B is a diagram illustrating a change in the diameter of the laser beam in the vertical direction;

FIG. 51A is a diagram illustrating the diameter of the beam of before the beam is incident upon the rectangular prism of FIG. 50B;

FIG. 52 is a diagram illustrating the constitution of the VLD module using the rectangular prism and a change in the laser beam;

FIG. 53A is a diagram illustrating a principle for changing the beam diameter of when the direction of the rectangular prism is changed;

FIG. 53B is a diagram illustrating a change in the diameter of the laser beam that has passed through the rectangular prism;

FIG. 54A is a diagram illustrating the diameter of the beam of before the beam is incident upon the rectangular prism of FIG. 53B;

FIG. 54B is a diagram illustrating the diameter of the beam emitted from the rectangular prism of FIG. 53B;

FIGS. 58A to 58C are diagrams illustrating examples for changing the beam diameter by using means other than the prism, wherein FIG. 58A is a diagram illustrating a combination of a convex cylindrical lens and a concave cylindrical lens, FIG. 58B is a diagram illustrating a combination of a concave cylindrical lens and convex cylindrical lens, and FIG. 58C is a diagram illustrating the use of a cylindrical lens of the type in which a concave lens and a convex lens are formed as a unitary structure;

DESCRIPTION OF THE PREFERRED EMBODIMENTS

Described below with reference to the accompanying drawings are preferred embodiments of the present invention.

Figure 2A:
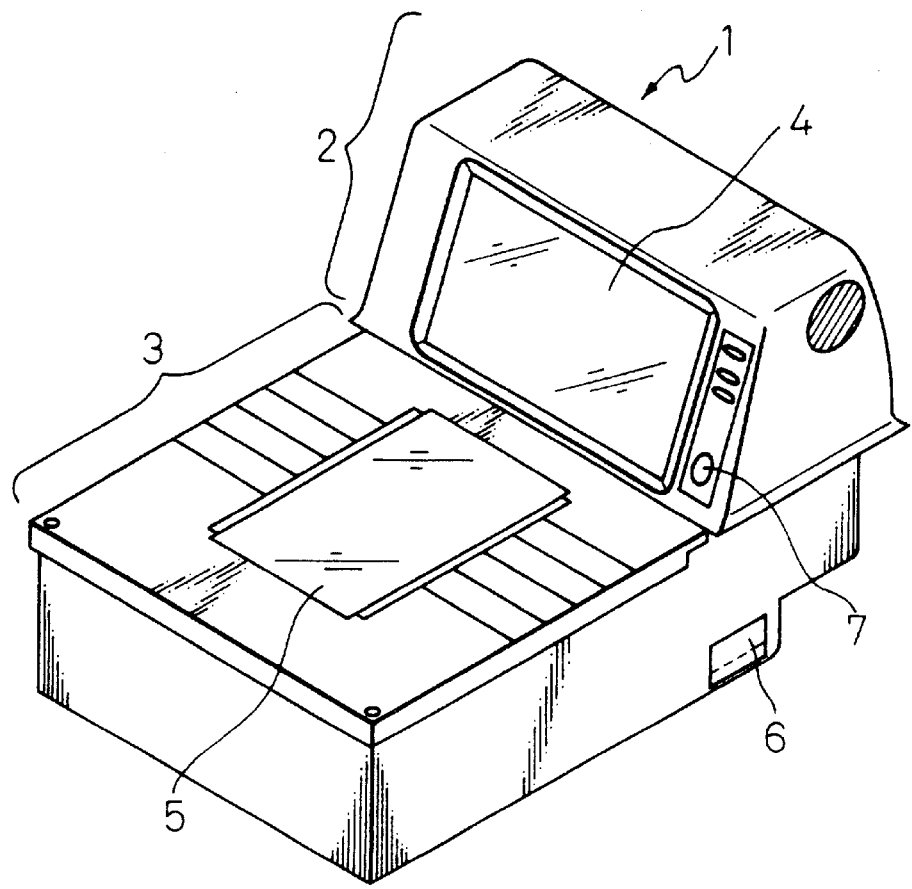
FIG. 2A is a perspective view illustrating the appearance of a bar code reader according to an embodiment of the present invention.

FIG. 2A illustrates the appearance of a bar code reading apparatus (hereinafter referred to as a bar code reader) 1 of the present invention. The bar code reader 1 shown in FIG. 2A contains a source of light (such as a semiconductor laser or the like) therein, emits scanning beams through reading windows to scan the bar code, and receives the beams reflected by the bar code to read the bar code.

The bar code reader 1 can be roughly divided into two units, i.e., a side scanner portion 2 and a bottom scanner portion 3. The side scanner portion 2 has a reading window called side window 4. The scanning beam from the side scanner portion 2 is emitted nearly in a horizontal direction through the side window 4, and scans the article passing on the bar code reader 1.

The bottom scanner portion 3 has a reading window called bottom window 5. The scanning beam emitted from the bottom window 5 is directed upwards. In order that the article having a bar code is scanned by the scanning beams from different directions, the scanning beam is emitted through the bottom window 5 being slightly tilted toward the side window 4 to thereby scan the article passing on the bar code reader 1. The side scanner portion 2 and the bottom scanner portion 3 constituting the bar code reader 1 have their respective optical systems therein for generating scanning beams. Constitutions of these optical systems will be described later in detail.

In FIG. 2A, reference numeral 6 denotes a dip switch which is used for setting a variety of operations of the bar code reader 1. Reference numeral 7 denotes a restart switch which is used for resetting the operation of the bar code reader 1. Though not shown in FIG. 2A, the bar code reader 1 is provided with an indicator such as LED for informing the operator of the fact that the bar code cannot be read, a speaker for producing alarm sound, etc.

Furthermore, the surface of the bar code reader 1 having the bottom window 5 works as a scale which, when an article is placed thereon, measures the weight of the article. When the price of the article corresponds to the weight of the article, the prices of the individual articles can be calculated by measuring the weights of the articles.

Figure 2B:
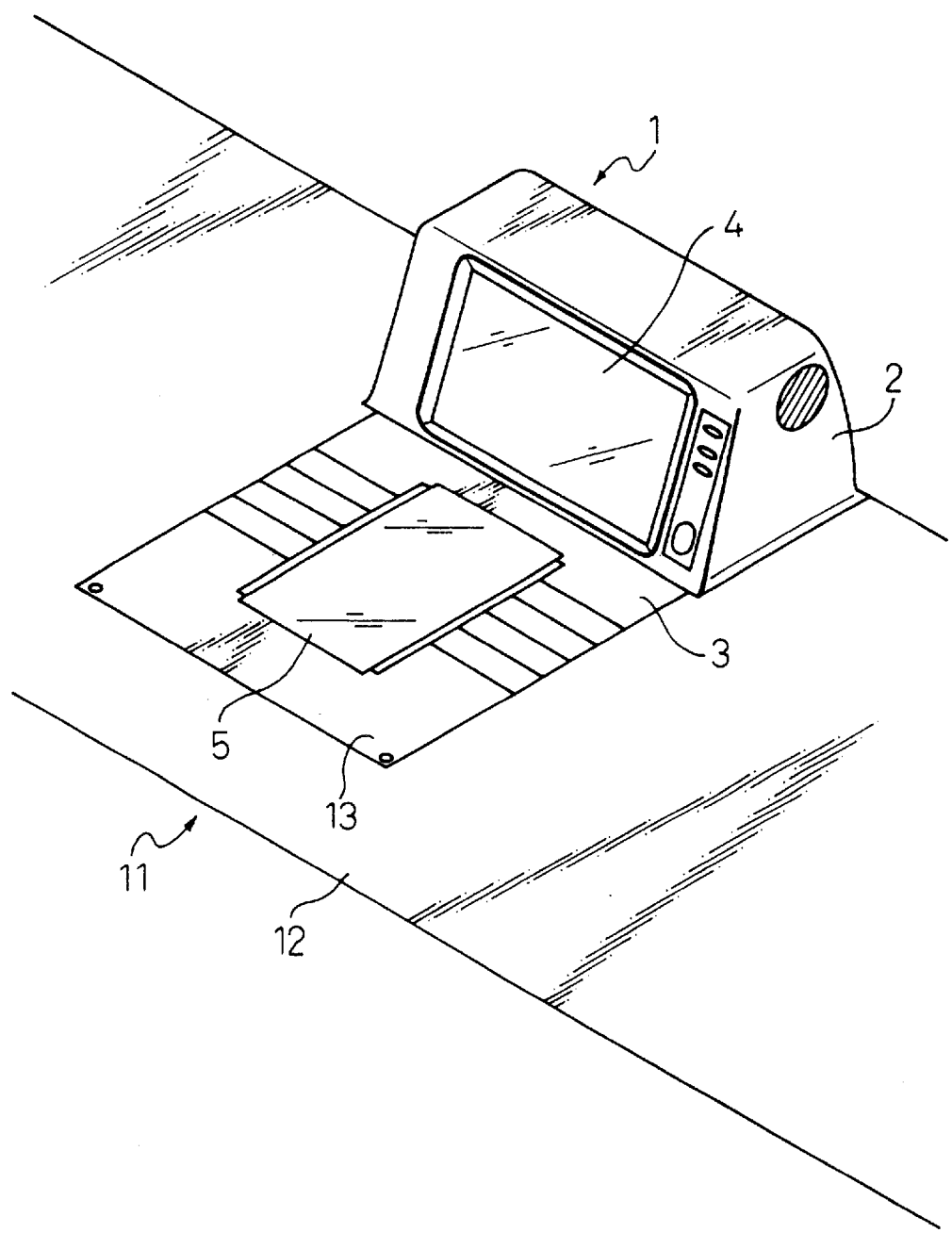
FIG. 2B is a perspective view illustrating a state where the bar code reader of FIG. 2A is installed on an accounting counter.

FIG. 2B illustrates a state where the bar code reader 1 of FIG. 2A is installed on an accounting counter (check-out counter) in a store. The bar code reader 1 is installed on the accounting counter 11 such that the counter surface 12 of the accounting counter 11 is flush with the upper surface 13 of the bar code reader 1 which is provided with the bottom window 5. Therefore, the lower portion of the bar code reader 1 is buried in the accounting counter 11.

The operator stands at a position facing the side scanner portion 2 of the accounting counter 11, passes an article, to which a bar code is attached, over the bar code reader 1, so that the article is irradiated with the scanning beam thereby to read the bar code attached to the article.

Since the counter surface 12 is flush with the upper surface 13 of the bar code reader 1 having the bottom window 5, the operator passes the article on the bar code reader 1 in a manner to come into contact with the counter surface 12 to thereby read the bar code.

Figure 3:
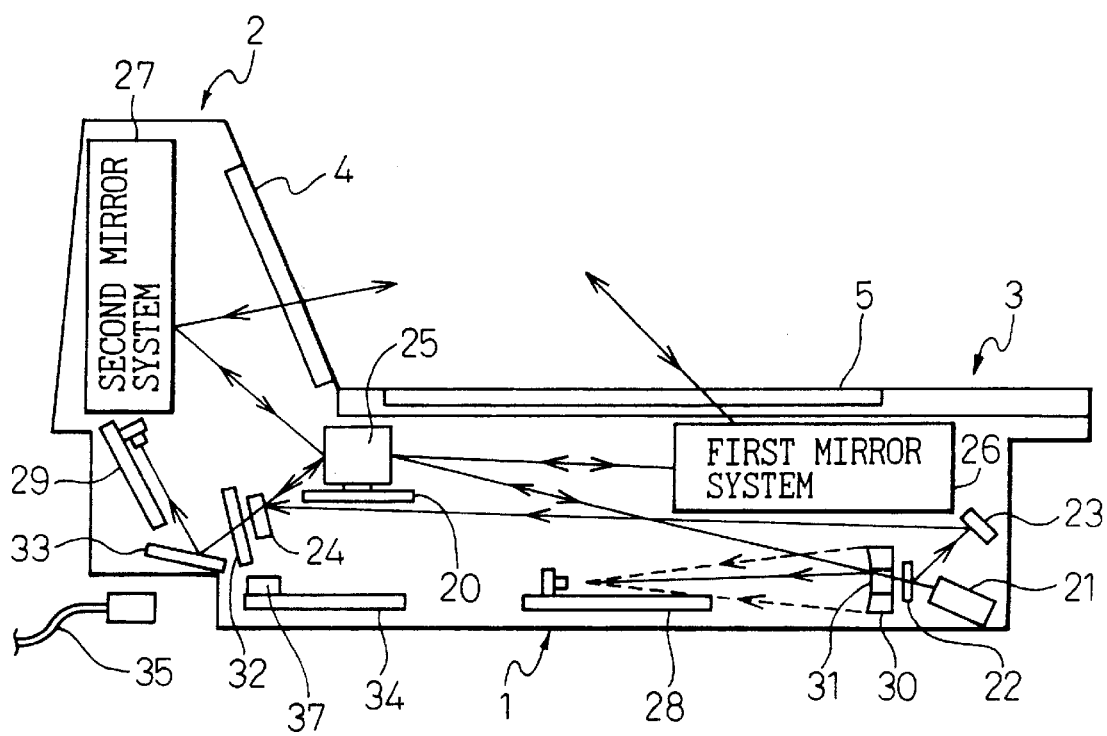
FIG. 3 is a side sectional view schematically illustrating the internal constitution of the bar code reader of FIG. 2A.

FIG. 3 illustrates the arrangement of an optical system in the bar code reader 1 and the passages of beams emitted from a laser beam source. A VLD (visible laser diode) module 21 is used as the source of laser beam. The VLD module 21 contains a semiconductor laser, and a laser beam generated by the semiconductor laser is emitted as a scanning beam. The VLD module 21 is installed at a position remotest from the side scanner portion 2 and emits a laser beam toward the side scanner portion 2.

The bar code reader 1 has only one VLD module 21 as a source of light, but has two reading windows, i.e., side window 4 and bottom window 5. Therefore, the laser beam emitted from the VLD module 21 is split on its way into two by a half-mirror 22 which is a splitter. The half-mirror 22 reflects part of the laser beam emitted from the VLD module 21, and transmits part of the laser beam, to thereby split the laser beam into two. A scanning beam to be emitted through the side window 4 is obtained from one of the split beams, and a scanning beam to be emitted through the bottom window 5 is obtained from the other one of the split beams.

Reference numerals 23 and 24 denote reflection mirrors which reflect laser beams reflected by the half-mirror 22 so that they are incident upon a polygon mirror 25. The reflection mirrors 23 and 24 are of a small square shape. A concave mirror 30 is provided neighboring the half-mirror 22. A through hole 31 is formed in the center of the concave mirror 30, and the laser beam emitted from the VLD module 21 is incident upon a polygon mirror 25 passing through the hole 31.

The polygon mirror 25 is a polyhedron having a plurality of reflection planes and having, in this case, four reflection planes. The polygon mirror 25 is mounted on a polygon motor 20 and is rotated by the polygon motor 20. Onto the reflection planes of the polygon mirror 25 are incident, from different directions, a laser beam that has passed through the hole 31 of the concave mirror 30 after having passed through the half-mirror 22 and a laser beam reflected by the reflection mirrors 23 and 24 after reflected by the half-mirror 22. Since the polygon mirror 25 is rotated as described above, the laser beams reflected by the reflection planes of the polygon mirror 25 are converted into scanning beams that describe arcs.

The reflection planes of the polygon mirror 25 are tilted at predetermined angles, and the laser beams are reflected by the reflection planes in predetermined angular directions. The reflection planes are tilted at different angles. The angles of reflection planes of the polygon mirror 25 need not be different for all reflection planes.

Reference numeral 26 denotes a first mirror system for emitting the beam reflected by the polygon mirror 25 through the bottom window 5, and reference numeral 27 denotes a second mirror system for emitting the beam reflected by the polygon mirror 25 through the side window 4. The mirror systems 26 and 27 are each constituted by a combination of a plurality of mirrors. The mirror systems 26 and 27 work to divide a scanning beam formed by the polygon mirror 25 into a plurality of scanning lines in order to increase the number of scanning lines emitted through the side window 4 and the bottom window 5. Moreover, the directions and inclinations of the reflection planes of mirrors constituting the mirror systems 26 and 27 are so set that the scanning lines emitted through the side window 4 and the bottom window 5 will have a variety of scanning directions (angles).

On the first mirror system 26 is incident a scanning beam that has passed through the half-mirror 2 and is reflected by the reflection plane of the polygon mirror 25. This scanning beam is so reflected as will be emitted nearly upwardly through the bottom window 5. On the second mirror system 27 is incident a scanning beam that is reflected by the reflection plane of the polygon mirror 25 after having been reflected by the half-mirror 22 and the reflection mirrors 23, 24. This scanning beam is so reflected as will be emitted nearly in a horizontal direction through the side window 4.

The scanning beams emitted from the side window 4 and the bottom window 5 are projected onto the article passing on the bar code reader 1 to thereby scan the bar code surfaces. The scanning beams having scanned the bar code surfaces are reflected by the bar code surfaces, and are incident upon the bar code reader 1 through the side window 4 and the bottom window 5. The beams reflected by the bar code and are incident through the side window 4 and the bottom window 5 arrive at the polygon mirror 25 travelling through the same passages through which the scanning beams were emitted, and are reflected by the reflection planes of the polygon mirror 25.

Described below are the passages of incidence of the reflected beam from the bar code to the bar code reader 1.

In FIG. 3, reference numeral 28 denotes a first detector which detects a beam reflected by the bar code and is incident upon the bar code reader 1 through the bottom window 5. The light-receiving surface of the first detector 28 is faced to a direction opposite to the side scanner portion 2. Reference numeral 29 denotes a second detector which detects a beam reflected by the bar code and is incident upon the bar code reader 1 through the side window 4. The light-receiving surface of the second detector 29 is tilted downward. The beams reflected by the bar code and received by the first and second detectors 28 and 29 are electrically processed, converted into binary signals, decoded by a decoding circuit that is not shown, and are output to an external unit (e.g., POS terminal).

The beam reflected by the bar code and incident onto the bottom window 5 is reflected by the reflection plane of the polygon mirror 25, falls on the concave mirror 30, and is focused on the light-receiving surface of the first detector 28 by the concave mirror 30. The beam reflected by the bar code surface of the article has been scattered and, hence, the reflected beam incident on the bar code reader 1 has been broadened to some extent. In this state, a decreased amount of the reflected beam arrives at the light-receiving surface of the first detector 28, and the beam is not obtained in an amount sufficient for reading the bar code. Therefore, the bar code reader 1 of FIG. 3 focuses the reflected beam using the concave mirror 30 to increase the amount of the reflected beam received by the first detector 28.

The concave mirror 30 works to fold the reflected beam back, i.e., reflects the beam from the bar code through the polygon mirror 25 toward the first detector 28. Therefore, a long optical passage is realized in the device though its full length is small. The through hole 31 formed in the center of the concave mirror 30 permits the laser beam emitted from the VLD module 21 and incident upon the polygon mirror 25 to pass through.

As described above, the beam reflected by the bar code is incident on the detector travelling through the same passages as those through which the scanning beam was emitted. In order that the bar code can be most efficiently read out, the optical axis of the beam emitted from the VLD module 21 must be in agreement with the optical axis of the reflected beam incident on the first detector 28. Therefore, the concave mirror 30 must be arranged on the optical axis of the laser beam emitted from the VLD module 21 but must not intercept the optical axis of the emitted beam. For this purpose, the concave mirror 30 of FIG. 3 is provided at the central portion thereof with a hole 31 through which the beam emitted from the VLD module 21 is permitted to pass.

Reference numeral 32 denotes a Fresnel lens which focuses the beam reflected by the bar code and is incident through the side window 4. This action is the same as that of the above-mentioned concave mirror 30. A small reflection mirror 24 is disposed in front of the Fresnel lens 32. The optical axis of the beam reflected by the reflection mirror 24 is also in agreement with the optical axis of the beam that is reflected by the bar code and is incident on the Fresnel lens 32. As described above, however, the beam reflected by the bar code is broadened and only part of the beam incident on the Fresnel lens 32 is intercepted by the reflection mirror 24; i.e., most of the beam reflected by the bar code is incident upon the Fresnel lens 32.

The Fresnel lens 32 is tilted to meet the angle of incidence of the beam reflected by the polygon mirror 25. The reflected beam focused by the Fresnel lens 32 is upwardly reflected by a bottom mirror 33 provided on the bottom surface of the bar code reader, and arrives at the light-receiving surface of the second detector 29 which faces downward.

Here, the bottom scanner portion 3 is constituted by the first mirror system 26, concave mirror 30 and first detector 28, and the side scanner portion 2 is constituted by reflection mirrors 23, 24, second mirror system 27, Fresnel lens 32, bottom surface mirror 33 and second detector 29. The VLD module 21, half-mirror 22 and polygon mirror 25 are shared by the bottom scanner portion 3 and the side scanner portion 2.

The thus constituted bar code reader 1 further has a printed board 34 arranged on the bottom surface thereof. On the printed board 34 are mounted a circuit for controlling the turn-on of the laser, a circuit for controlling the operation of the detector, a circuit for controlling the rotation of the polygon motor, and a decoder circuit for decoding the bar code based upon the reflected beam detected by the detector. The printed board 34 has a connector 37 for connection to the external unit. An interface (I/F) cable 35 is connected to the connector 37, and the decoded bar code data are output.

FIG. 4 is a diagram illustrating a state where a bar code 8 is scanned by a scanning beam emitted from the bar code reader 1. As shown in FIG. 4, a scanning beam LH is emitted nearly in a horizontal direction (or tilted slightly upwards) through the side window 4. Through the bottom window 5, on the other hand, a scanning beam LV is emitted upwards. The beam emitted through the bottom window 5 is slightly tilted toward the side window 4. Therefore, the scanning beams emitted through both the side window 4 and the bottom window 5 are focused at a portion A of FIG. 4. With an article with bar code being passed through this position, therefore, the article is scanned simultaneously (or at different times) with the scanning beams LH and LV emitted from different directions through the side window 4 and the bottom window 5.

Therefore, even when the bar code 8 is not faced to the side window 4 or to the bottom window 5, it becomes more probable that the bar code 8 is irradiated with the scanning beam emitted through either the side window 4 or the bottom window 5, and the probability for reading the bar code 8 becomes high.

The scanning beam for scanning the bar code 8 is reflected by the surface of the article 9 to which the bar code 8 is attached. Here, however, the reflected beam RF is scattered as shown in FIG. 4. Therefore, even when the bar code 8 is located nearly perpendicularly to the bar code reader 1 and is faced to the direction opposite to the side window 4 as represented by a position B, part RFp of the beam reflected by the bar code 8 arrives at the bottom window 5. In particular, the scanning beam emitted through the bottom window 5 is upwardly directed. When the bar code 8 in a state as represented by the position B is scanned, therefore, it becomes more probable that the beam reflected from the bar code 8 is incident upon the bottom window 5.

As described above, the bar code 8 of the article 9 passing the bar code reader 1 is scanned by the scanning beams from different directions. Therefore, the bar code 8 can be read out unless the bar code 8 is located at a position C where it faces neither the side window 4 nor the bottom window 5, and is not irradiated by the scanning beam.

FIG. 5 illustrates an outer size of the bar code reader 1 of FIG. 2A. The bar code reader 1 has a width W of about 292 mm and a height H of about 247 mm. Moreover, the bar code reader 1 has a depth D of about 508 (or 430 mm), and a height Hi of about 120 mm from the bottom surface to the counter surface 12. The bar code reader 1 may have a depth D that meets the width of the accounting counter on which the bar code reader 1 is installed.

Figure 6:
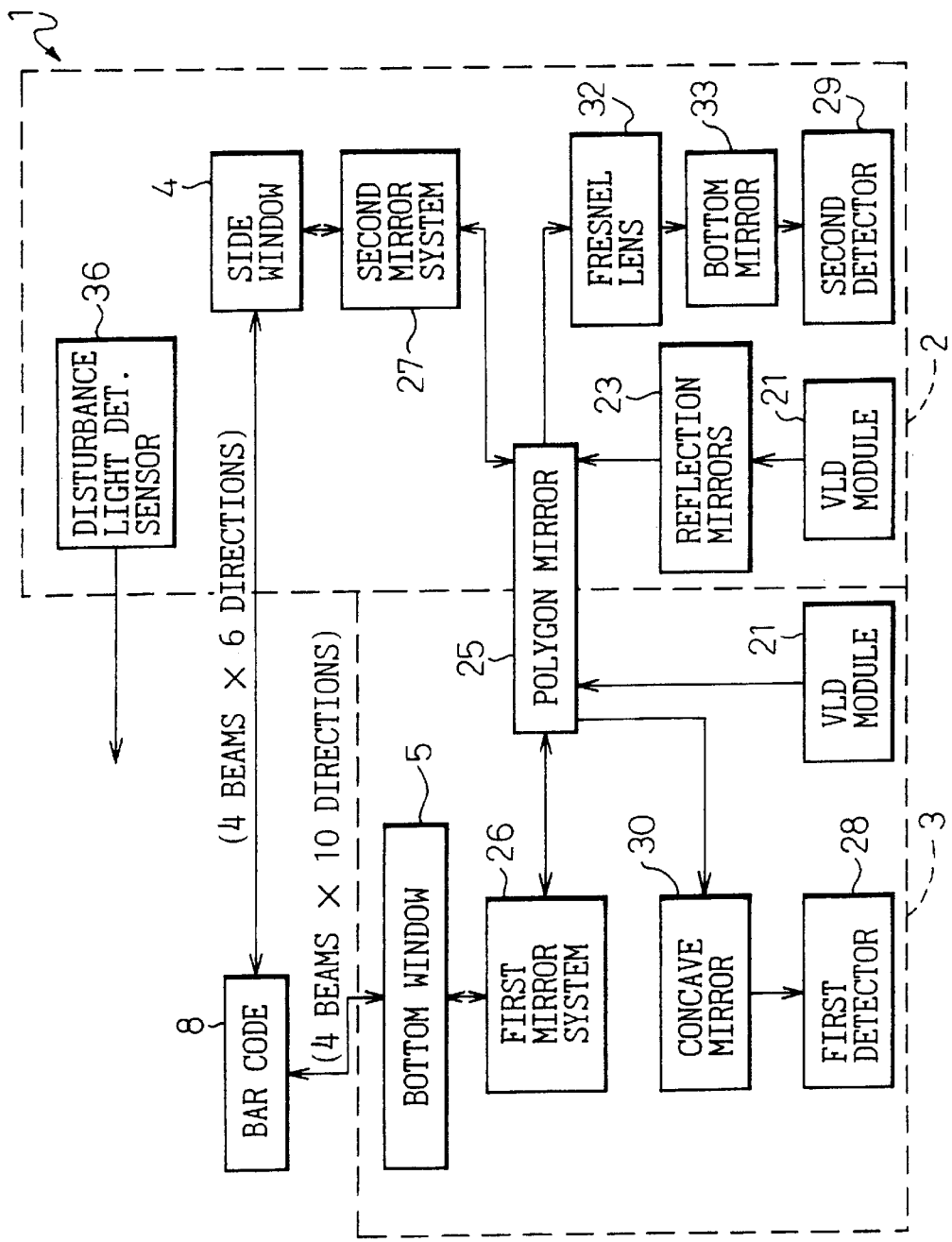
FIG. 6 is a block diagram illustrating an optical system of the bar code reader of FIG. 2A.

FIG. 6 is a diagram illustrating the optical system in the bar code reader 1. In FIG. 6, arrows represent passages of laser beams, and the directions of arrows represent the directions in which the laser beams are emitted. In FIG. 6, the internal constitution of the bar code reader 1 is drawn as divided into the side scanner portion 2 and the bottom scanner portion 3. In practice, the VLD module 21 is shared but is drawn being divided in FIG. 6 for the sake of convenience. The VLD module 21 in the side scanner portion 2 will include the half-mirror.

In the bottom scanner portion 3, the laser beam emitted from the VLD module 21 falls on the polygon mirror 25, and is reflected by the reflection plane of the polygon mirror 25. Thereafter, the laser beam is reflected by the first mirror system 26 and is projected to the bar code 8 through the bottom window 5. The bottom window 5 is constituted by two pieces of glass plate and prevents water or the like from entering into the bar code reader 1.

The glass plate is composed of a sapphire glass or the like glass having a high hardness. If the glass surfaces are scratched and fouled being contacted by the articles, the laser beam may pass through in decreased amounts. Of the two glass plates constituting the bottom window 5, therefore, the lower glass plate which is less likely to be contacted by the articles is secured to the device, and the upper glass plate which is very likely to be contacted by the articles is allowed to be renewed as required. Therefore, the upper glass plate that is scratched can be renewed, and a drop in the performance for reading bar codes, that stems from the reduction in the amount of the laser beam passing through the bottom window 5, is avoided. The lower glass plate which is little likely to be contacted by the articles is less likely to be scratched on its surfaces than the upper glass plate. Therefore, the lower glass plate need not be composed of a hard and expensive glass such as sapphire glass.

Though the details will be described later, scanning patterns are emitted in a total of ten directions from the bottom scanner portion 3, the scanning pattern in each direction consisting of four scanning lines. The scanning patterns are emitted in ten directions after every revolution of the polygon mirror 25, and the bar code is scanned by a total of 40 scanning lines. The four scanning lines constituting each scanning pattern corresponded to each reflection plane of the polygon mirror 25.

The beam reflected by the bar code 8 is incident on the first mirror system through the bottom window 5 and is reflected toward the polygon mirror 25. Thereafter, the beam reflected by the bar code 8 is reflected by the reflection plane of the polygon mirror 25 and is focused and reflected by the concave mirror 30 toward the first detector 28. A pin-photodiode can be used as the first detector 28.

In the side scanner portion 2, on the other hand, the laser beam emitted from the VLD module 21 and reflected by the half-mirror is reflected by a plurality of reflection mirrors 23, and is guided to the polygon mirror 25. The scanning beam reflected by the reflection plane of the polygon mirror 25 is reflected by the second mirror system 27, and is emitted through the side window 4 to scan the bar code 8. Like the bottom window 5, the side window 4 is constituted by two pieces of window glasses. In reading the bar code 8, the article 9 is less likely to come into contact with the side window 4. Therefore, the glass plate used for the side window 4 may be an ordinary glass instead of a hard glass.

Scanning patterns are emitted in six directions through the side window 4, the scanning pattern in each direction consisting of four scanning lines; i.e., a total of 24 scanning lines are emitted. This will be described later in detail.

The beam reflected by the bar code 8 is incident on the bar code reader 1 through the side window 4, reflected by the second mirror system 27 and by the reflection plane of the polygon mirror 25, and is focused by the Fresnel lens 32. The beam is then reflected by the bottom mirror 33 and is received by the second detector 29. A pin-photodiode can be used as the second detector 29. The constitution of a combination of the Fresnel lens 32 and the bottom mirror 33 may be substituted by a concave mirror having a function for focusing light.

A disturbance light sensor 36 shown in FIG. 6 detects a change in the amount of light around the bar code reader 1, controls the operation of the bar code reader 1 based upon the result thereof, and controls the turn-on of the VLD module 21.

Arrangement of the optical system in the bar code reader 1 will be described in further detail.

FIG. 7 illustrates a state where an upper cover and a lower cover are removed from the bottom scanner portion 3 of the bar code reader 1. Reference numeral 5B denotes the lower glass plate of the two glass plates constituting the bottom window 5. In FIG. 7, reference numeral 41 denotes a lower frame, 41F denotes a flange portion of the lower frame 41, reference numeral 42 denotes an upper frame, 42F denotes a flange portion of the upper frame 42, and reference numeral 43 denotes a cover portion of the side scanner portion 2. The lower frame 41 and the upper frame 42 are divided up and down at the positions of flange portions 41F and 42F. Mirrors constituting the bottom scanner portion 3 are mounted on the inner wall surfaces of the lower frame 41 and of the upper frame 42.

Figure 8A:
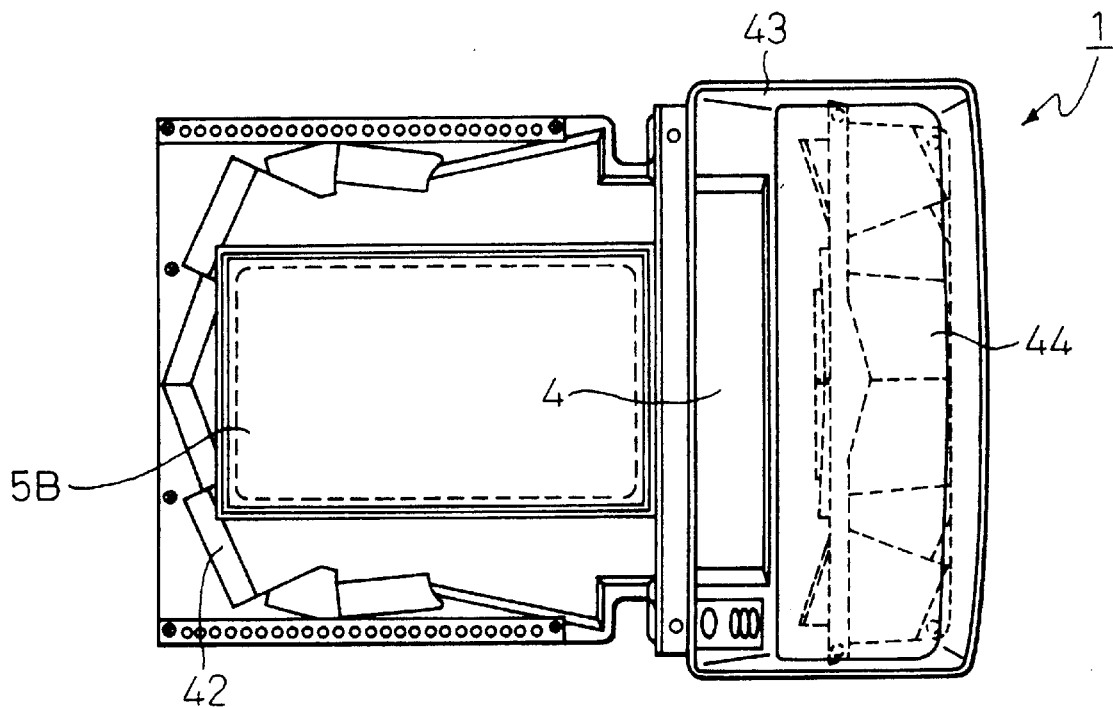
FIG. 8A is a plan view of the bar code reader of FIG. 7.
Figure 8B:
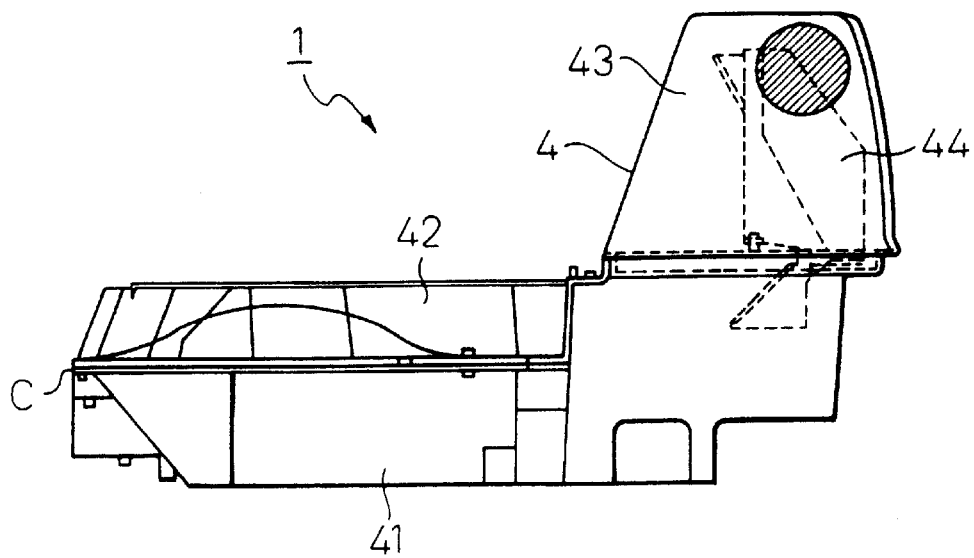
FIG. 8B is a side view of the bar code reader of FIG. 7.

FIGS. 8A and 8B are a plan view and a side view of the bar code reader 1 shown in FIG. 7. The cover portion 43 in which the side window 4 is provided can be divided from the lower frame 41 of the bar code reader 1. Inside the cover portion 43 is provided a mirror frame 44 to which is stuck a mirror that constitutes a portion of the second mirror system 27.

FIG. 9 illustrates a state where the lower frame 41 only is removed from the bar code reader 1 shown in FIG. 7. The polygon mirror is disposed nearly at the central portion of the lower frame 41. FIG. 9 shows a plate 51 for installing the polygon mirror but does not show the polygon mirror. A gap 52 is formed under the plate 51 to permit the passage of a laser beam from the reflection mirror 23 to the reflection mirror 24. On the lower frame 41 are mounted a total of nine mirrors for constituting the first mirror system 26 or the second mirror system 27. Among them, ZB2, VBRR, VBLL, HBR2, HBL2, ZML2 and ZMR2 are mirrors constituting the first mirror system 26. Mirrors VSR1 and VSL1 constitute a portion of the second mirror system 27.

The mirrors ZMR2 and ZML2 are mounted on the side surface of the lower frame 41 and extend along the lengthwise direction of the lower frame 41. The mirror ZB2 is so disposed that its reflection plane is upwardly directed. The angle of the reflection plane of the mirror ZB2 can be suitably adjusted. The mirrors VBRR and VBLL are arranged on the surfaces of the lower frame 41 most remote from the side scanner portion, with their reflection planes being tilted slightly upwardly so as to face the polygon mirror.

The mirrors VSR1 and VSL1 are mounted on the side surfaces of the lower frame 41 with their reflection planes being slightly tilted upward.

Reference numeral 53 denotes a printed board, and a second detector 29 is mounted on a portion thereof. The printed board 53 is mounted on the lower frame 41 such that the light-receiving surface of the second detector 29 is downwardly tilted. This arrangement makes it possible to reduce the depth of the device.

The Fresnel lens 32 is mounted in a tilted manner between the printed board 53 and the polygon mirror. Furthermore, the reflection mirror 24 is provided in front of the Fresnel lens 32 and on the optical axis thereof.

The VLD module is held under the lower surface of the mirror ZB2, and a laser beam is emitted from this position. The reflection mirror 23 is mounted at the back of the mirror ZB2 to reflect the laser beam passing through a gap between the mirror ZB2 and the lower frame 41 toward the reflection mirror 24.

The first detector 28 is provided on the lower surface of the device. The light-receiving surface of the first detector 28 faces the side of the reflection mirror 23, and an opening 54 is formed on the front side of the light-receiving surface of the first detector 28 to guide the laser beam reflected by the concave mirror 30 toward the first detector 28. The opening 54 has a V-shape to meet an optical passage in which the reflected beam is focused by the concave mirror 30. The first detector 28 is mounted on a printed board 55.

Figure 10A:
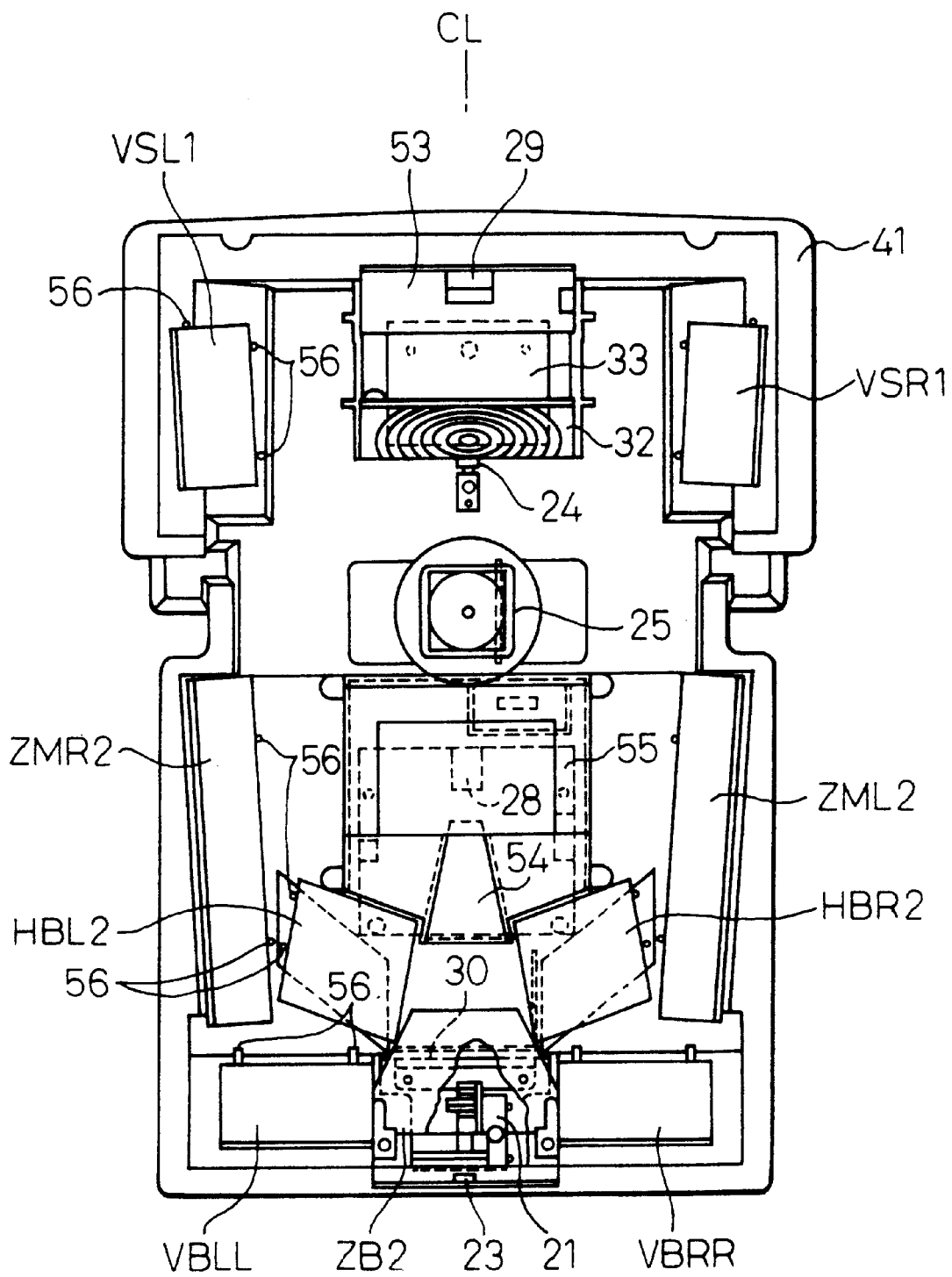
FIG. 10A is a plan view of the lower frame of FIG. 9.

FIG. 10A illustrates the lower frame 41 that is viewed from the upper side, and FIG. 11 is a side sectional view of the lower frame 41.

As shown in FIG. 10A or 11, the polygon mirror 25 has an axis of rotation 25' and is provided nearly at the center of the lower frame 41 but closer to the side scanner portion. At the back of the Fresnel lens 32 is provided the bottom mirror 33 with its reflection plane being upwardly faced. The first detector 28 is mounted on the bottom surface of the lower frame 41. The first detector 28 is mounted on the printed board 55. The opening 54 of nearly a V-shape is formed on the side of the light-receiving surface of the first detector 28, and the beam reflected by the concave mirror 30 is incident on the first detector 28 through the opening 54.

The VLD module 21, reflection mirrors 23, 24, Fresnel lens 32, polygon mirror 25, first detector 28, second detector 29 and concave mirror 30 are arranged in the lower frame 41 along the center line CL (that is, in a specified plane defined by the centerline CL in FIG. 10A) in such a manner that the optical axes of the rays of light are in agreement. The VLD module 21 and concave mirror 30 are arranged under the mirror ZB2. In FIG. 10A, the mirror ZB2 has been partly cut away so that the arrangement of the VLD module 21 can be seen.

Referring to FIG. 11, the first detector 28 is disposed on the bottom surface of the lower frame 41 and odes not intercept the passage of beam emitted from the VLD module 21 or of the beam reflected by the bar code. The mirror ZB2 is mounted being slightly tilted. The reflection mirrors 23 and 24 are attached to the ends of slender frames and will not to intercept the passages of the beams.

Protrusions 56 are formed on the bottom surfaces and on the side surfaces of the mirrors to define the positions and angles of the mirrors. The mirrors mounted on lower frame are secured by being abutted to the protrusions 56. Thus, the mirrors are mounted on the lower frame 41 facing predetermined directions at predetermined angles.

In the embodiment shown in FIG. 10A, the first detector 28 is arranged in the lower frame 41 along the center line CL. As shown in FIG. 10B, however, the first detector 28 may be disposed in the lower frame 41 at a position deviated from the center line CL. In this case, the concave mirror 30 must be so arranged that it is tilted at a direction perpendicular to the center line CL of the lower frame 41, so that the beam reflected by the concave mirror 30 is focused to the first detector 28.

The constitution of the lower frame 41 shown in FIG. 10B is quite the same as the constitution of the lower frame 41 described with reference to FIG. 10A except the position of the first detector 28 and the direction of the concave mirror 30, and the same constituent members are denoted by the same reference numerals but their description is not repeated.

Figure 12:
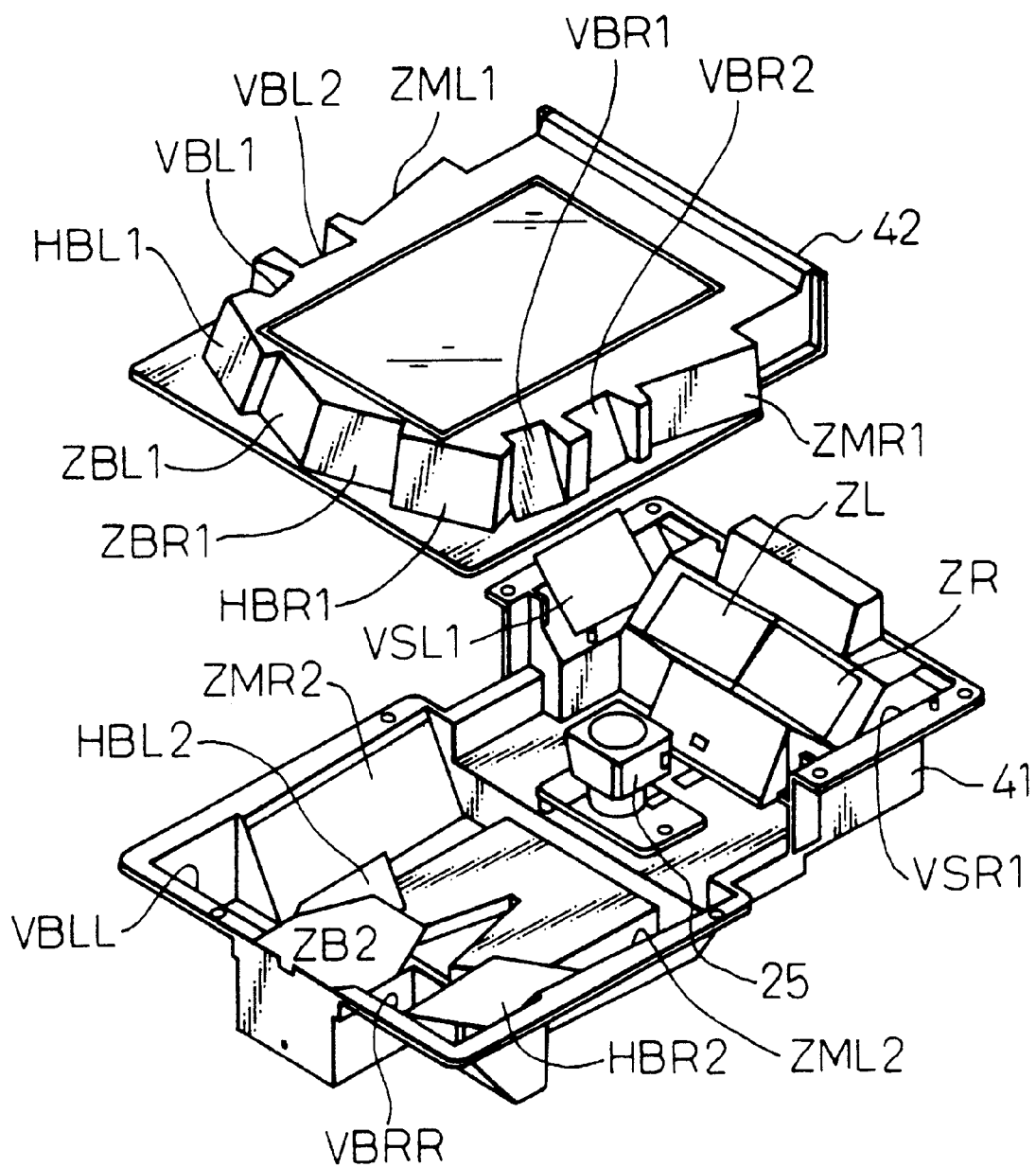
FIG. 12 is a perspective view of a state where the upper frame and the lower frame are removed from the bar code reader of FIG. 7.

FIG. 12 illustrates the lower frame 41 of the device and the upper frame 42 placed thereon. The mirrors are stuck to the inside of the upper frame 42. The upper frame 42 is provided with a total of ten mirrors ZBR1, ZBL1, HBR1, HBL1, VBR1, VBL1, VBR2, VBL2, ZMR1, ZML1. These mirrors constitute a portion of the first mirror system 26. These mirrors are disposed with their reflection planes being faced slightly downwardly and being faced to the mirrors that are mounted on the lower frame 41 to constitute the bottom scanner portion.

FIGS. 13A to 13D illustrate the mirror frame 44 mounted inside the cover portion 43 of the side scanner portion 2 as viewed from the upper direction, front direction, bottom direction and side direction. On the inside of the mirror frame 44 are mounted a total of eight mirrors ZHR, ZHL, ZRR, ZLL, VSR2, VSL2, ZR, ZL. These eight mirrors constitute a portion of the second mirror system 27. In the side view of FIG. 13D, the left side corresponds to the side where the operator stands or to the side of the side window. Among the eight mirrors, the reflection planes of the mirrors ZR and ZL are tilted upward, and the reflection planes of the remaining six mirrors are tilted slightly downward. The reflection planes of the six mirrors other than the mirrors ZR and ZL are so disposed as to be directed toward predetermined positions on the outside of the side scanner portion 2.

Figure 14:
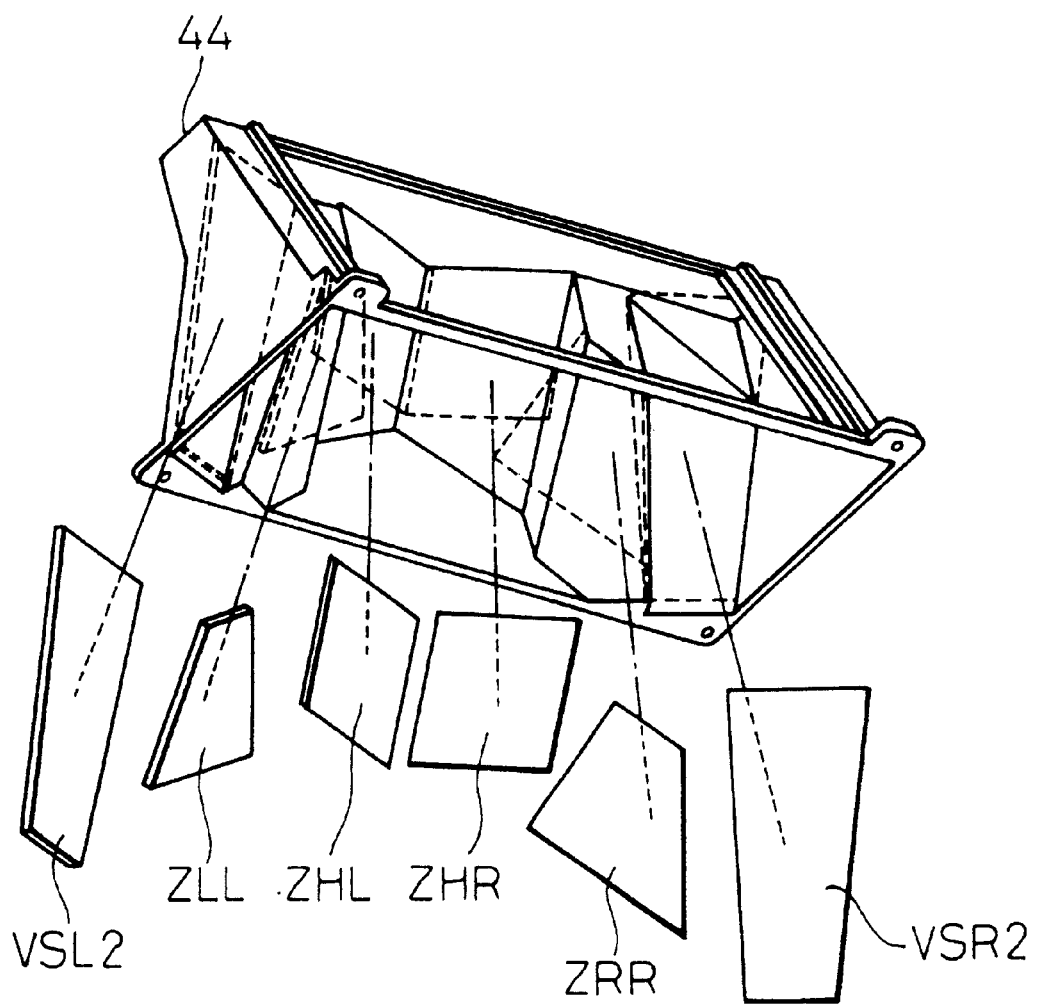
FIG. 14 is a perspective view of an assembly illustrating the constitution of the mirror mounted on the mirror frame.

FIG. 14 is a diagram illustrating the shapes of the upper six mirrors VSL2, ZLL, ZHL, ZHR, ZRR, VSR2 among the mirrors mounted on the mirror frame 44 and their rough positions of mounting. These six mirrors are mounted on the mounting surfaces on the inside of the mirror frame 44 using an adhesive or the like.

Figure 15:
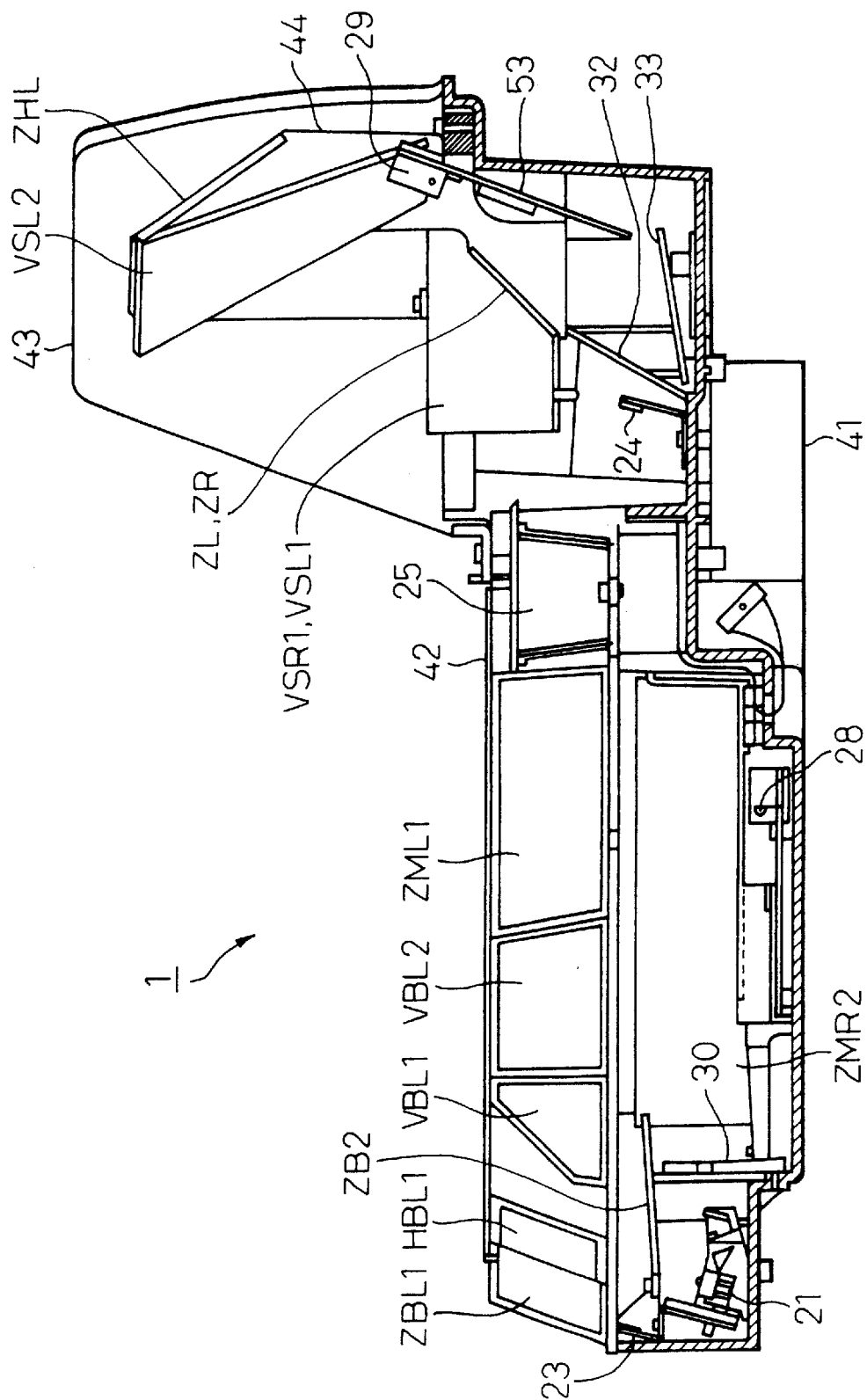
FIG. 15 is a side sectional view illustrating the constitution of an internal optical system of the bar code reader of FIG. 7.

FIG. 15 is a side sectional view of the bar code reader 1 in a state where the lower frame 41, upper frame 42, cover portion 43 and mirror frame 44 are assembled. The mirrors mounted on the upper frame 42 have reflection planes that are faced slightly downwardly, and the beams reflected by the mirrors mounted on the upper frame 42 are incident on the mirrors mounted on the lower frame 41. The height of the positions of the reflection planes of the mirrors ZR, ZL mounted on the mirror frame 44 is nearly the same as the height of the positions of the reflection planes of the mirrors VSR1, VSL1 mounted on the lower frame 41.

In FIG. 15, the second detector 29 is so disposed that the light-receiving surface thereof is downwardly faced, and the printed board 53 is disposed to be nearly perpendicular to the bar code reader 1 to meet therewith. This arrangement makes it possible to decrease the depth of the bar code reader 1 compared with that of when the printed board 53 is horizontally arranged. Furthermore, the Fresnel lens 32 and the bottom mirror 33 that guide the beam reflected by the bar code to the second detector 29 are provided at positions where they will not intercept the passages of scanning beams that are reflected by the polygon mirror 25 toward the mirrors VSL1, ZL, etc.

Figure 16:
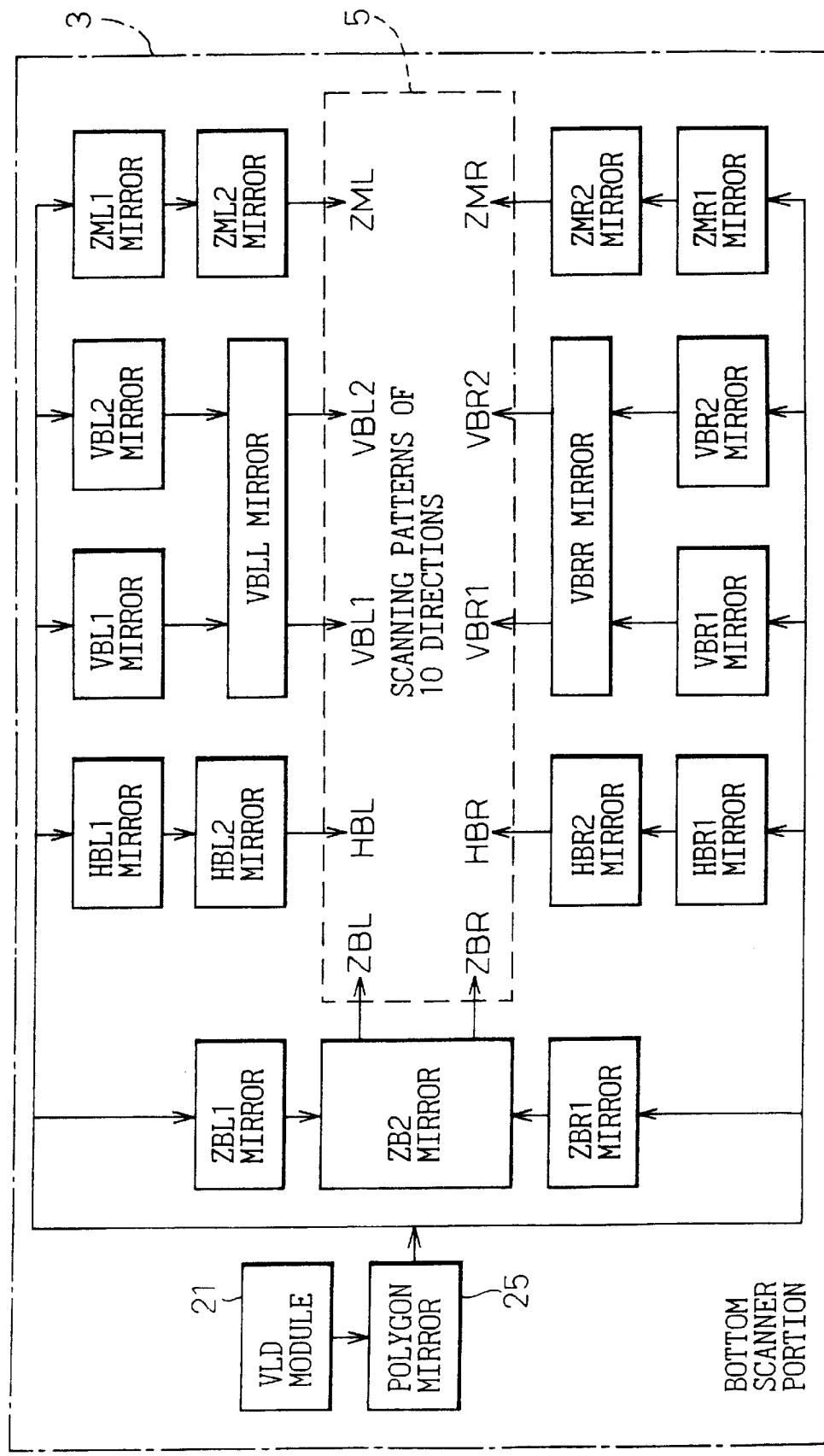
FIG. 16 is a block diagram illustrating the passages of scanning beams inside the bottom scanner portion.
Figure 17:
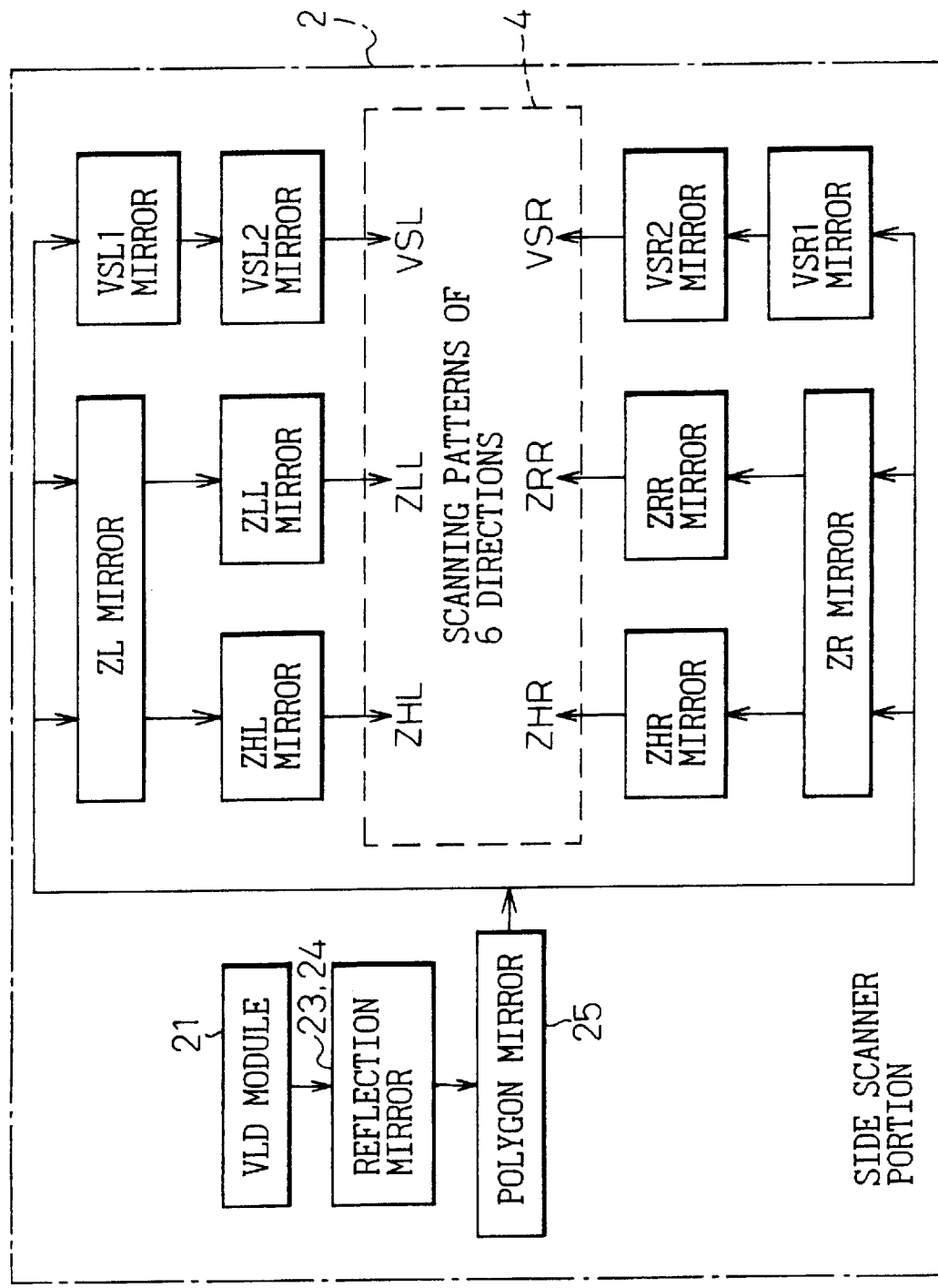
FIG. 17 is a block diagram illustrating the passages of scanning beams inside the side scanner portion.

FIG. 16 is a diagram schematically illustrating the passages of the scanning beams emitted from the bottom scanner portion 3 through the bottom window 5, and FIG. 17 is a diagram schematically illustrating the passages of the scanning beams emitted from the side scanner portion 2 through the side window 4.

In the case of the bottom scanner portion 3 shown in FIG. 16, the laser beam emitted from the VLD module 21 and reflected by the reflection plane of the polygon mirror 25 is scanned by the mirrors ZBR1, ZBL1, HBR1, HBL1, VBR1, VBL1, VBR2, VBL2, ZMR1, ZML1 mounted on the upper frame 42. When the polygon mirror 25 rotates in the clockwise direction, the scanning is effected in the order of mirrors ZMR1, VBR2, VBR1, HBR1, ZBR1, ZBL1, HBL1, VBL1, VBL2 and ZML1.

Next, the beam reflected by the mirrors on the inside of the upper frame 42 is projected onto the mirrors mounted in the lower frame 41.

The scanning beam reflected by the mirror ZMR1 is upwardly reflected by the mirror ZMR2 and is emitted as a scanning pattern ZMR through the bottom window 5. The scanning beams reflected by the mirrors VBR2 and VBR1 are upwardly reflected by the mirror VBRR and are emitted as scanning patterns VBR2, VBR1 through the bottom window 5. The scanning beam incident on the mirror VBRR due to the mirror VBR2 and the scanning beam incident on the mirror VBRR due to the mirror VBR1 have different positions of incidence and different angles, and are emitted through the bottom window 5 as scanning beams having different directions and angles.

The scanning beam reflected by the mirror HBR1 is upwardly reflected by the mirror HBR2 and is emitted as a scanning pattern HBR through the bottom window 5. The scanning beam reflected by the mirror ZBR1 is upwardly reflected by the mirror ZB2 and is emitted as a scanning pattern ZBR through the bottom window 5. The same holds even in the case of the mirrors ZBL1, HBL1, VBL1, VBL2 and ZML1. The scanning beam reflected by the mirror ZBL1 is upwardly reflected by the mirror ZB2 and is emitted as a scanning pattern ZBL. The scanning beam reflected by the mirror HBL1 is upwardly reflected by the mirror HBL2 and is emitted as a scanning pattern HBL. The scanning beams reflected by the mirrors VBL1 and VBL2 are upwardly reflected by the mirror VBLL to form scanning patterns VBL1 and VBL2. Then, the scanning beam reflected by the mirror ZML1 is upwardly reflected by the mirror ZML2 and is emitted as a scanning pattern ZML thereby to end a scanning cycle.

Here, as shown in FIG. 12, the scanning beam reflected by the mirror ZML1 reaches the mirror ZML2 traversing the inside of the bottom scanner portion 3. Thus, since the scanning beam partly traverses the inside of the bottom scanner portion 3, obstacles must be removed from the inside of the bottom scanner 3 to form space that will not intercept the scanning beams.

In the bar code reader 1 of this embodiment, therefore, the VLD module 21, concave mirror 30 and the like are placed at the ends of the device as shown in FIG. 15, and the first detector 28 is mounted on the bottom surface of the device. Furthermore, the polygon mirror 25 is mounted on a position where it will not intercept space inside the bottom scanner portion 3.

The mirrors constituting the bottom scanner portion 3 are mounted on the wall surfaces on the inside of the lower frame 41 and the upper frame 42 that are split into up and down. Therefore, there is no need to provide a structure for arranging the mirrors in space inside the bottom scanner portion 3. With the mirrors being arranged as described above, space inside the bottom scanner portion 3 can be effectively utilized.

In the side scanner portion 2 shown in FIG. 17, on the other hand, the scanning beam emitted from the VLD module 21 and reflected by the reflection mirrors 23, 24 and by the polygon mirror 25, first, falls on the mirrors VSR1 and VSL1 mounted on the lower frame 41 and on the mirrors ZR and ZL mounted on the mirror frame 44. The scanning is effected in the order of mirrors VSL1, ZL, ZR, VSR1.

The scanning beam reflected by these mirrors is then reflected by six mirrors of the upper side mounted on the mirror frame 44. First, the scanning beam reflected by the mirror VSL1 is reflected nearly in the horizontal direction by the mirror VSL2 and is emitted as a scanning pattern VSL through the side window 4. The scanning beam reflected by the mirror ZL falls on the mirror ZLL and is emitted as a scanning pattern ZLL through the side window 4. Then, the scanning beam reflected by the mirror ZL is reflected by the mirror ZHL, and is emitted as a scanning pattern ZHL through the side window 4.

Next, the scanning beam reflected by the mirror ZR is first reflected by the mirror ZHR and is emitted as a scanning pattern ZHR through the side window 4. Next, the scanning beam reflected by the mirror ZR is reflected by the mirror ZRR, and is emitted as a scanning pattern ZRR through the side window 4. Finally, the scanning beam reflected by the mirror VSR1 is reflected by the mirror VSR2, and is emitted as a scanning pattern VSR through the side window 4. Thus, a scanning cycle ends.

Figure 18:
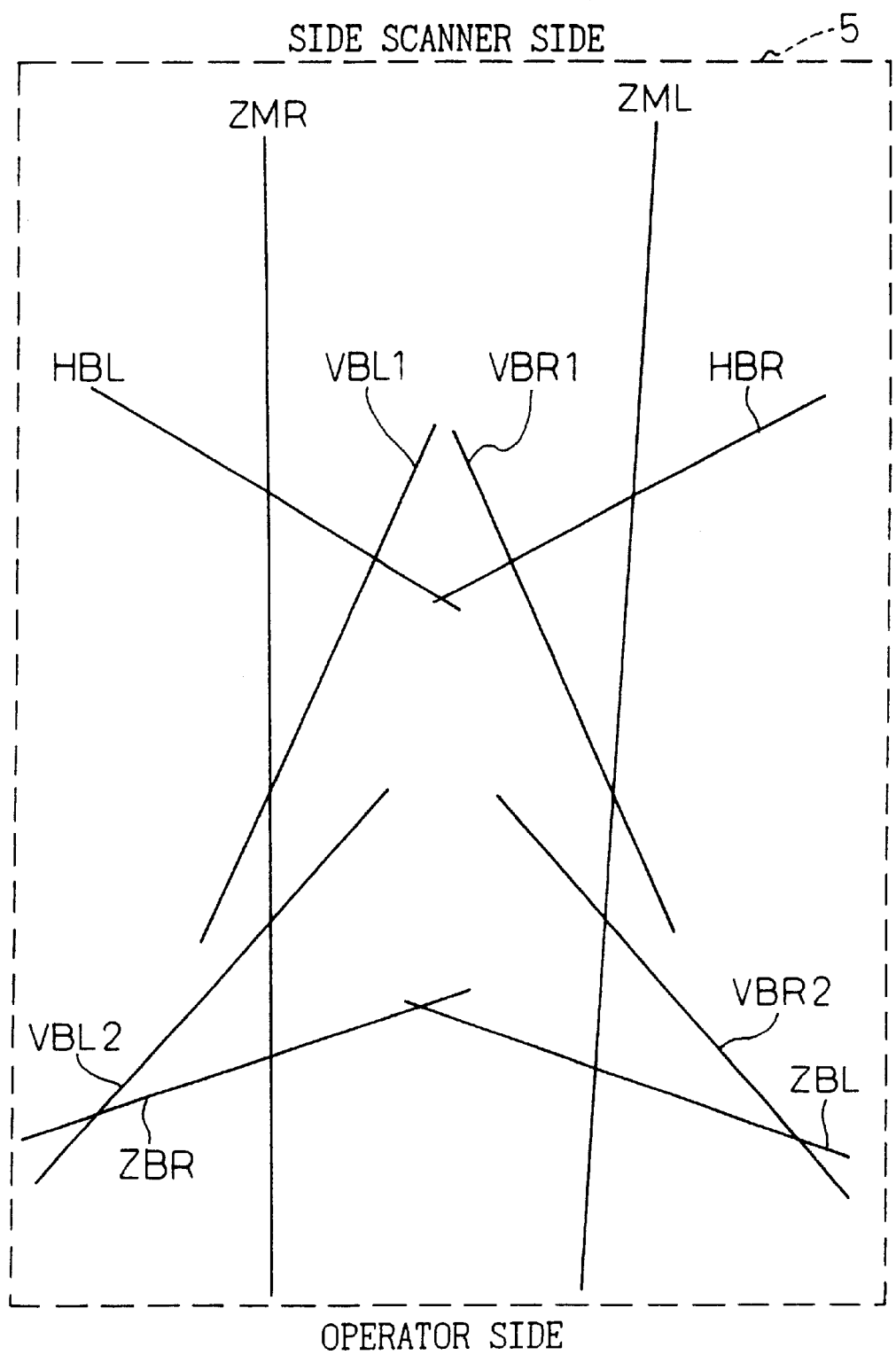
FIG. 18 is a diagram illustrating scanning patterns reflected by one plane of a polygon mirror and is emitted through the bottom window.
Figure 19:
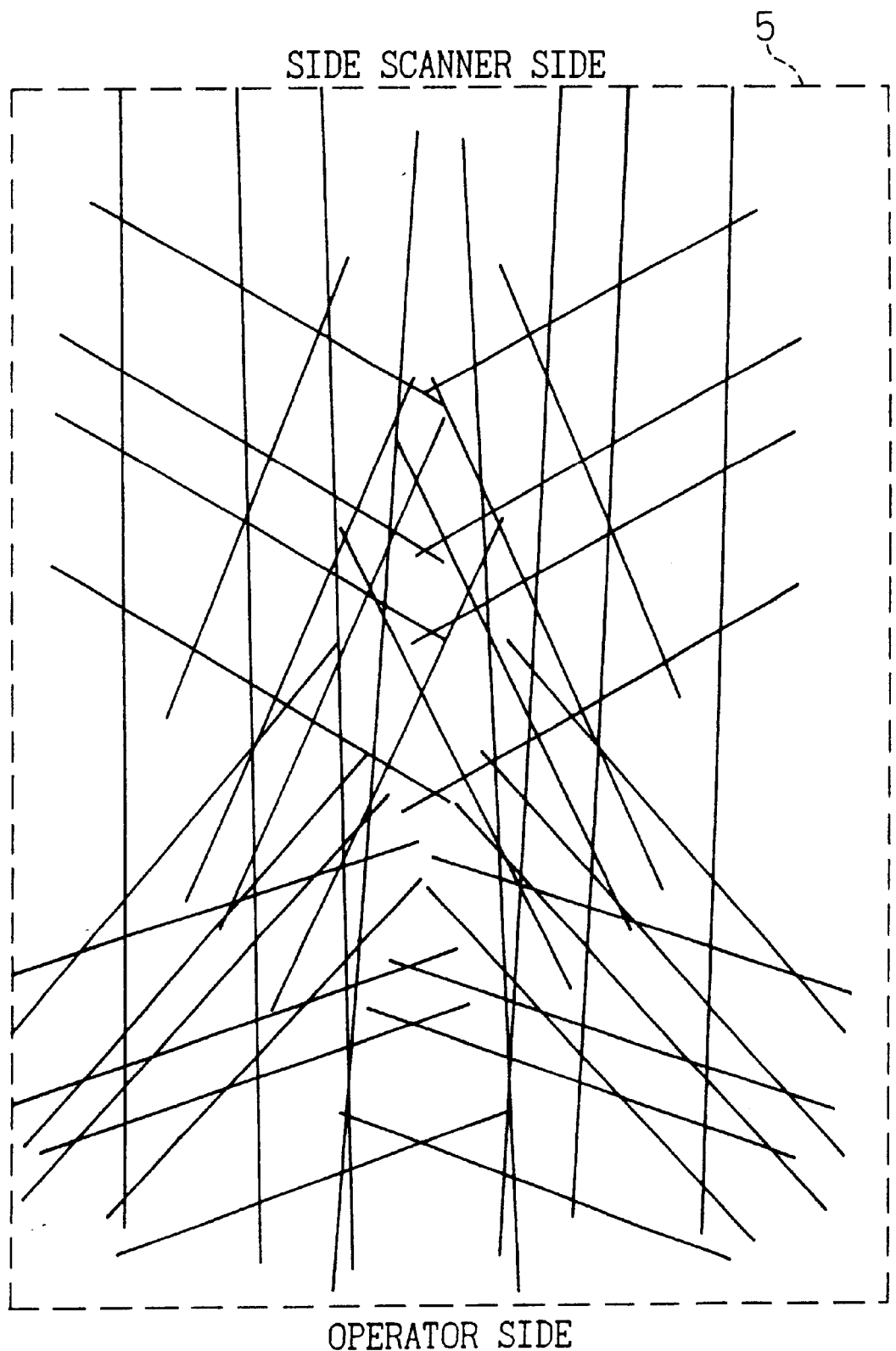
FIG. 19 is a diagram illustrating the whole scanning patterns emitted through the bottom window.

FIG. 18 is a diagram illustrating loci of scanning patterns in ten directions shown in FIG. 16 on the bottom window 5. There are shown loci of scanning patterns reflected by one plane of the polygon mirror 25. FIG. 19 is a diagram illustrating all the scanning patterns reflected by all planes of the polygon mirror 25 and emitted through the bottom window 5. As described already, a total of 40 scanning lines are emitted through the bottom window 5. The forty scanning lines are grouped into ten groups each consisting of four scanning lines.

Two scanning patterns ZMR and ZML shown in FIG. 18 are nearly perpendicular to the operator and extend over nearly the whole region of the bottom window 5 in the lengthwise direction. Therefore, the article of which the bar code is to be read out is scanned by at least the scanning patterns ZMR and ZML irrespective of where it may pass on the bottom window 5.

The remaining eight scanning patterns describe loci that are slightly tilted upwardly to intersect the scanning patterns ZMR and ZML. By emitting the scanning patterns shown in FIGS. 18 and 19, the scanning lines that constitute any scanning pattern scan the bar code irrespective of whether the bar code may pass on the bar code reader 1 at dissimilar angles, contributing to enhancing the ability for reading the bar code.

Here, symbols attached to the scanning patterns correspond to the mirror names constituting the first mirror system 26 as described with reference to FIG. 16, and these scanning patterns are reflected by the mirrors having the corresponding names.

Moreover, the reflection planes of the polygon mirror have different angles. Therefore, the scanning patterns emitted through the bottom window 5 and corresponding to such reflection planes have four scanning lines which are nearly in parallel and scan the positions separated by a predetermined distance depending upon the angles of the reflection planes of the polygon mirror. Thus, a scanning pattern is constituted by a plurality of scanning lines that are separated by a predetermined distance. Therefore, the probability of scanning the bar code by the scanning lines is enhanced, contributing to further enhance the ability for reading the bar code.

FIG. 20 is a diagram illustrating scanning patterns emitted through the side window 4. Through the side window 4 are emitted six scanning patterns VSR, VSL, ZRR, ZLL, ZHR, ZHL each consisting of four scanning lines that are nearly in parallel and are spaced apart by a predetermined distance. The names of these scanning patterns correspond to the names of the mirrors constituting the side scanner portion 2 as described with reference to FIG. 17, and represent scanning patterns reflected by the mirrors having the same names as in the case of FIG. 18. The four scanning lines in a scanning pattern are defined for their scanning positions depending upon the angle of the reflection plane of the polygon mirror 25 as in the case of the scanning pattern emitted through the bottom window 5.

The scanning patterns of FIG. 20 are the patterns emitted through the side window 4. As described above, six mirrors other than the mirrors ZR, ZL mounted on the mirror frame 44 are so arranged that their reflection planes are directed to predetermined positions on the outside of the side scanner portion 2. Therefore, the scanning patterns approach each other as they separate from the side window 4. The six scanning patterns approach most at a position which is most suited for reading the bar code, and it becomes most probable at this position that the bar code passing on the bar code reader is scanned by the side patterns.

The scanning patterns emitted through the bottom window 5 as well as the scanning patterns emitted through the side window 4, are symmetrically arranged on the right and left sides with respect to the center lines. Since every bottom pattern and every side pattern have directions and angles that are different by small amounts, it becomes very probable that the bar code is traversed by at least one of the scanning lines.

FIGS. 21A to 21D illustrate scanning patterns of either side only among the scanning patterns (bottom patterns) emitted through the bottom window 5 and the scanning patterns (side patterns) emitted through the side window 4. As described above, the right and left scanning patterns emitted through the side window 4 and the bottom window 5 are symmetrical relative to the center lines. The scanning patterns of the other side are just the same as the scanning patterns shown in FIGS. 21A to 21D turned around.

FIG. 21A illustrates scanning patterns VBL1 and VBL2 among the bottom patterns. The scanning pattern VBL1 describes scanning loci that rise slightly toward the right at positions close to the side window 4. The scanning pattern VBL2 describe scanning loci that rise slightly toward the right like the scanning pattern VSL1 but at a position closer to the operator than that of the scanning pattern VBL1. FIG. 21B illustrates the scanning pattern ZML describing loci which traverse the bottom window 5 nearly in the lengthwise direction thereof. Therefore, irrespective of where the article may pass on the bottom window 5, the article is scanned by at least the scanning pattern ZML.

FIGS. 21C illustrates scanning patterns HBL and ZBL. The scanning pattern HBL describes scanning loci slightly rising toward the left at positions close to the side scanner on the left side of the bottom window 5. The scanning pattern ZBL, on the other hand, describes scanning loci slightly rising toward the left at positions close to the operator on the right side of the bottom window 5.

FIG. 21D illustrates left side patterns among the scanning patterns emitted through the side window 4. The scanning pattern VSL extend in the vertical direction of the side window 4 and describes scanning loci that slightly rise toward the left. The scanning pattern ZLL describes scanning loci that rise toward the right. The scanning pattern ZHL describes scanning loci that slightly rise toward the right on the upper side nearly at the center of the side window 4.

Upon generating the above-mentioned scanning patterns, the article passing on the bar code reader is irradiated with a total of 64 scanning lines from two directions after every turn of the polygon mirror 25. As the article is scanned by an increased number of scanning lines from different directions and at different angles, it becomes more probable that the bar code surface is scanned by the scanning line, and reading the bar code becomes correspondingly more successful.

FIG. 22 is a diagram illustrating the loci of a laser beam emitted from the VLD module 21 in the bar code reader 1. The VLD module 21 has the prism 61 for changing the out-going angle of the laser beam and for changing the diameter of the beam, and the half-mirror 22 for splitting the laser beam into two.

The laser beam that has passed through the prism 61 and the half-mirror 22 is emitted slightly upwardly, passes through the hole 31 formed in the center of the concave mirror 30, and falls on the polygon mirror 25. The laser beam in the bottom scanner portion 3 reflected by the polygon mirror 25 is incident on the mirror ZBL1 mounted on the upper frame 42 and is reflected so as to be once folded back downwardly by the mirror ZBL1, and falls on the mirror ZB2 mounted on the lower frame 41. The mirror ZB2 reflects the scanning beam that is incident thereon toward an upwardly tilted direction. Therefore, a scanning beam forming the scanning pattern ZBL is emitted through the bottom window 5.

On the other hand, the laser beam that has passed through the prism 61 and is reflected by the half-mirror 22 falls on the reflection mirror 23 passing through space under the mirror ZB2, reflected by the reflection mirror 23, and falls on the reflection mirror 24 passing through a gap 52 under the plate 51 on which the polygon mirror 25 is installed. The laser beam reflected by the reflection mirror 23 toward the reflection mirror 24 is emitted nearly in a horizontal direction.

The reflection mirror 24 reflects the laser beam that is incident thereon toward an upwardly tilted direction so that it will fall on the polygon mirror 25. The laser beam incident on the polygon mirror 25 is reflected, and is further upwardly reflected by the mirror VSL1 mounted on the lower frame 41 or by the mirror ZL mounted on the mirror frame 44, and is emitted through the side window 4 nearly in the horizontal direction due to other six mirrors mounted on the mirror frame 44.

In the case of FIG. 22, for example, the scanning beam reflected by the polygon mirror 25 is incident on the mirror ZL and is reflected upwardly (nearly in a vertical direction). Thereafter, the scanning beam falls on the mirror ZHL mounted on the mirror frame 44 and is reflected in the horizontal direction so as to form the scanning pattern ZHL.

Figure 23:
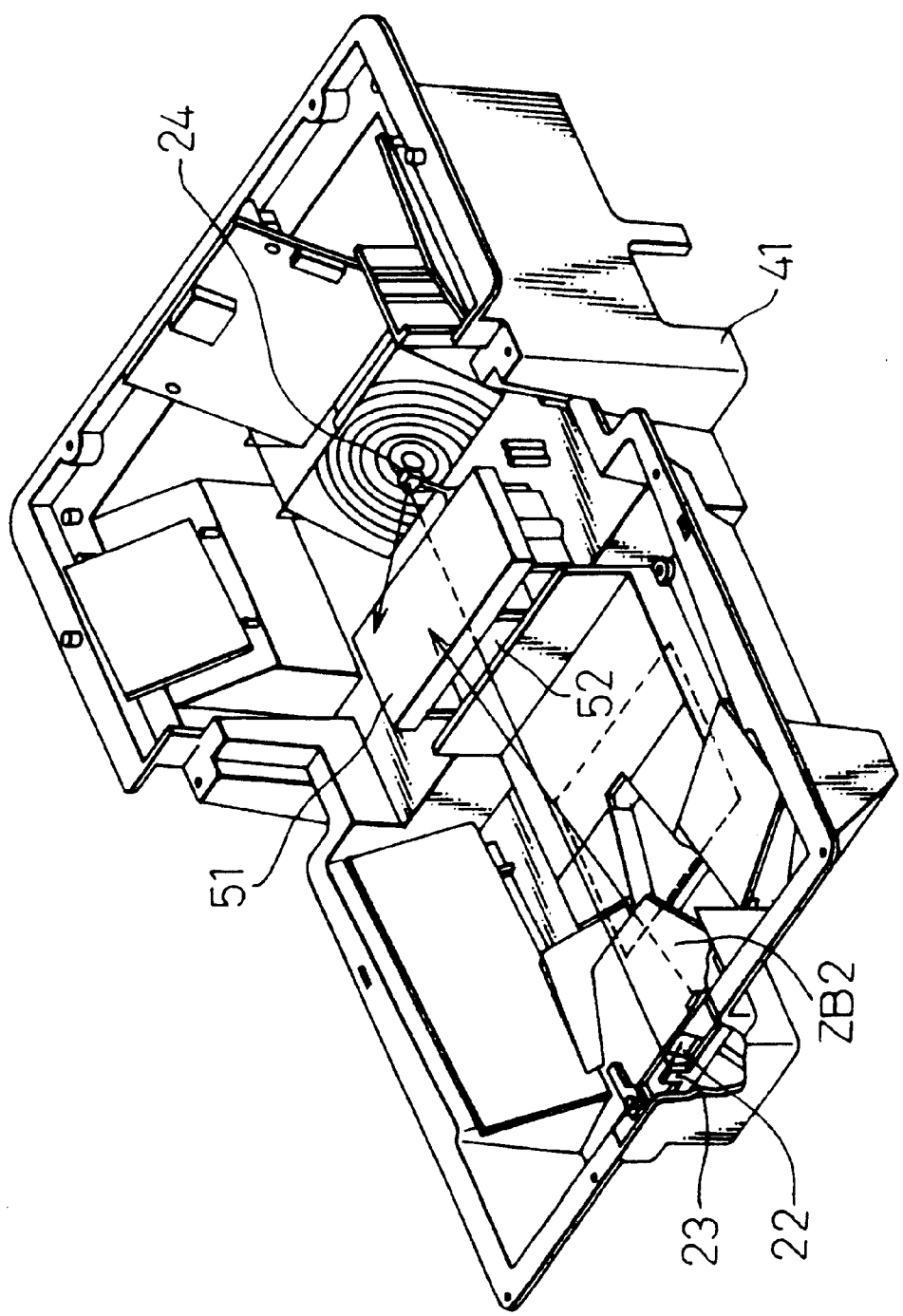
FIG. 23 is a perspective view illustrating the passages of rays of light until the laser beam emitted from the VLD module is reflected by the polygon mirror.

FIG. 23 is a perspective view of the lower frame 41 of the bar code reader 1 and illustrates a passage of the laser beam emitted from the VLD module 21 up to the polygon mirror 25. In FIG. 23, the polygon mirror is not diagrammed so that the loci of the ray of beam can be easily understood, and only the plate 51 is diagrammed on which the polygon mirror will be installed. The concave mirror is provided under the mirror ZB2 and is not shown here.

Referring to FIG. 23, the laser beam reflected by the reflection mirror 23 is incident on the reflection mirror 24 passing through the gap 52 under the plate 51, and is reflected by the reflection mirror 24 toward the polygon mirror which is in an upwardly tilted direction. On the other hand, the laser beam emitted through the hole in the concave mirror falls directly on the polygon mirror.

Figure 1A:
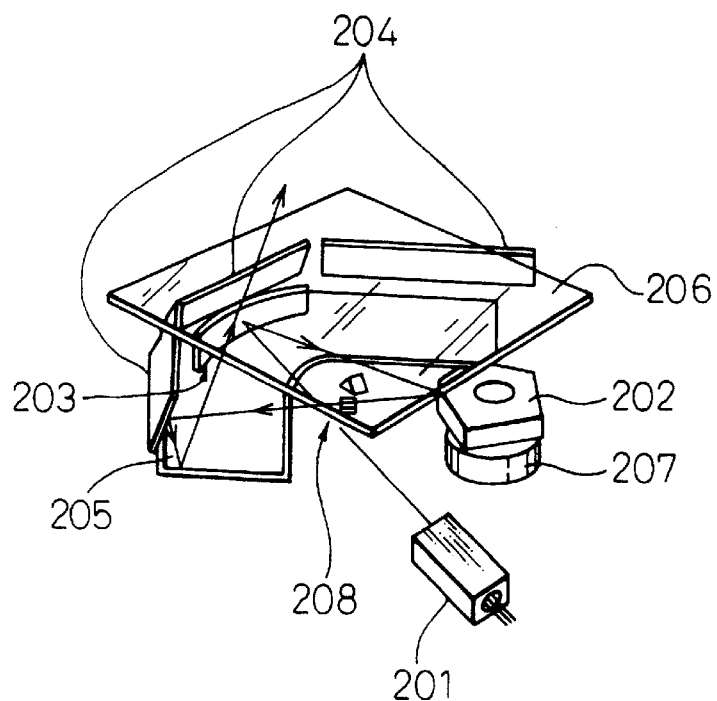
FIG. 1A is a perspective view illustrating the internal constitution of a conventional bar code reader.
Figure 1B:
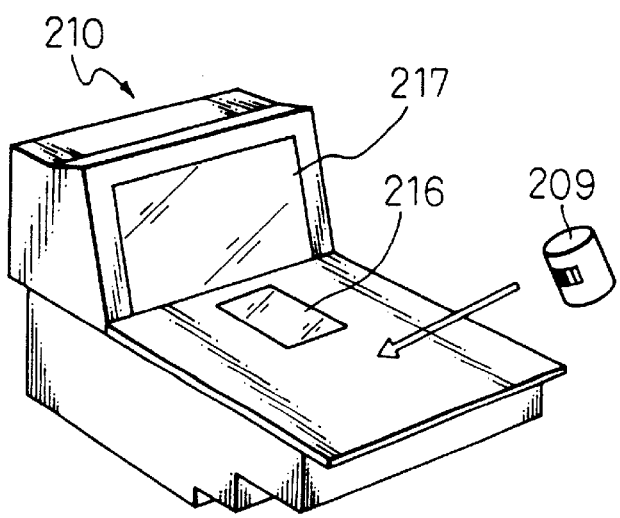
FIG. 1B is a perspective view illustrating the appearance of a conventional bar code reader having two reading windows.
Figure 1C:
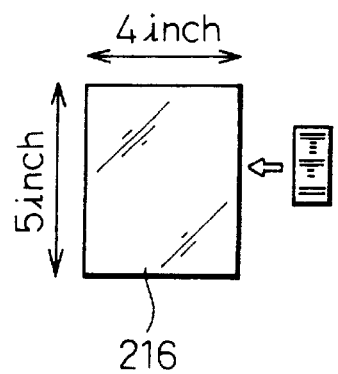
FIG. 1C is a diagram illustrating the size of a bottom window of FIG. 1B.
Figure 1F:
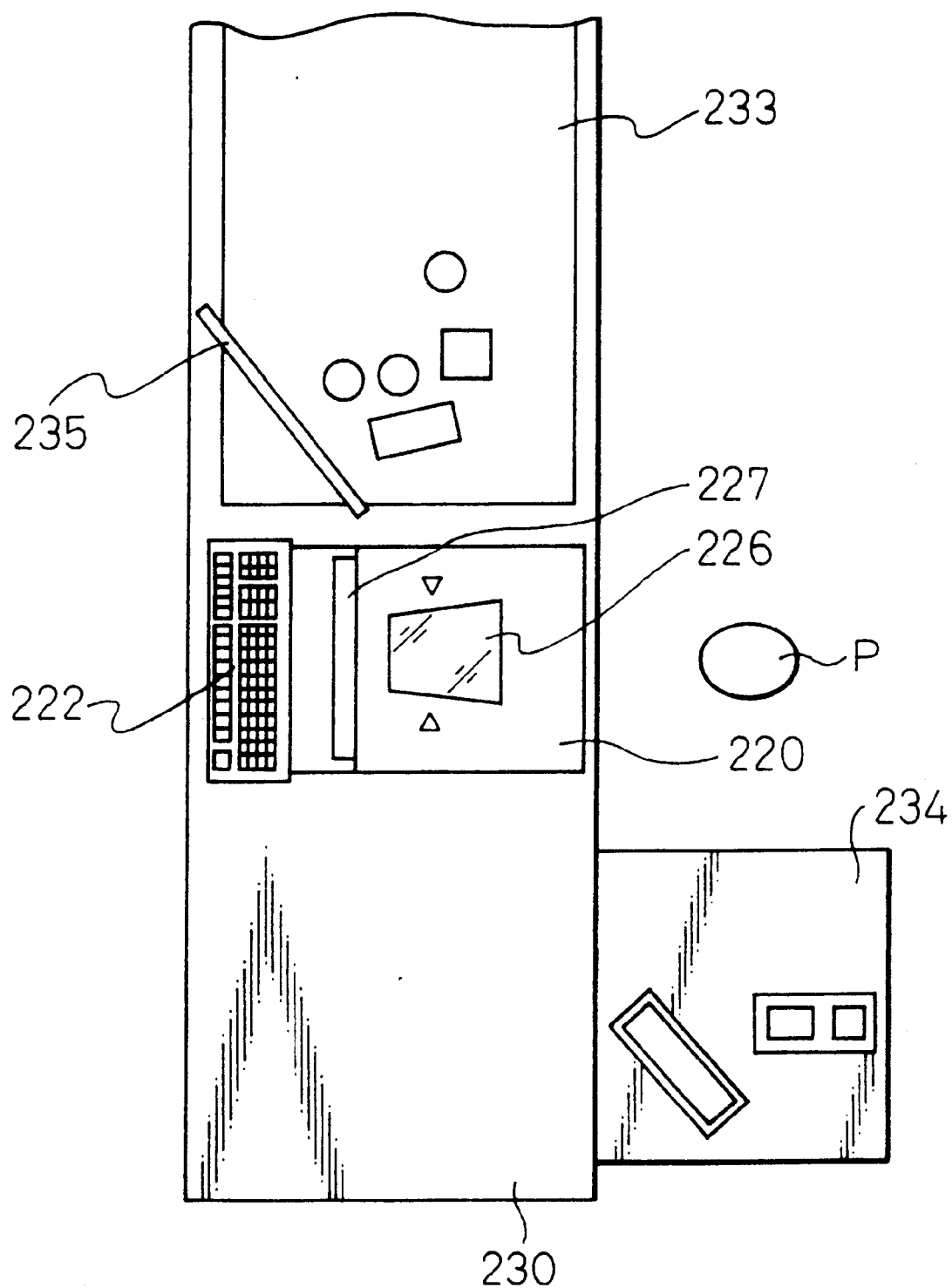
FIG. 1F is a plan view illustrating an accounting counter incorporating the bar code reader of FIG. 1D.
Figure 1G:
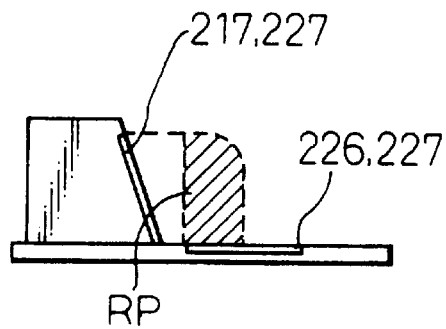
FIG. 1G is a diagram illustrating a bar code readable area of the conventional bar code reader having two reading windows.
Figure 26:
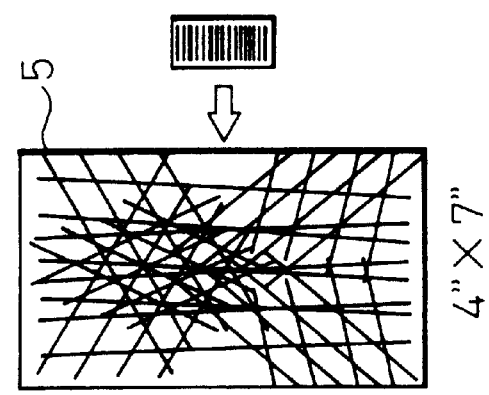
FIG. 26 is a diagram illustrating scanning patterns of scanning beams emitted through the bottom window of the present invention.
Figure 25:
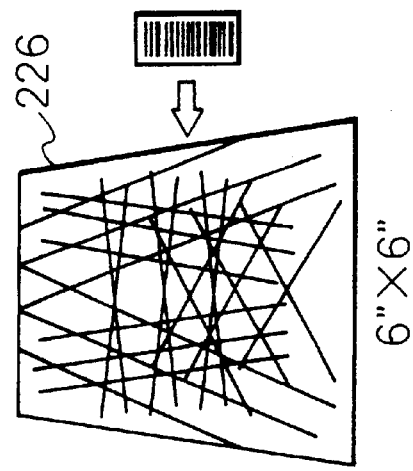
FIG. 25 is a diagram illustrating scanning patterns of scanning beams emitted through the bottom window of FIG. 1E.
Figure 24:
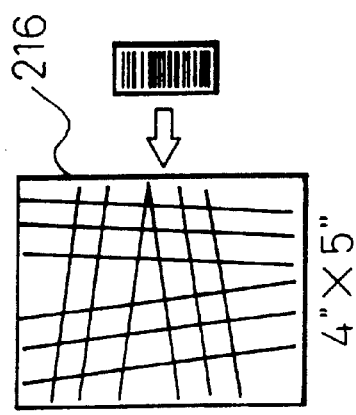
FIG. 24 is a diagram illustrating scanning patterns of scanning beams emitted from the bottom window of FIG. 1C.

FIGS. 24 to 26 illustrate in comparison the scanning patterns emitted from the bar code reader of the present invention and from the conventional bar code readers through their bottom windows. FIG. 24 illustrates a scanning pattern emitted through the bottom window 216 of FIG. 1C, FIG. 25 illustrates a scanning pattern emitted through the bottom window 226 of FIG. 1E, and FIG. 26 illustrates a scanning pattern emitted through the bottom window 5 of the present invention.

Compared to the bar code scanning patterns emitted through the conventional bottom windows 216 and 226, the scanning pattern emitted through the bottom window 5 of the present invention includes many scanning lines heading in various directions. A total of 12 scanning lines are emitted from the bottom window 216 of FIG. 24, and a total of 24 scanning lines are emitted from the bottom window 226 of FIG. 25. By using the scanning lines emitted through the bottom window 5 of the present invention, therefore, the bar code most probably can be scanned and can be read out very reliably.

Moreover, the bottom window 5 of the present invention is longer than the conventional bottom windows 216 and 226. Therefore, the bottom window 5 has a wider area on which the article will be passed to read the bar code. This correspondingly enhances the efficiency of the reading operation.

FIG. 27 is a diagram illustrating a difference in the size of the area for reading bar code between the conventional bar code reader and the bar code reader of the present invention. The readable areas shown in FIG. 27 are those where the bar code can be reliably read when the bar code erected, for example, in the vertical direction is turned by 360 degrees on a horizontal plane.

In the case of the conventional bar code reader, the bottom window 5 has a size of 6 inches×6 inches, which is short and, particularly, the readable area in the direction of depth inevitably becomes narrow. Besides, the readable area is deviated toward the side window 4, and the operator must pass the articles closer to the side window 4. Depending upon the height of the operator, however, the article may not reach this area, and the reading operation is not efficient. With the bar code reader of the present invention, on the other hand, the bottom window 5 has a size of 4 inches×7 inches, and the readable area in the direction of depth becomes broader toward the operator. Therefore, even a person having short arms is able to easily pass the articles within the readable area.

When the article is passed on the bar code reader, the scanning beam emitted through the bottom window 5 is more likely to scan the article when the bottom window 5 is deep. The reading ability, however, does not much change even when the bottom window 5 is not so wide or in the direction in which the article is passed. Moreover, the sapphire glass is expensive and its price increases with an increase in the area. Therefore, the bottom window having a width of 6 inches is disadvantageous from the standpoint of cost and this width is not necessary, either.

On the other hand, the bottom window 5 of the present invention has a width of 4 inches, which is necessary for maintaining the reading ability and is further advantageous in suppressing the price of the glass.

FIG. 28 is a diagram illustrating the passage of a beam reflected by the bar code in the bar code reader of the present invention starting from where the beam reflected by the bar code is incident on the polygon mirror 25. The reflected beam incident through the bottom window is reflected by the first mirror system and falls on the polygon mirror 25. The beam reflected by the bar code and by the reflection plane of the polygon mirror 25 falls on the concave mirror 30. The beam reflected by the polygon mirror 25 is further reflected and focused by the concave mirror 30 to fall on the first detector 28.

On the other hand, the beam incident through the side window is reflected by the second mirror system and falls on the polygon mirror 25. The beam reflected by the bar code and is further downwardly reflected by the reflection plane of the polygon mirror 25 and falls on the Fresnel lens 32. The Fresnel lens 32 focuses the beam reflected by the polygon mirror 25 so as to fall on the bottom mirror 33 which reflects the beam reflected by the bar code toward the light-receiving surface of the second detector 29.

Figure 29:
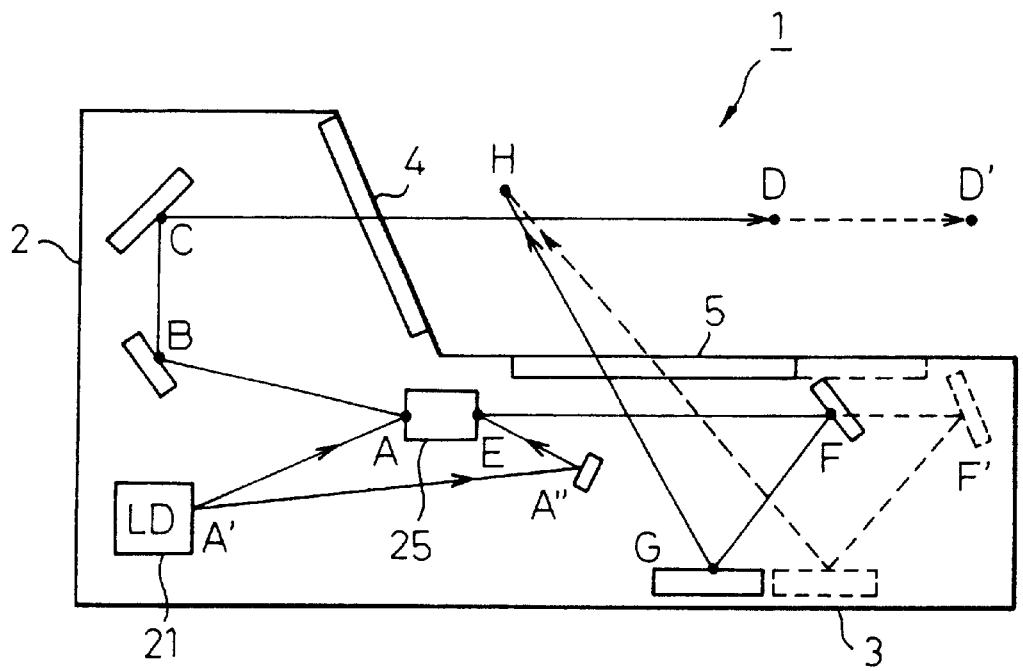
FIG. 29 is a diagram illustrating the arrangement of the source of light in the conventional bar code reader and the optical passages of the scanning beams emitted through the bottom window and the side window.

FIG. 29 is a diagram illustrating a relationship of the length of the optical passage of from the polygon mirror 25 to a position where the laser beam can be best focused in the case when the bottom window 5 is short. In FIG. 29, A-B-C-D represents a scanning beam emitted through the side window 4, and E-F-G-H represents a scanning beam emitted through the bottom window 5.

In the apparatus of FIG. 29, the optical passage A-B-C-D is longer than the optical passage E-F-G-H. This is because, the VLD module 21 is provided under the side scanner portion 2.

When a lens and an aperture (details will be described later) for forming a beam are located close to the VLD module 21, the region for reading the bar code by the laser beam is determined depending upon a distance from the VLD module 21. Therefore, the position for mounting the VLD module 21 in the bar code reader contributes to determining the size of the bar code readable area.

In the case of FIG. 29, the distance from the VLD module 21 to a position where the laser beam can be best focused is equal even in the case of the position D or the position H. Depending upon the arrangement of the VLD module 21, which is a source of laser beam, however, the lengths of the two optical passages A-B-C-D and E-F-G-H change with the polygon mirror 25 as a reference. The difference in the length between the optical passages A-B-C-D and E-F-G-H is absorbed by a difference between the length of the optical passage A'-A of from the VLD module 21 to the polygon mirror and the length of the optical passage A'-A"-E of from the VLD module 21 to the polygon mirror through the mirror A'.

When the depth of the bottom window 5 is increased as indicated by a broken line, on the other hand, it is not allowed to mount the mirror F on the same position as that of FIG. 29. That is, unless the mirror F is moved to a position F' indicated by a broken line by the amount of an increase in the length of the bottom window 5, the mirror F intercepts the passage of the scanning beam and hinders the emission of the scanning beam. If the mirror F is moved to the position of the broken line, therefore, the optical passage E-F-G-H becomes longer than the optical passage A-B-C-D.

As a result, when the distance from the VLD module 21 to a position where the laser beam can be best focused is set to be a position H of the bottom window 5, the position where the laser beam emitted through the side window 4 can be best focused becomes a position D' which is outside the readable space. When the depth of the bottom window 5 is lengthened as indicated by the broken line, therefore, it is not possible to mount the VLD module 21 on the same position as that of FIG. 29.

Figure 30:
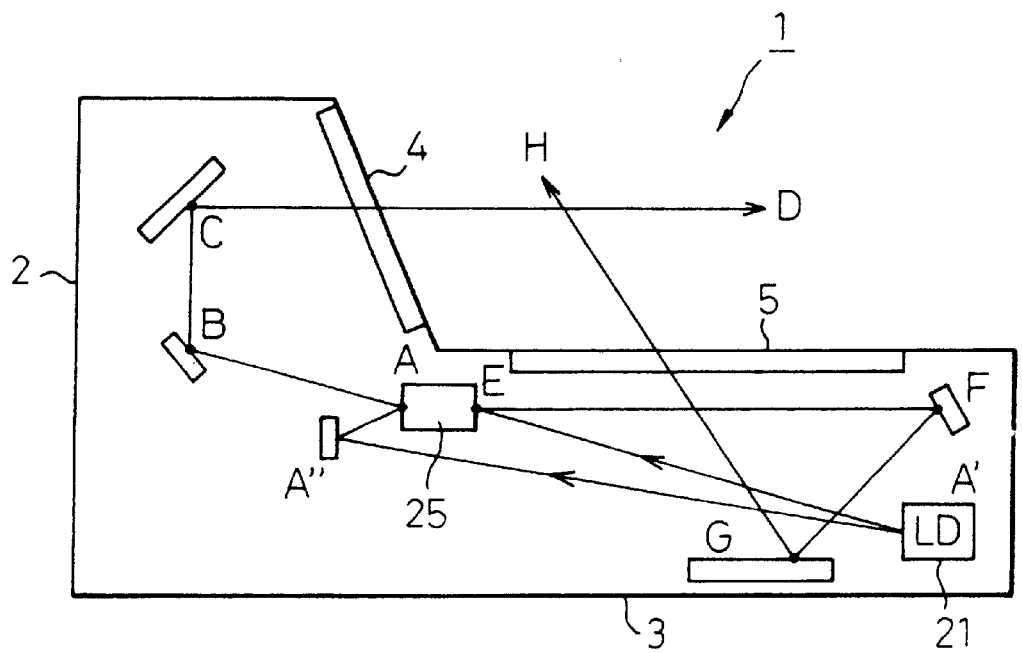
FIG. 30 is a diagram illustrating the arrangement of the source of light in the bar code reader of the present invention and the optical passages of scanning beams emitted through the bottom window and the side window.

According to the present invention as shown in FIG. 30, therefore, the VLD module 21 is installed at an end of the bottom scanner portion 3 most remote from the side scanner portion 2. With the VLD module 21 being arranged in this way, the difference between optical passage length A-B-C-D and the optical passage length E-F-G-H can be absorbed by the difference between the optical passage length A'-A"-A and the optical passage length A'-E.

The side scanner portion 2 is provided with the scanning mirror system, etc., and cannot provide a sufficiently wide space. It is therefore difficult to lead the laser beam in the side scanner portion 2 to lengthen the optical passage of the beam emitted from the VLD module 21. According to the present invention shown in FIG. 30, the VLD module 21 is installed at an end of the bottom scanner portion 3 most remote from the side scanner portion 2 of the bar code reader 1 to obtain space in which the laser beam can be lead about to adjust the length of the optical passage.

According to the present invention, the laser beam supplied to the side scanner portion 2 is caused to pass under the lower surface of the polygon mirror 25 so as to intersect the axis of rotation of the polygon mirror 25. If the laser beam supplied to the side scanner portion 2 is caused to pass over the polygon mirror 25, it becomes difficult to arrange the mirrors for guiding the laser beam to the scanning mirror system in the side scanner portion 2. According to the present invention, however, the laser beam is passed under the polygon mirror 25 to solve the above-mentioned problem.

Figure 31:
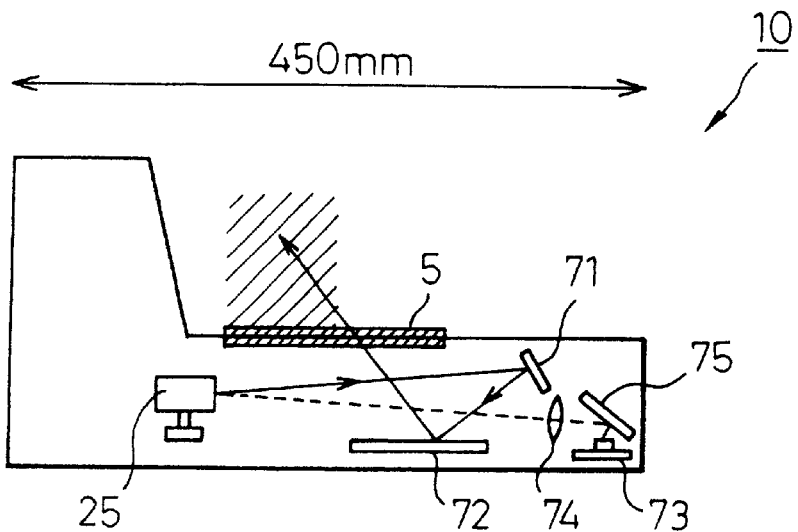
FIG. 31 is a diagram illustrating the arrangement of a light-receiving means in the bar code reader, bar code readable area and the depth of the bar code reader according to the prior art.

FIG. 31 is a diagram illustrating an example of receiving the beam reflected by the bar code. In the case of FIG. 31, the scanning beam reflected by the polygon mirror 25 is incident on the pattern-generating mirror 71 where it is downwardly reflected, and is further upwardly reflected by the bottom mirror 72 so as to be emitted through the bottom window 5. In FIG. 31, the hatched area represents the area for reading bar codes of articles. The beam reflected by the bar code arrives at the polygon mirror 25 passing through the same passage as the emitted beam, and is reflected toward the detector 73.

The beam reflected by the polygon mirror 25 is focused by the lens 74, downwardly reflected by the mirror 75 of which the reflection plane is faced in a downwardly tilted direction, and arrives at the detector 73 where it is received thereby.

In the case of this bar code reader 10, it is not possible to bring the lens 74 too close to the polygon mirror 25 due to the arrangement of the mirror 71 and the bottom mirror 72. Accordingly, it is not possible decrease the size of depth of the bar code reader 10. In this case, the depth of not less than 450 mm is necessary.

In the case of a store having a wide area, the accounting counter may have a width of, for example, about 550 mm. In this case, the bar code reader 10 can be installed on the accounting counter without suppressing the width of the bar code reader 10. In the case of a narrow store, however, the accounting counter may have a width of as narrow as from 450 mm to 480 mm. In such a case, it becomes difficult to install the bar code reader 10 of FIG. 31 on the accounting counter.

Figure 32:
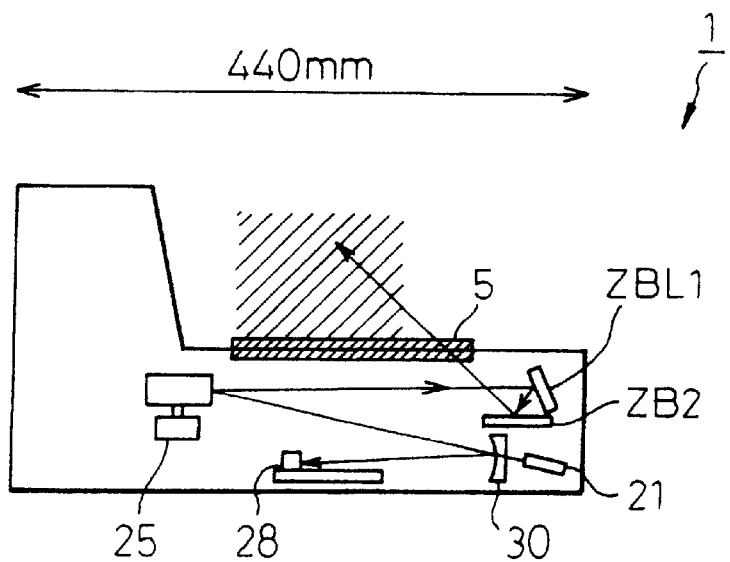
FIG. 32 is a diagram illustrating the arrangement of a light-receiving means in the bar code reader, bar code readable area and the depth of the bar code reader according to the present invention.

FIG. 32 illustrates the arrangement of a light-receiving element in the bar code reader 1 according to the present invention. As described already, the first detector 28 according to the present invention is provided on the bottom surface of the bar code reader 1. The beam reflected by the polygon mirror 25 is reflected by the concave mirror 30 so as to be folded nearly into the center of the bar code reader 1.

In order that the scanning beam can be emitted through the bottom window 5, the scanning beam reflected by the polygon mirror 25 is downwardly reflected by the mirror ZBL1 mounted on the upper frame and is then upwardly reflected by, for example, the concave mirror 30 and the mirror ZB2 provided on the VLD module 21. The hatched area shown in FIG. 32 represents the area for reading bar codes of articles.

In order that the scanning beam is emitted through the bottom window 5 as described above, there is arranged neither the mirror that corresponds to the bottom mirror 72 of FIG. 31 nor the optical system that contributes to generating the scanning beam on the bottom surface of the bar code reader 1. It is therefore possible to arrange the first detector 28 on the bottom surface of the bar code reader 1, and the beam reflected by the polygon mirror 25 is folded by the concave mirror 30 toward the central portion of the bar code reader 1. Since the optical system is thus arranged, the depth of the bar code reader 1 can be decreased to be shorter than that of the bar code reader 10 explained with reference to FIG. 31 despite the depth of the bottom window 5 being as long as 7 inches. In the case of the apparatus of FIG. 32, the depth can be decreased to be not longer than 440 mm.

Figure 33A:
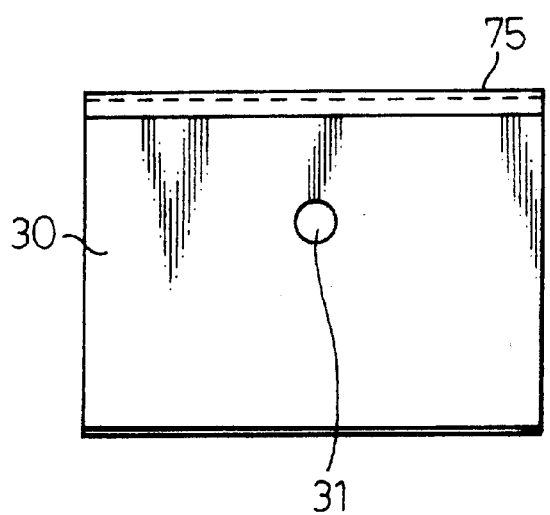
FIG. 33A is a front view of a concave mirror used for the bar code reader of the present invention.
Figure 33B:
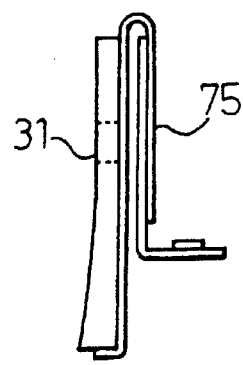
FIG. 33B is a side view of the concave mirror used for the bar code reader of the present invention.

FIGS. 33A and 33B are a front view and a side view of the concave mirror 30 used in the present invention. The through hole 31 is formed near the center of the concave mirror 30. Furthermore, on the back side of the concave mirror 30 is provided a metallic mounting fitting 75 for being mounted on the lower frame 41 of the bar code reader 1. The metallic mounting fitting 75 is folded in a U-shape and is made of a resilient member.

The focal point of the recessed mirror 30 must be brought to the beam-receiving surface of the first detector 28. Due to mounting errors, however, the focal point of the concave mirror 30 often deviates from the light-receiving surface of the first detector 28. To avoid this, the present invention is provided with a mechanism capable of adjusting the mounting angles of the concave mirror 30 in the horizontal direction and in the vertical direction.

Figure 34:
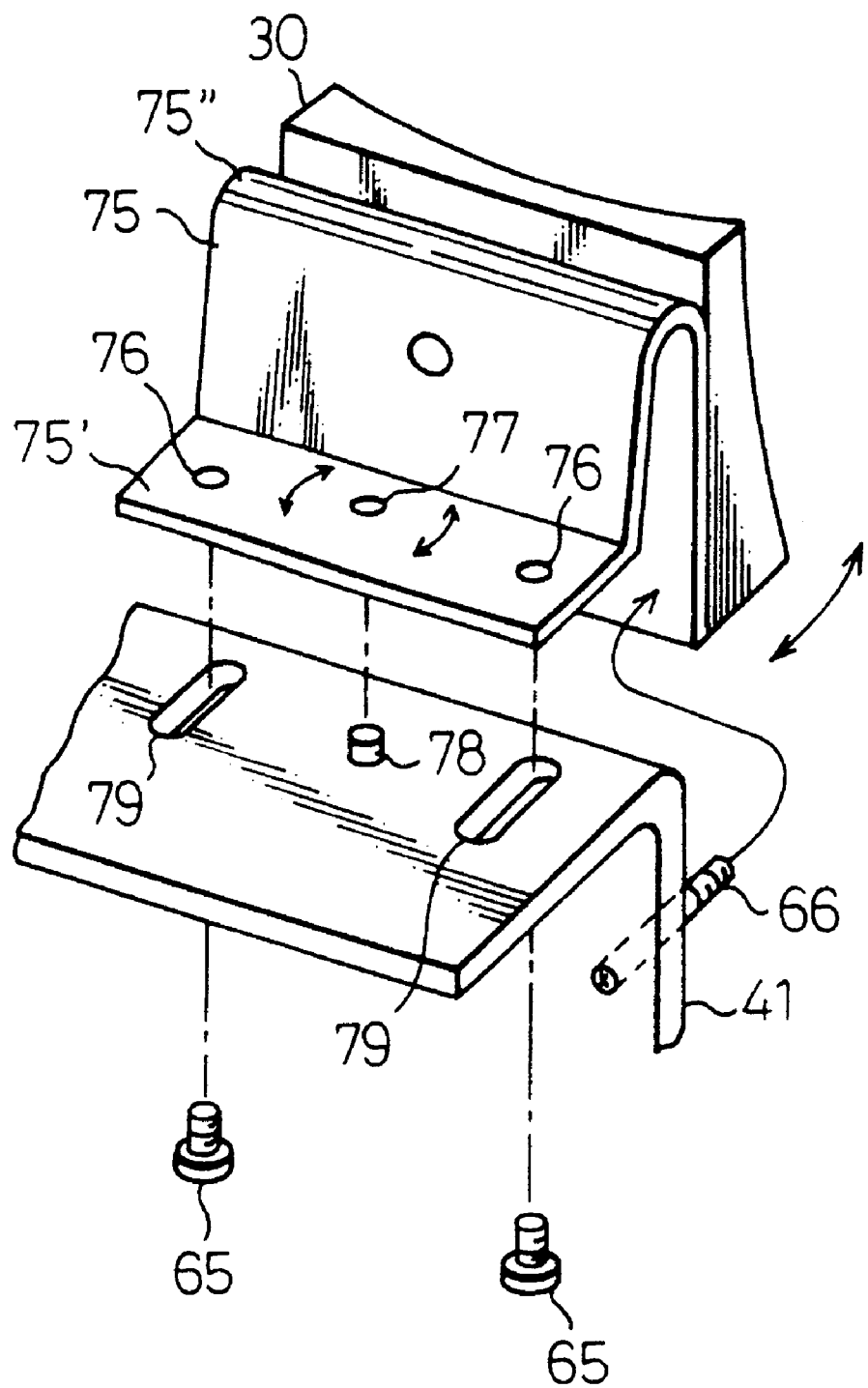
FIG. 34 is a perspective view illustrating how to mount the concave mirrors of FIGS. 33A and 33B on the lower frame and how to adjust the mounting position.

FIG. 34 is a diagram illustrating the mechanism for adjusting the angles of the concave mirror 30. Tapped holes 76 are formed near both ends of a folded portion 75' of the metallic mounting fitting 75, and a hole 77 that serves as a fulcrum is formed near the central portion. On the other hand, the lower frame 41 of the bar code reader is provided with a projection 78 and two elongated holes 79.

The hole 77 of the metallic mounting fitting 75 is fitted to the projection 78 of the frame 41, and the concave mirror 30 is allowed to turn in the horizontal direction about the projection 78. The positioning of the concave mirror 30 in the horizontal direction is accomplished by turning the concave mirror 30 about the projection 78 in such a manner that the focal point of the concave mirror 30 is positioned on the light-receiving surface of the first detector 28 as described with reference to FIG. 32 and, then, the metallic mounting fitting 75 is secured to the lower frame 41 by using adjusting screws 65.

The metallic mounting fitting 75 has resiliency. Therefore, the concave mirror 30 is turned back and forth with the folded portion 75' of the metallic mounting fitting 75 as a center to thereby adjust the mounting angle of the concave mirror 30. This adjustment is accomplished by using an adjusting screw 66 provided in the lower frame 41. The adjusting screw 66 is provided at a position opposed to the metallic mounting fitting 75 in a state where the concave mirror 30 is mounted on the lower frame 41. The end of the adjusting screw 66 abuts the back surface of the concave mirror 30 in a state where the concave mirror 30 is mounted on the lower frame 41. The angle of the concave mirror 30 in the vertical direction is adjusted by adjusting of the adjusting screw 66 to move the concave mirror 30 back and forth.

Relying upon such a simply constructed mechanism, the beam reflected by the concave mirror 30 can be brought to the light-receiving surface of the first detector 28 through a simple operation.

Figure 35A:
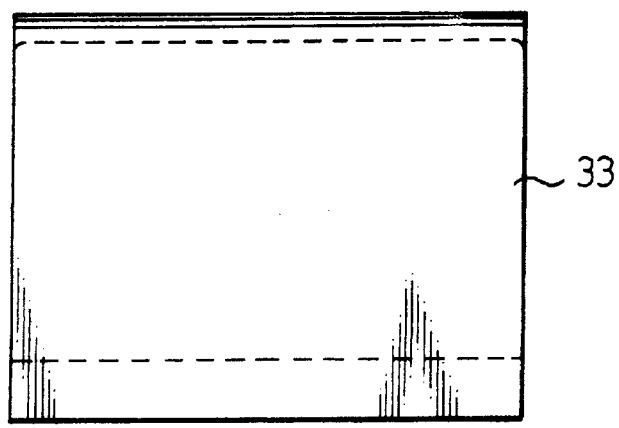
FIG. 35A is a front view of a bottom mirror used for the bar code reader of the present invention.
Figure 35B:
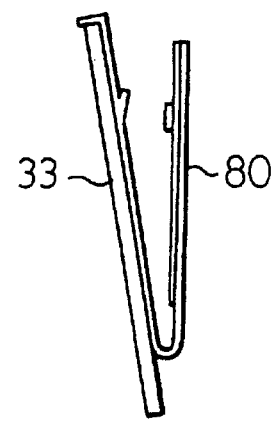
FIG. 35B is a side view of the bottom mirror used for the bar code reader of the present invention.

FIGS. 35A and 35B are a top view and a side view of the bottom mirror 33 which causes the beam reflected by the bar code to be incident on the second detector 29 explained with reference to FIG. 28. A metallic mounting fitting 80 is attached to the bottom surface of the bottom mirror 33. The bottom mirror 33 is mounted on the lower frame 41 through the metallic mounting fitting 80. The metallic mounting fitting 80, too, is made of a resilient member. The metallic mounting fitting 80 is folded in a U-shape, and the inclination of the bottom mirror 33 and its angle in the horizontal direction can be adjusted utilizing the resiliency of the metallic mounting fitting 80.

Figure 36:
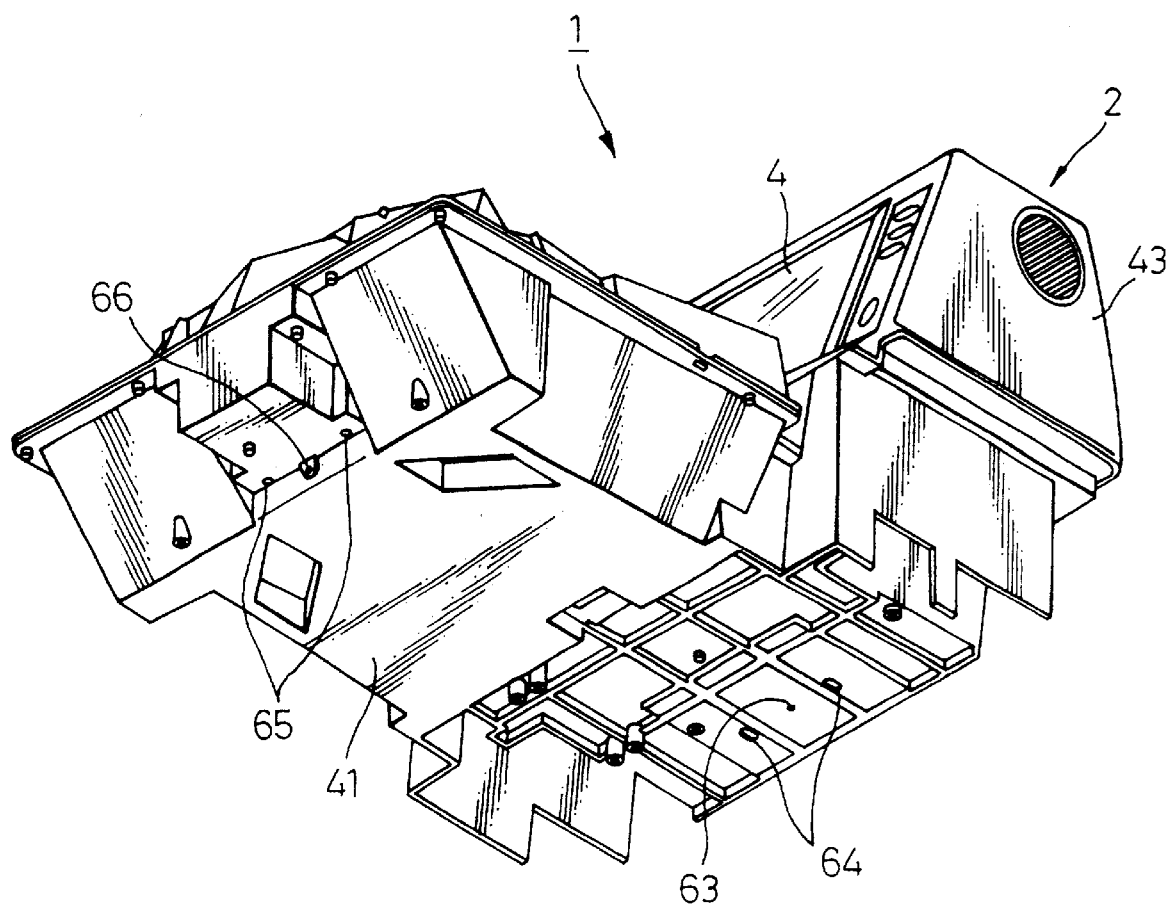
FIG. 36 is a perspective view of when the bar code reader is viewed from the bottom side to illustrate the arrangement of adjustment screws for adjusting the mounting angles of the concave mirror and of the bottom mirror.

FIG. 36 is a diagram of when the bar code reader 1 of the present invention is viewed from the bottom side in a state where the cover is removed. On the bottom surface of the bar code reader 1 are provided a total of three screws for adjusting the angle of the concave mirror 30. As described with reference to FIG. 34, the adjusting screw 65 is used for adjusting the position of the concave mirror 30 in the horizontal direction. The concave mirror 30 is turned and is so adjusted that the focal point of the concave mirror 30 is located on the light-receiving surface of the first detector 28 described with reference to FIG. 32. The concave mirror 30 is then secured to the lower frame 41 using the adjusting screws 65. The adjusting screw 66 is used for adjusting the position of the concave mirror 30 in the vertical direction.

FIG. 36 further illustrates adjusting screws 63, 64 for adjusting the bottom mirror 33. The adjusting screw 63 is used for adjusting the inclination of the bottom mirror 33, and the end of the adjusting screw 63 abuts the bottom surface of the bottom mirror 33. By adjusting of the adjusting screw 63, the inclination of the bottom mirror 33 is adjusted and the direction for reflecting the beam is adjusted.

The ends of the adjusting screws 64 are screwed, via elongated holes, into tapped holes formed near both ends of the metallic mounting fitting 80. The tapped holes of the metallic mounting fitting 80 have a shape like those of the metallic mounting fitting 75 for mounting the concave mirror 30. As in the case of the concave mirror 30, the metallic mounting fitting 80 is allowed to turn in the horizontal direction with the fulcrum as a center. After the direction of the bottom mirror 33 is adjusted, the metallic mounting fitting 80 is secured to the lower frame 41 using the adjusting screws 64.

Figure 37A:
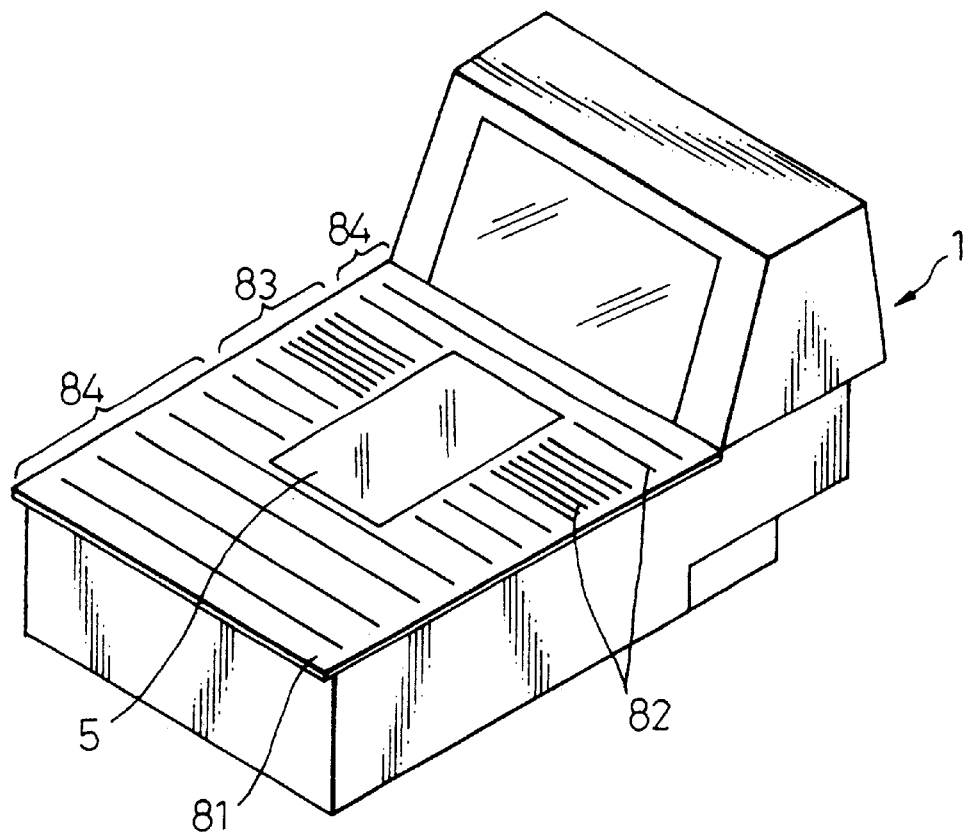
FIG. 37A is a perspective view of the bar code reader of the embodiment of the present invention in which protrusions are formed on the surface of the bottom window.
Figure 37B:
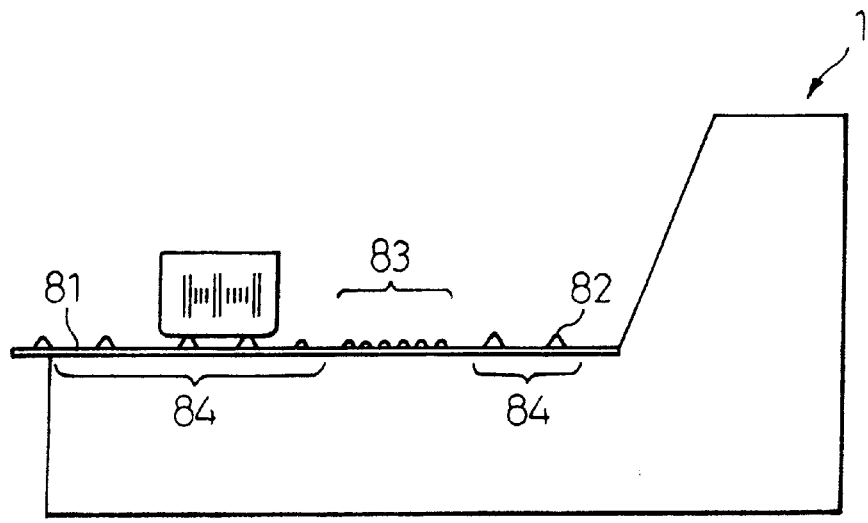
FIG. 37B is a side view of FIG. 37A.

FIGS. 37A and 37B are diagrams illustrating the bottom surface 81 in which is provided the bottom window 5 of the bar code reader 1 of the present invention. On the bottom surface 81 in which the bottom window 5 is provided are formed protuberances 82 having a triangular shape in cross section and extending in the direction of width of the bar code reader 1.

To read the bar code, the article is passed through the space above the bar code reader 1. Depending upon the operator, however, the article may be moved in contact with the bottom surface 81. In such a case, when the bottom surface 81 in which the bottom window 5 is provided is flat, the article comes into contact with the bottom surface 1 over an increased area whereby the friction increases between the article and the bottom surface 81, and it becomes not easy to move the article.

In order to cope with such a problem according to the bar code reader 1 of the present invention, protuberances 82 are formed on the bottom surface 81 in which the bottom window 5 is provided, and the contact area is decreased between the article and the bottom surface 81 in order to decrease frictional force between the article and the bottom surface 81. The direction in which the protuberances 82 extend is in agreement with the direction in which the article is passed to more effectively decrease the frictional force.

The protuberances 82 can be formed by resin molding together with the bottom surface 81. Moreover, a member forming protuberances may be adhered to the bottom surface.

The bar code reader 1 has a best-reading position 83 where the scanning lines are concentrated most and the reading probability becomes the highest. In this bar code reader 1 as shown in FIG. 37B, the gaps among the protuberances 82 on the bottom surface 81 are changed enabling the operator to recognize where the best-reading position is located.

That is, in this bar code reader 1, protuberances 82 are formed maintaining a small gap on a portion corresponding to the best-reading position 83. On the portions 84 deviated from the best-reading portion 83, the gap among protuberances 82 is increased to be wider than the gap among the protuberances at the best-reading position 83. Thus, by changing the gaps among the protuberances 82 formed on the bottom surface 81 in which the bottom window 5 is provided, the operator visually learns the best-reading position 83. Therefore, the operator is allowed to easily recognize where the best-reading position 83 is located.

When a small article is to be passed, furthermore, the article may fall between the protuberances 82 causing the bar code reading to be impaired. It is therefore desired that the gap among the protuberances 82 is not so large. With the gaps among the protuberances 82 being narrow at the best-reading position, therefore, the article can be reliably passed at the best-reading position 83.

Figure 38:
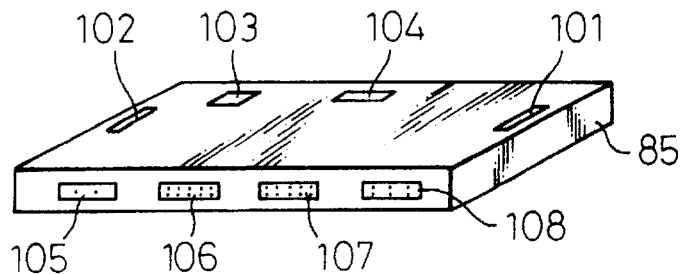
FIG. 38 is a perspective view of a control unit provided inside the bar code reader of the present invention.

FIG. 38 illustrates a control unit 85 of the bar code reader 1. The control unit 85 of the bar code reader is provided with light detector circuits 101, 102 to which the first and second light detectors 28 and 29 will be connected, a VLD control circuit 103 to which the VLD module 21 will be connected, and a motor control circuit 104 to which the polygon motor 20 will be connected. Operations of the units are controlled by these circuits. The control unit 85 further has connectors for connection to external units, such as a connector 105 for connection to a power source cable for supplying electric power, a connector 106 for an interface (I/F) cable for transferring the bar code data read by the bar code reader 1 to a POS terminal, a connector 107 for connection to a power source for supplying electric power to a scaling device, and a connector 108 to which can be connected a scanner of the hand-held type.

Figure 39:
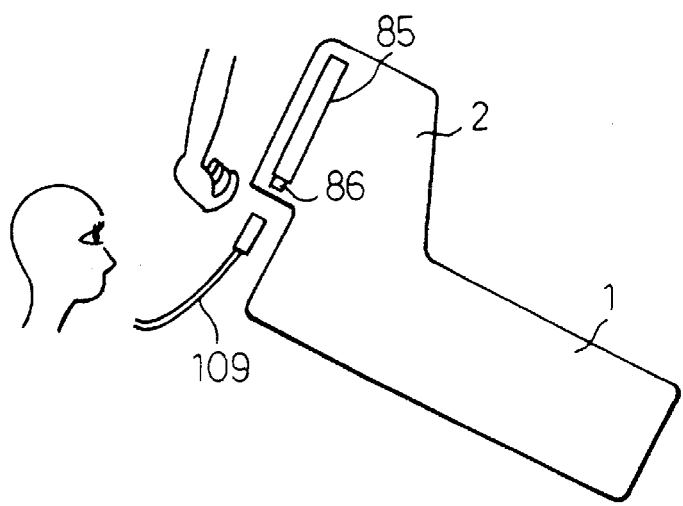
FIG. 39 is a diagram illustrating the arrangement of the control unit inside the conventional bar code reader and its problems.

So far, as shown in FIG. 39, the control unit 85 had been vertically installed on the back surface of the side scanner portion 2. In this case, however, the connectors 86 face downwards. When the cables 109 need be connected to the connectors 86, therefore, the user had to tilt the bar code reader 1 by lifting it up as shown in FIG. 39 so that he is allowed to make sure the kinds of the connectors to which the connection is to be made.

However, the bar code reader 1 has been installed being buried in the accounting counter, and it is very difficult to tilt the bar code reader 1 by lifting it up. Therefore, the cables are difficult to connect.

Figure 40:
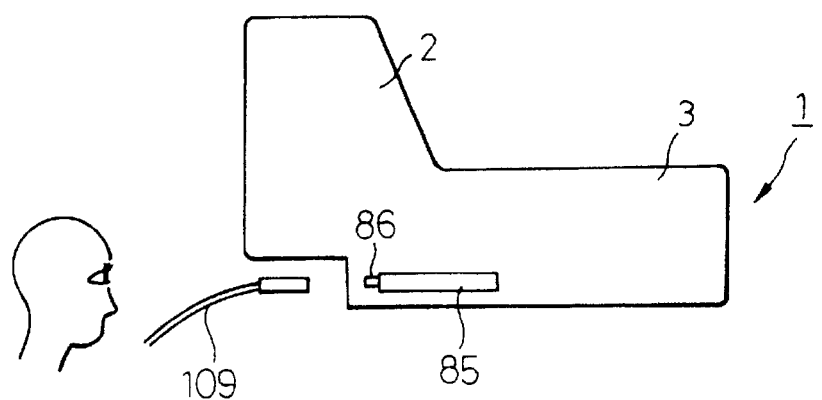
FIG. 40 is a diagram illustrating the arrangement of the control unit inside the bar code reader of the present invention and its effects.

FIG. 40 is a diagram explaining the connection of cables to the bar code reader 1 according to the present invention. In the bar code reader 1 of the present invention, the control unit 85 is horizontally arranged on the bottom surface of the bar code reader 1, and the connectors 86 are facing backwards. Therefore, the user is allowed to make sure the kinds of the connectors with the bar code reader 1 being horizontally installed, and the connectors 109 can be efficiently connected.

Figure 41:
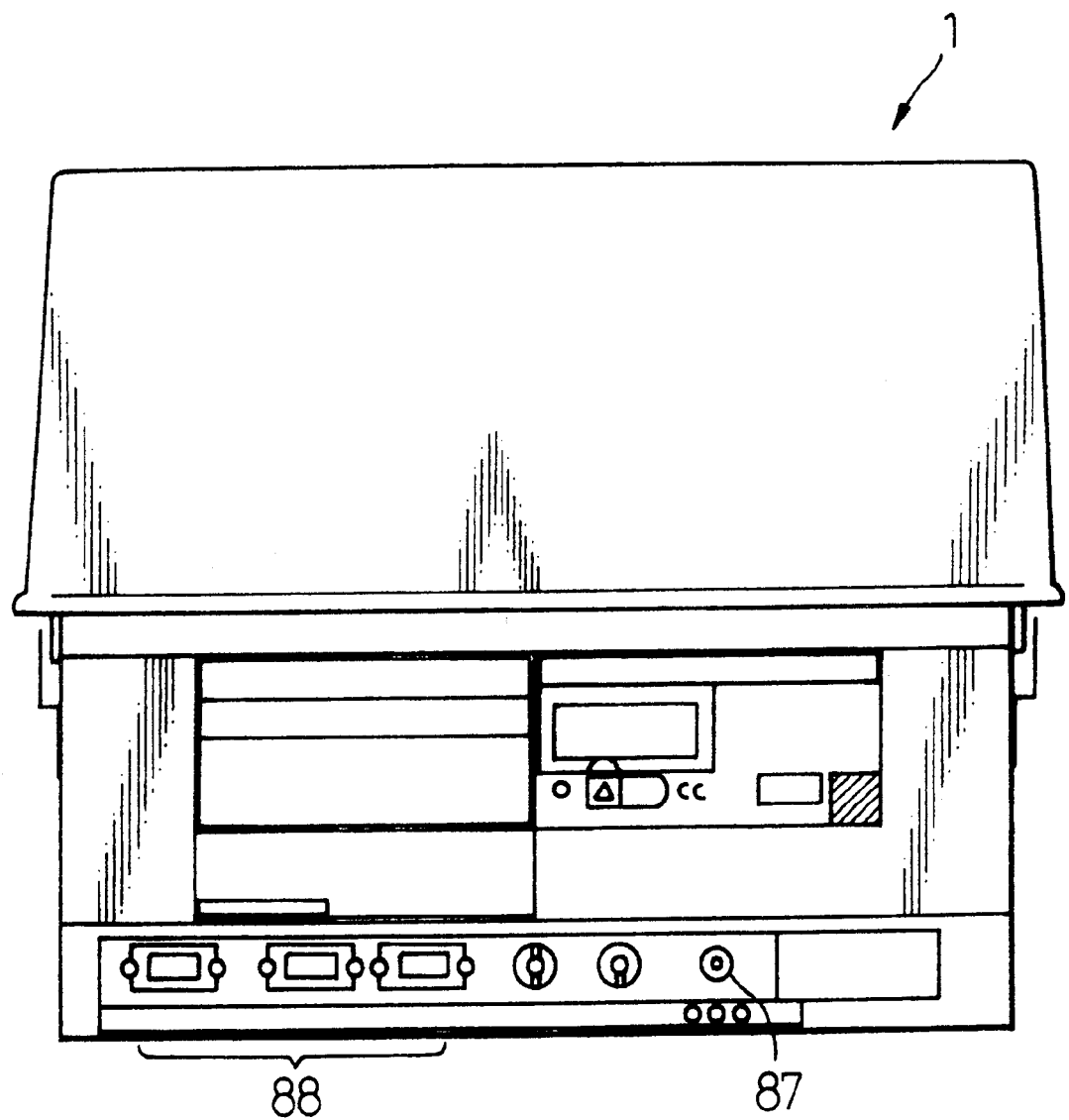
FIG. 41 is a diagram illustrating the arrangement of connectors on the back surface of the bar code reader of the present invention.

FIG. 41 illustrates the back surface of the bar code reader 1 according to the present invention wherein a variety of connectors are arranged in the horizontal direction. The bar code reader 1 is provided on the back surface thereof with a power source cable connector 87 to which the DC power source will be connected, an interface connector 88, and the like connectors.

Figure 42:
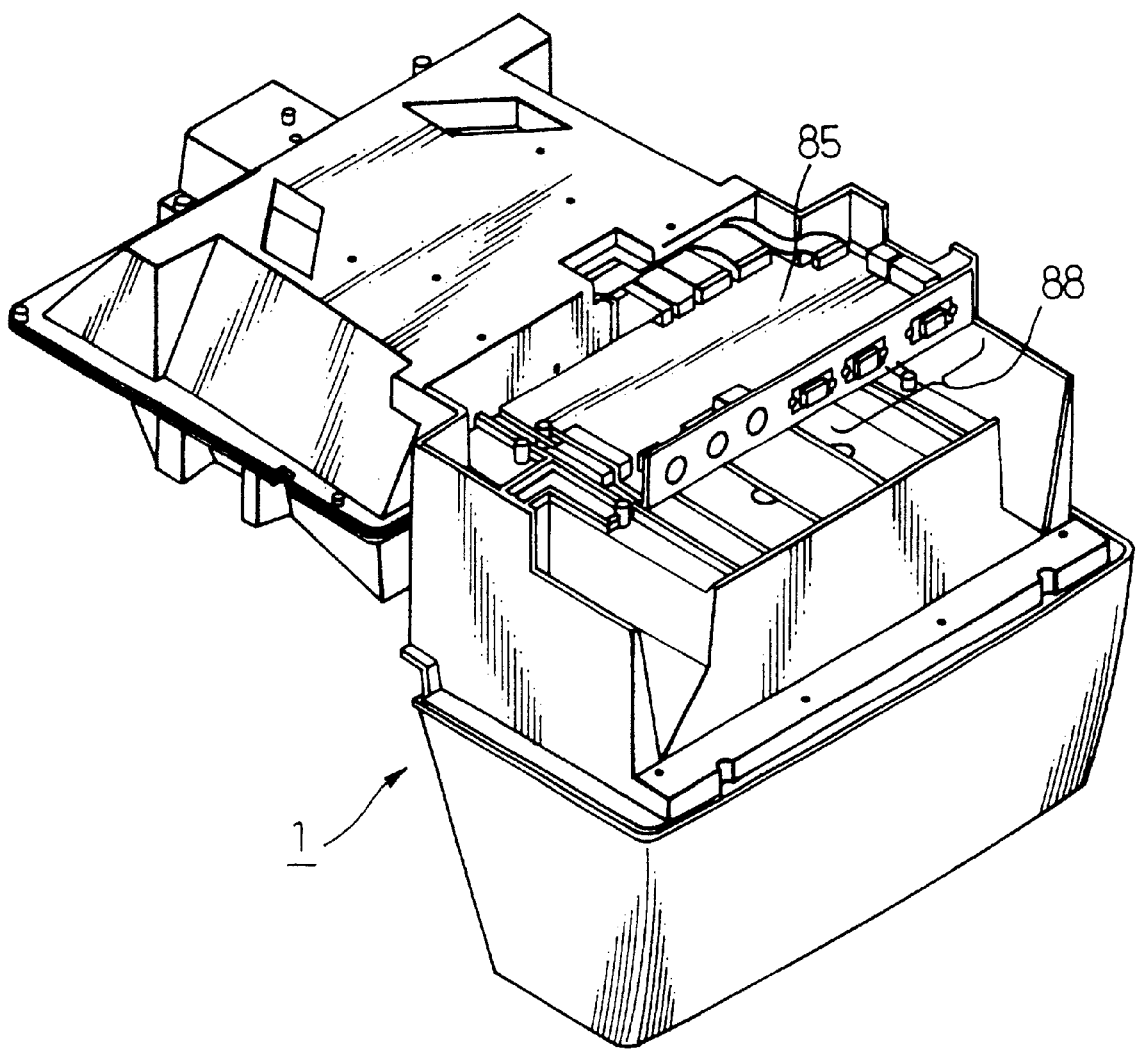
FIG. 42 is a perspective view illustrating a state where a cover is removed from the bottom scanner portion of the bar code reader to illustrate the state of mounting the control unit on the lower frame.

FIG. 42 is a diagram illustrating the back surface of the bar code reader 1 in a state where the control unit 85 is mounted. The control unit 85 has a variety of connectors 88 as explained with reference to FIG. 41.

Figure 43:
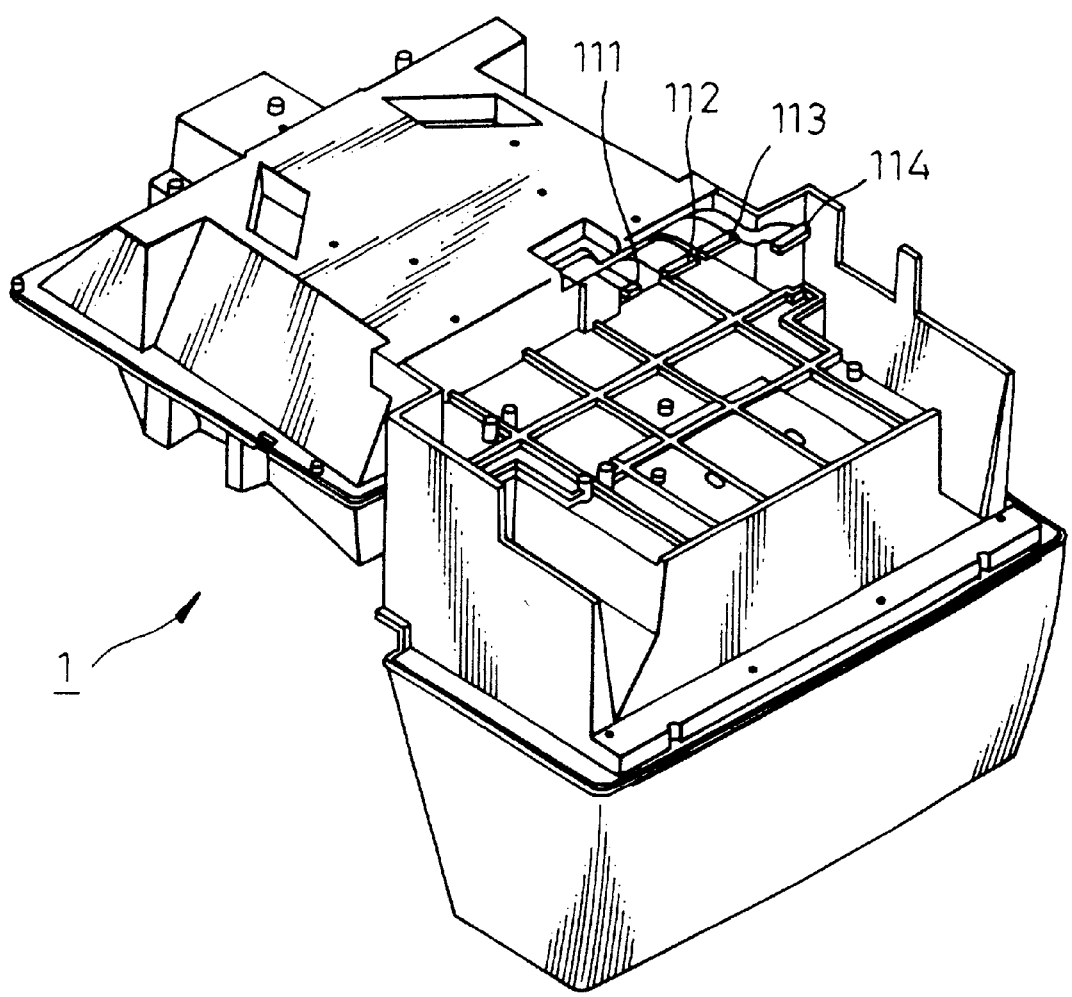
FIG. 43 is a perspective view illustrating a state where the control unit is removed from the state of FIG. 42.

FIG. 43 is a diagram illustrating the back surface of the bar code reader 1 in a state where the control unit 85 has been removed. From the bar code reader 1 are drawn a motor cable 111 connected to the polygon motor 20, an ADS cable 112, an ADB cable 113, an ANA cable 114 and the like cables, which are connected to the control unit 85.

FIG. 44A illustrates the constitution of the laser module 21. The laser module 21 comprises a semiconductor laser 91, a collimator lens 92 and an aperture 93. The laser beam emitted from the semiconductor laser 91 diverges at a predetermined angle of divergence. Therefore, the laser beam is focused through the collimator lens 92, passed through the aperture 93 to form a beam which is then emitted to the bar code readable area.

Here, as shown in FIG. 45, the laser beam emitted from the semiconductor laser 91 is differently diverged depending upon the vertical direction and the horizontal direction. The beam is diverged at an angle of from about 5° to about 11° in the horizontal direction and is diverged at an angle of from about 24° to about 37° in the vertical direction. Besides, greatly different characteristics are exhibited depending upon the individual semiconductor lasers 91, and the angle of divergence differs greatly depending upon the individual semiconductor lasers 91.

Here, the shape of the laser beam that is emitted is defined by the diameter of the aperture 93; i.e., the beam diameter is shaped by the aperture 93. FIG. 44B illustrates a relationship between the distance from the aperture and the beam diameter of when there is employed a laser beam that is emitted after being shaped by the aperture. When it is presumed that an optimum beam diameter that is suited for reading the bar code is 550 $\mu$m, the bar code readable area becomes as shown in, for example, FIG. 44B. When the beam diameter is too great, it becomes difficult to read the bar code having narrow gaps among the bars and, particularly, having a narrow bar width, causing the bar code reading efficiency to decrease. It is therefore desired that the beam diameter is as small as possible on the readable area.

Figure 46A:
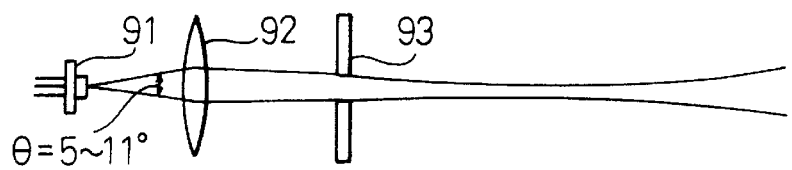
FIG. 46A is a diagram illustrating a state where the laser beam in the horizontal direction is passing through an aperture.
Figure 46B:
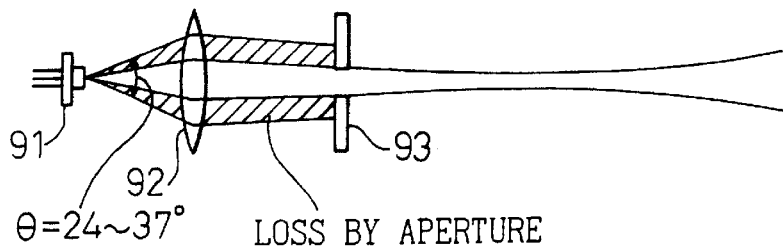
FIG. 46B is a diagram illustrating a state where the laser beam in the vertical direction is passing through an aperture.

Described below with reference to FIGS. 46A and 46B is the problem that arises from a difference in the angle of divergence of the laser beam emitted from the semiconductor laser 91 depending upon the vertical direction and the horizontal direction. Even when an optical beam diameter is obtained in the horizontal direction in which the angle of divergence of the beam is small as shown in FIG. 46A, the angle of divergence becomes large in the vertical direction that is shown in FIG. 46B and, hence, the beam of a large diameter falls on the aperture 93. From the standpoint of shaping the beam, the aperture 93 has the same diameter in both the vertical and horizontal directions. In the vertical direction, therefore, the laser beam is partly intercepted by the aperture 93, and the loss of laser beam energy increases and the efficiency for utilizing the beam decreases. In the worst case, the beam is utilized at an efficiency of about 18%.

Figure 47:
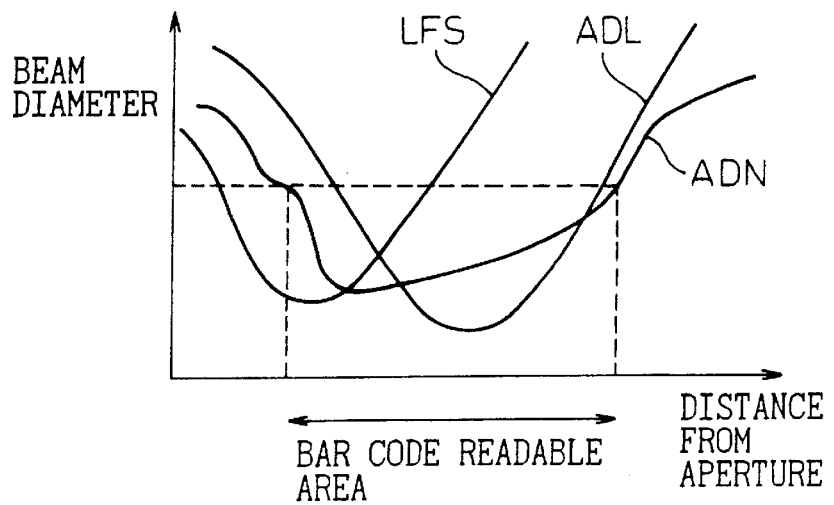
FIG. 47 is a diagram illustrating changes in the diameter of the laser beam depending upon the distance from the aperture using an aperture of an ordinary diameter, an aperture of a large diameter, and a lens having a large focal distance.

The efficiency for utilizing the beam can be enhanced by increasing the diameter of the aperture 93, decreasing the f-value of the collimator lens 92 (shortening the focal distance), or by increasing the distance between the semiconductor laser 91 and the collimator lens 92. FIG. 47 illustrates a relationship between the distance from the aperture 93 and the beam diameter of when the abovementioned countermeasure is taken for the laser beam.

In FIG. 47, a curve ADN represents characteristics of when the diameter of the aperture 93 is the same as the conventional one (characteristics ADN are the same as the characteristics shown in FIG. 44B), a curve ADL represents characteristics of when the diameter of the aperture 93 is increased, a curve LFS represents characteristics of when the f-value of the collimator lens 92 is decreased or when the distance is increased between the semiconductor laser 91 and the collimator lens 92.

When the diameter of the aperture 93 is increased, the laser beam is less intercepted in the vertical direction, and the efficiency for utilizing the beam increases. However, since the aperture 93 has a large diameter, it becomes difficult to squeeze the beam. In this case as represented by the curve ADL in FIG. 47, therefore, the readable area in which the beam diameter is 550 $\mu$m becomes narrower than an area of the curve ADN of when the aperture 93 has an ordinary diameter. As a result, the position where the beam can be most squeezed becomes more remote than that of when the aperture 93 has an ordinary diameter. In the horizontal direction, the laser beam almost completely passes through the aperture 93 as the diameter of the aperture 93 increases, and the laser beam is no longer substantially shaped.

Figure 48A:
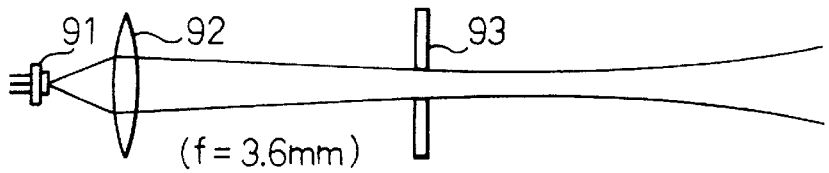
Figure 48B:

When the f-value of the collimator lens 92 is decreased, the beam diameter can be most squeezed at a position closer than that of when a lens having a large f-value is used as represented by a curve LFS in FIG. 47. In this case as shown in FIG. 48A, ideal beam shape and ideal efficiency for utilizing the beam can be accomplished in the vertical direction in which the beam diverges at an increased angle, and there is no particular problem concerning the efficiency for utilizing the beam. In the horizontal direction in which the beam diverges at a small angle, however, the beam is almost not intercepted by the aperture 93 as shown in FIG. 48B and the beam is not shaped, giving rise to the occurrence of a problem in that the beam shape is lost. In the horizontal direction, therefore, the beam forms an image in space in front of the reading space, and the readable area becomes narrow since the image-forming position differs depending upon the vertical direction and the lateral direction.

Even when the distance is increased between the semiconductor laser 91 and the collimator lens 92, the same problem occurs as when the collimator lens 92 having a small f-value is employed.

To read the bar code as described above, it becomes necessary to enhance the efficiency for utilizing the laser beam and to broaden as much as possible the readable area for reading the bar code in an optimum way.

The laser module 21 used in the present invention solves the above-mentioned problem and expands the margin of light quantity yet maintains a beam diameter for accomplishing a predetermined resolution for reading the bar code. The laser module 21 of the present invention has a beam diameter which is the same in both the vertical direction and the horizontal direction, so that beam is hardly intercepted by the aperture and so that a range in which an optimum beam diameter is maintained is expanded.

Figure 49A:
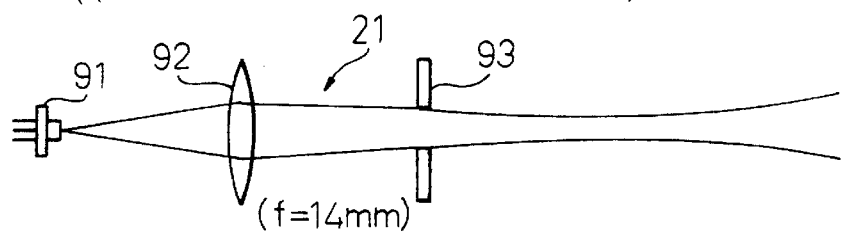
Figure 49B:
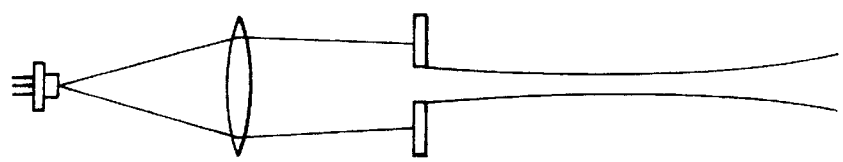

FIGS. 49A and 49B are diagrams explaining a problem that arises when use is made of a collimator lens 92 having a relatively large f-value and explaining a method of solution. In the case of the laser module 21 of FIGS. 49A and 49B, no problem arises concerning the shape of the beam in the lateral direction in which the beam diverges at a small angle, and the beam intercepted by the aperture 93 can still be utilized maintaining an ideal efficiency. In the vertical direction in which the beam diverges at a large angle, however, the beam is much intercepted by the aperture and the efficiency for utilizing the beam decreases though there is no problem concerning the shape of the beam.

This problem can be solved if the beam diameter in the vertical direction is decreased without decreasing the quantity of beam, so as to become nearly equal to the beam diameter in the horizontal direction.

Figure 50A:
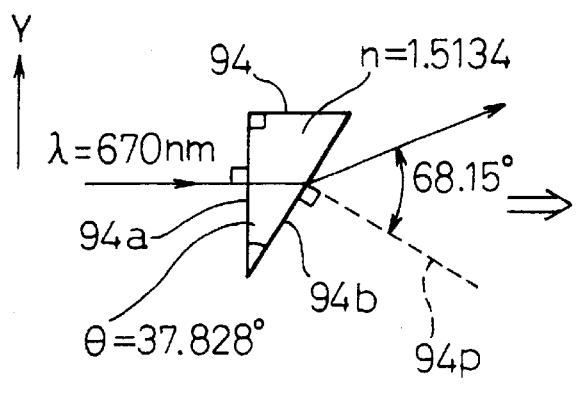
FIG. 50A is a diagram illustrating a principle for changing the beam diameter using the rectangular prism.
Figure 50B:
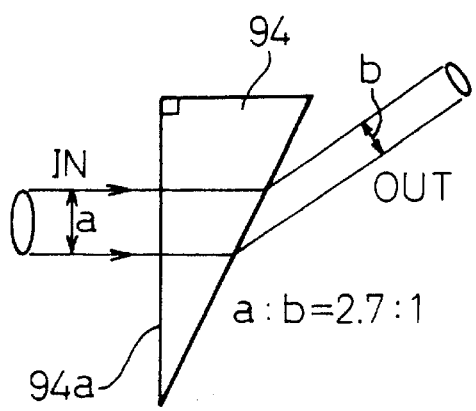
FIG. 50B is a diagram illustrating a change in the diameter of the laser beam that has passed through the rectangular prism.

FIGS. 50A and 50B are diagrams illustrating the principle of means for this solution. FIG. 50A illustrates a rectangular prism 94. When a laser beam is incident upon the rectangular prism 94 at a predetermined angle, the laser beam is refracted by the rectangular prism 94.

Here, the ratio of the laser beam emitted from the semiconductor laser 91 in the vertical direction to the laser beam emitted from the semiconductor laser 91 in the horizontal direction is equal to the ratio of their angles of divergence. When a particular value within the above-mentioned range of angles of divergence is used, the ratio of the angle of divergence in the vertical direction to the angle of divergence in the horizontal direction, i.e., the ratio of the beam diameters is 2.7 to 1. Here, therefore, the beam diameter in the vertical direction must be contracted at a ratio of 2.7 to 1. When the beam is refracted by the rectangular prism 94, the diameter of the beam emitted from the rectangular prism 94 is changed depending upon the angle of refraction. FIG. 50A illustrates an example where the beam diameter is contracted at the above-mentioned ratio of 2.7 to 1.

The wavelength of the laser beam emitted from the semiconductor laser is, for example, 670 nm. When a glass constituting the rectangular prism 94 has a refractive index n of 1.5134 and the rectangular prism 94 has an inner angle θ of 37.828°, the laser beam incident on a plane 94a of the rectangular prism 94 at right angles goes out at angle of 68.15° with respect to a perpendicular 94p to the oblique line 94b of the rectangular prism 94. Here, the Y-direction corresponds to the vertical direction of the laser beam. When the laser beam from the collimator lens 92 is incident perpendicularly upon the plane 94a of the rectangular prism 94, the ratio of the diameter of the beam incident on the rectangular prism 94 to the diameter of the laser beam going out from the rectangular prism 94 can be set to be 2.7 to 1 as shown in FIG. 50B.

The rectangular prism 94 does not work in the horizontal direction and the beam diameter does not change; i.e., the diameter of the beam emitted from the semiconductor laser 91 is maintained.

Figure 51A:
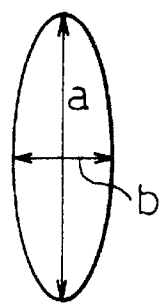
FIG. 51A is a diagram illustrating the diameter of the beam of before the beam is incident upon the rectangular prism.
Figure 51B:
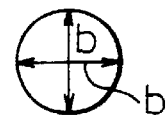
FIG. 51B is a diagram illustrating the diameter of the beam emitted from the rectangular prism of FIG. 50B.

FIG. 51A is a sectional view of the laser beam at a position IN in FIG. 50B. Referring to FIG. 50B, when the laser beam has a diameter a in the vertical direction and a diameter b in the horizontal direction at the position IN (a:b=2.7:1), the beam diameter in the vertical direction is contracted to 1/2.7 through the rectangular prism 94. At a position OUT, therefore, the laser beam has a diameter b in the vertical direction. Accordingly, the laser beam at the position OUT has a circular shape in cross section as shown in FIG. 51B.

FIG. 52 is a diagram illustrating the arrangement of the semiconductor laser 91, collimator lens 92, aperture 93 and rectangular prism 94. Thus, the beam diameter is contracted in the vertical direction by using the rectangular prism 94, and is set to be the same (or nearly the same) as the beam diameter in the horizontal direction, so that the laser beam is hardly intercepted by the aperture 93 thereby to enhance the efficiency of using the light.

FIGS. 53A and 53B illustrate the constitution for solving the problem inherent in the VLD module 21 which uses a collimator lens (f=3.6 mm) having a small f-value explained with reference to FIGS. 48A and 48B.

In the case of the VLD module 21 explained with reference to FIGS. 48A and 48B, no problem arises in the vertical direction but a problem arises in the horizontal direction in that the aperture 93 almost does not act and the beam is not shaped. In the case of FIGS. 53A and 53B, therefore, the beam diameter is expanded in the lateral direction.

When the beam diameter is expanded at a ratio of 1 to 2.7, the rectangular prism 94 which is used may be the same as the one explained with reference to FIGS. 50A and 50B. The difference from FIGS. 50A and 50B is with respect to the arrangement of the rectangular prism 94. In the case of FIGS. 53A and 53B, the laser beam is incident at an angle of 68.15° with respect to a perpendicular 94p to the oblique line 94b of the rectangular prism 94. Here, the direction of plane corresponds to the horizontal direction of the laser beam. This enables the beam diameter to be expended to 2.7 times as great in the horizontal direction.

FIG. 54A is a diagram illustrating in cross section the laser beam at the position IN of FIG. 53B. Referring to FIG. 53B, when the laser beam has a diameter a in the vertical direction and a beam diameter b in the horizontal direction at the position IN (a:b=1:2.7), the beam diameter in the vertical direction is expanded to 2.7 times as great through the rectangular prism 94. Therefore, the diameter of the laser beam in the vertical direction becomes b at the position OUT. As shown in FIG. 54B, therefore, the laser beam at the position OUT has a circular shape in cross section.

Figure 55:
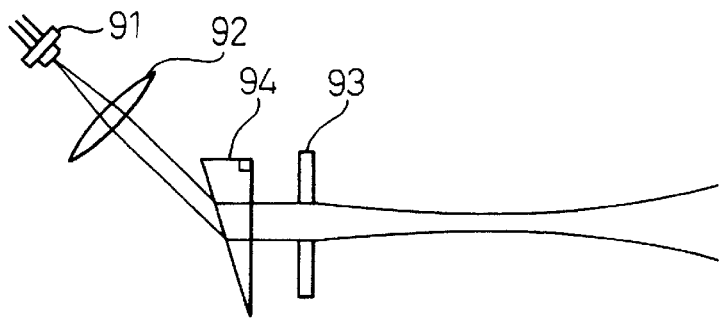
FIG. 55 is a diagram illustrating the constitution of the laser module using the rectangular prism and a change in the diameter of the laser beam.

FIG. 55 is a diagram illustrating a state where there are arranged the rectangular prism 94, semiconductor laser 91, collimator lens 92 and aperture 93 of FIGS. 53A and 53B. By using the rectangular prism 94 as shown in FIG. 55, the beam diameter can be expanded in the horizontal direction so that the beam incident on the aperture 93 will have the same diameter in the horizontal direction and in the vertical direction.

Here, various problems arise in that the laser beam emitted from the rectangular prism 94 and arriving at the aperture 93 becomes too great or too small depending upon the tolerance of angle of the rectangular prism 94 and the positional relationship with respect to the VLD module 21.

Figure 56A:
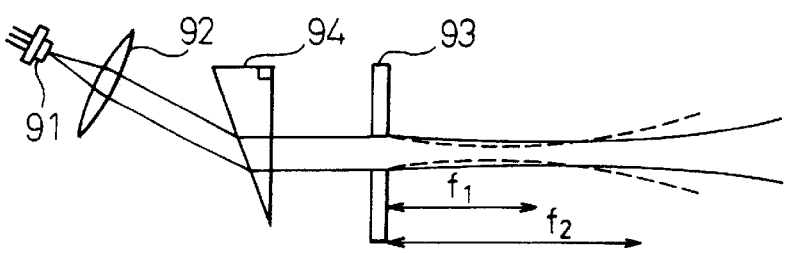
FIG. 56A is a diagram illustrating a problem arising when a beam incident upon the rectangular prism is not a parallel beam.

FIG. 56A is a diagram explaining this problem. When, for example, the beam incident on the rectangular prism 94 is not a parallel beam, the position where the laser beam is focused is determined depending upon the distance between the semiconductor laser 91 and the collimator lens 92, and the initial focal position f1 may extend as represented by a focal position f2.

Figure 56B:
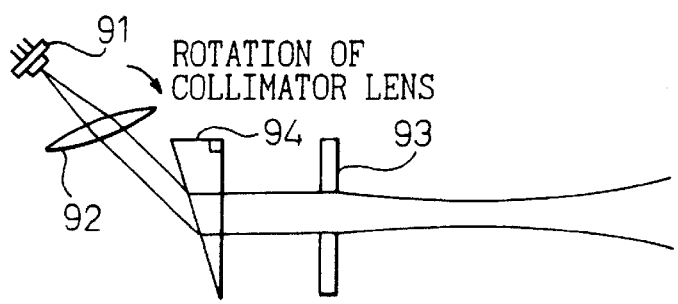
FIG. 56B is a diagram illustrating an example where the collimator lens is turned to solve the problem of FIG. 56A.

This problem can be solved by turning, as shown in FIG. 56B, the collimator lens 92 with the optical axis thereof as a center in a direction in which the beam is changed by the rectangular prism 94. That is, by turning the collimator lens 92, the diameter of the beam arriving at the rectangular prism 94 can be decreased depending upon the inclination of the collimator lens 92.

Therefore, even when the rectangular prism 94 is secured to the VLD module 21 by such means as adhesion and cannot be adjusted, expansion in the diameter of the laser beam arriving at the aperture 93 can be canceled by contracting the diameter of the laser beam arriving at the rectangular prism 94 by adjusting the angle of the collimator lens 92.

This method can be applied even when the initial focal distance tends to be shortened. That is, contraction in the diameter of the laser beam arriving at the aperture 93 can be canceled by expanding the diameter of the laser beam arriving at the rectangular prism 94 by adjusting the angle of the collimator lens 92.

Figure 57:
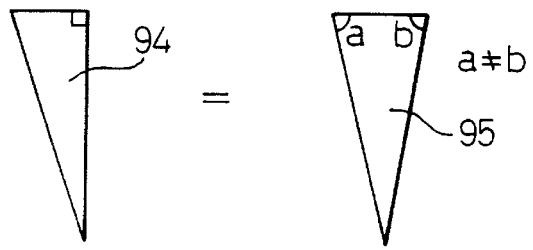
FIG. 57 is a diagram illustrating a prism that can be used for a bar code reader of the present invention to substitute for the rectangular prism.

The foregoing description has employed the rectangular prism 94. This is because the rectangular prism 94 makes it possible to minimize the vertical angle of the prism and, hence, to decrease the size of the VLD module 21 as a whole. In particular, when there is no need to decrease the size of the VLD module 21, it is allowable to use a prism 95 which is not right angled as shown in FIG. 57. In the case of the prism 95 of FIG. 57, the angles a and b are different.

Figure 58A:
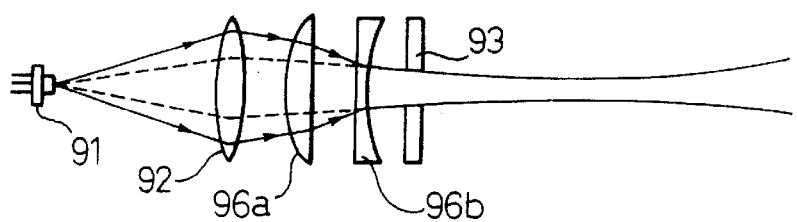
Figure 58B:
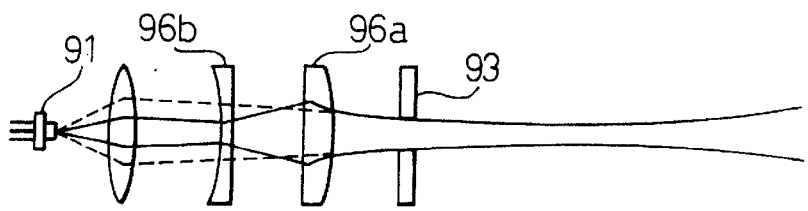
Figure 58C:
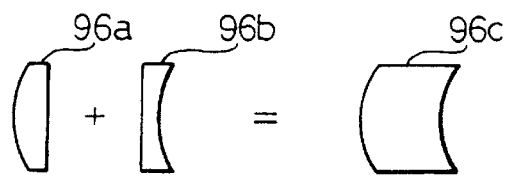

FIGS. 58A to 58C illustrate examples of changing the beam diameter by using means other than the prism. Here, cylindrical lenses 96a, 96b are used. The cylindrical lens exhibits the focusing action concerning one axis only between the two axes intersecting at right angles and can, hence, be adapted for contracting or expanding the diameter of the laser beam in either the vertical direction or the horizontal direction.

FIG. 58A is a diagram illustrating means for contracting the beam diameter in the vertical direction. In FIG. 58A, a cylindrical convex lens 96a and a cylindrical concave lens 96b are used in combination. The lenses are arranged in the order of collimator lens 92, cylindrical convex lens 96a and cylindrical concave lens 96b starting from the side closer to the semiconductor laser 91.

When the cylindrical convex lens 96a only is arranged adjacent the collimator lens 92, the laser beam squeezed by the collimator lens 92 is further squeezed in the vertical direction only through the cylindrical convex lens 96a. The laser beam is squeezed in the horizontal direction by the collimator lens 92 only but is squeezed in the vertical direction by both the collimator lens 92 and the cylindrical convex lens 96a. Compared to the beam of the horizontal direction which does not receive the action of the cylindrical convex lens 96a, therefore, the laser beam emitted in the vertical direction forms an image at a short distance. In this state, the beam diameter incident on the aperture 93 becomes smaller than that of the beam in the horizontal direction, giving rise to the occurrence of a problem in that the beam emitted to the readable area loses its shape.

As a means for correcting the shape of the beam, the cylindrical concave lens 96b is provided in a subsequent stage of the cylindrical convex lens 96a. The cylindrical concave lens 96b decreases the degree of squeeze of the cylindrical convex lens 96a. In FIG. 58A, the beam in the horizontal direction is indicated by broken lines. Due to the actions of the cylindrical convex lens 96a and cylindrical concave lens 96b as shown in FIG. 58A, the beam incident on the aperture 93 has nearly the same diameter in both the horizontal direction and the vertical direction.

FIG. 58B is a diagram illustrating means for expanding the beam diameter in the vertical direction. In the case of FIG. 58B, the laser beam emitted from the semiconductor laser 91 passes through the collimator lens 92, cylindrical concave lens 96b and cylindrical convex lens 96a in the order mentioned, and is incident upon the aperture 93. In FIG. 58, the solid lines represent the beam in the horizontal direction and dotted lines represent the beam in the vertical direction.

The beam of the horizontal direction squeezed by the collimator lens 92 is expanded into a predetermined magnification through the cylindrical concave lens 96b. On the other hand, the beam in the vertical direction does not receive the action of the cylindrical concave lens 96b and can be more squeezed than the beam in the horizontal direction.

Here, the beam in the horizontal direction is expanded by the cylindrical concave lens 96b but the beam in the vertical direction does not receive the action of the cylindrical concave lens 96b. Therefore, the beam in the horizontal direction forms an image at a position at an increased distance. When the cylindrical concave lens 96b only is disposed in the subsequent stage of the collimator lens 92, therefore, the beam of the horizontal direction emitted to the readable area may lose its shape.

To cope with this in the case of FIG. 58B, the cylindrical convex lens 96a is inserted in the subsequent stage of the cylindrical concave lens 96b to correct the beam. By suppressing the degree of expansion of the beam in the horizontal direction or by focusing the beam in the horizontal direction through the cylindrical convex lens 96a, the degree of converging the beam can be set to be nearly the same in both the horizontal direction and the vertical direction.

In FIGS. 58A and 58B, use is made of two concave and convex cylindrical lenses 96a and 96b. As shown in FIG. 58C, however, it is also possible to use a cylindrical double-sided lens 96c like the one obtained by sticking two concave and convex cylindrical lenses 96a and 96b together. In this case, however, the distance becomes zero between the two lenses 96a and 96b, and the beam is converted within the same medium. It therefore becomes necessary to form a lens surface having a radius of curvature which is smaller when the two cylindrical lenses 96a and 96b are used.

Figure 59:
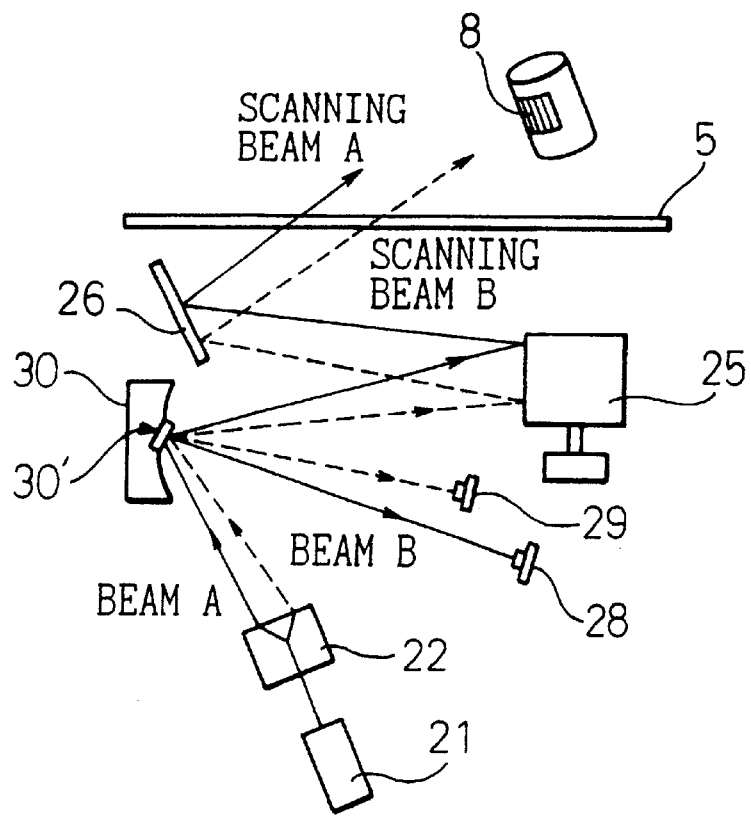
FIG. 59 is a diagram illustrating the constitution of an optical system of the bar code reader for generating two scanning beams by splitting the laser beam.

FIG. 59 illustrates a means in which the laser beam emitted from the VLD module 21 is split to generate dissimilar scanning beams A and B.

The laser beam emitted from the VLD module 21 is split into two beams A and B through a beam-splitting means (half-mirror in the aforementioned embodiment) 22. The two beams A and B are reflected by a small reflection mirror 30' provided at the center of the concave mirror 30 toward the polygon mirror 25. The laser beams reflected by the polygon mirror 25 are reflected by the first mirror system 26 and are emitted through the bottom window 5, one beam serving as a scanning beam A and the other beam serving as a scanning beam B.

The beams reflected by the bar code 8 are further reflected by the polygon mirror 25 to fall on the concave mirror 30. The reflected beam corresponding to the scanning beam A falls on the first light detector 28 being reflected by the concave mirror 30, and the reflected beam corresponding to the scanning beam B falls on the second light detector 29 being reflected by the concave mirror 30.

Figure 60A:
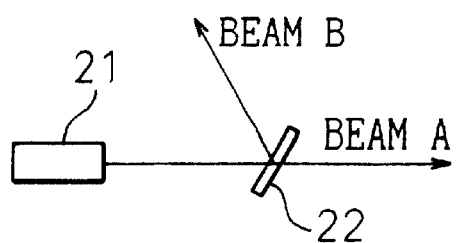
FIG. 60A is a diagram illustrating a beam-splitting means.
Figure 60B:
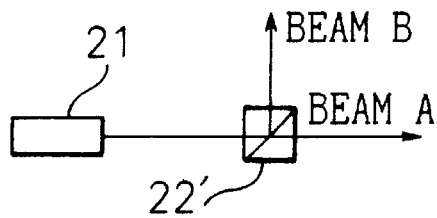
FIG. 60B is a diagram illustrating another beam-splitting means.

FIGS. 60A and 60B illustrate examples of beam-splitting means. In FIG. 60A, the laser beam emitted from the VLD module 21 is split into a beam A and a beam B by a half-mirror 22. In FIG. 60B, the laser beam emitted from the VLD module 21 is split into a beam A and a beam B by a half-cube (or PBS) 22'.

Figure 61A:
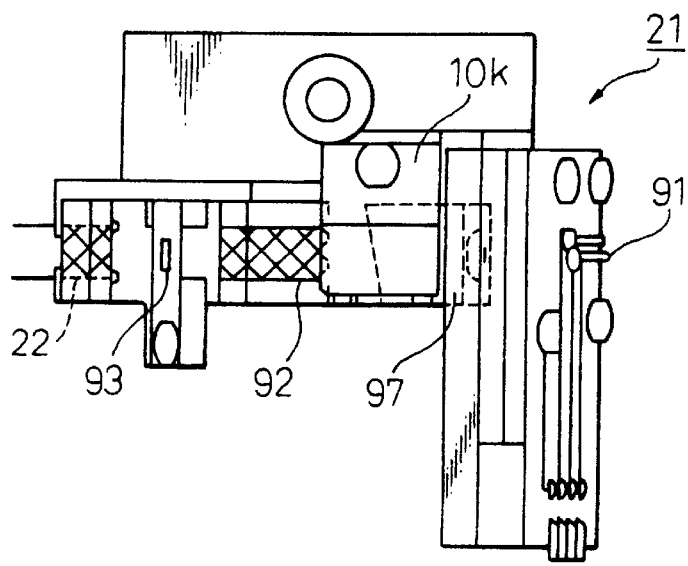
FIG. 61A is a plan view of the VLD module of the present invention incorporating prism, half-mirror, collimator lens, etc.
Figure 61B:
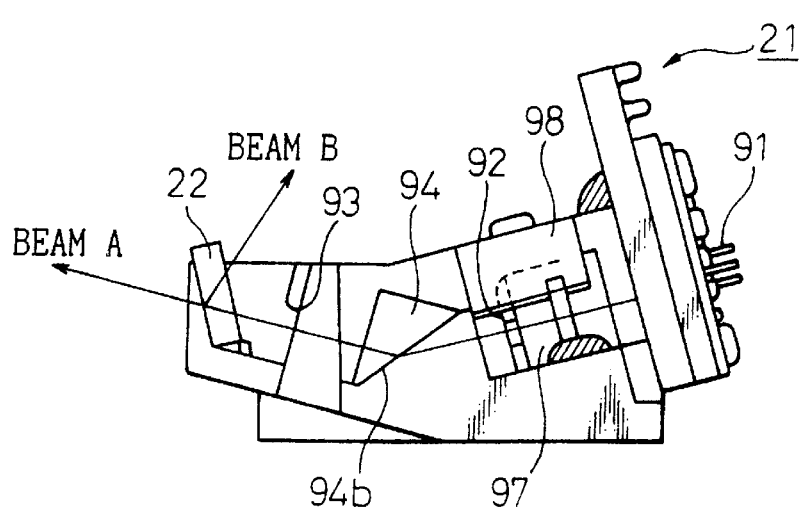
FIG. 61B is a side view of the VLD module of FIG. 61A.

FIGS. 61A and 61B are diagrams of the VLD module 21 of the present invention incorporating these prism, splitting means, collimator lens, etc. In FIGS. 61A and 61B, reference numeral 91 denotes a semiconductor laser, and 92 denotes a collimator lens. The collimator lens 92 is contained in a block 97 made of, for example, aluminum. The block 97 can be adjusted for its position in the right-and-left direction, and the position of focal point of the laser beam is adjusted by the block 97. The block 97 is urged from the upper direction by a resilient urging plate 98, so that its position is secured.

Reference numeral 94 denotes a rectangular prism, and a laser beam emitted from the semiconductor laser 91 is incident on the rectangular prism 94 through the oblique line 94b of the rectangular prism 94. The laser beam refracted by the rectangular prism 94 is shaped through the aperture 93 and is split into a beam A and a beam B by the half-mirror 22.

As shown in FIG. 3, the beam A is projected onto the polygon mirror 25 through the hole 31 formed in the concave mirror 30. On the other hand, the beam B is projected onto the reflection mirror 23.

Figure 62A:
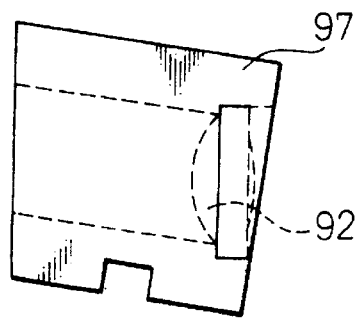
FIG. 62A is a plan view of a block for holding the collimator lens.
Figure 62B:
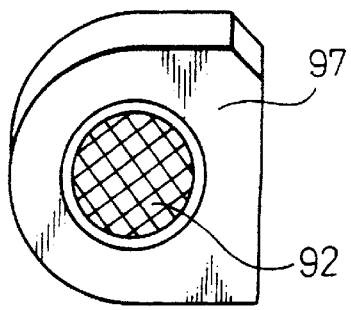
FIG. 62B is a front view of the block for holding the collimator lens.

FIG. 62A is a diagram viewing the block 97 containing the collimator lens 92 from the upper side, and FIG. 62B is a diagram viewing the block 97 containing the collimator lens 92 from the front side.

The collimator lens 92 is mounted on the block 97 being inclined by a predetermined angle with respect to the optical axis of the laser beam. The semiconductor laser 91 exhibits different angles of divergence depending upon the vertical direction and the horizontal direction, and further exhibits astigmatism. This is a phenomenon in which the position for emitting the beam in the horizontal direction and the position for emitting the beam in the vertical direction are deviated from each other, arousing a problem in that the focal position of the laser beam is deviated.

In order to solve the problem of astigmatism or the problem of FIGS. 56A and 56B, the collimator lens 92 according to the present invention is mounted being tilted by a predetermined angle with respect to the optical axis. The angle for mounting the collimator lens 92 may be determined in advance depending upon a variety of conditions. Though each semiconductor laser 91 has its own characteristics, the angle for mounting the collimator lens 92 is hardly dependent upon the difference in the characteristics of the semiconductor laser 91. The effects can be exhibited to a considerable degree if an average angle is employed to cope with the semiconductor laser 91.

What is claimed is:

1. A bar code reader comprising:

a first reading window;

a second reading window disposed next to said first reading window and at a predetermined inclination angle with respect thereto;

a source of light for emitting an initial ray of light;

splitting means for splitting the initial ray of light into a first ray of light following a first optical path from the source of light and a second ray of light following a second optical path from the source of light;

rotary scanning means having a plurality of reflection planes in rotation about an axis of-rotation included in the specified plane, said rotary scanning means having the first and second rays of light incident thereupon from different respective directions and reflecting the first and second rays of light therefrom to form first and second scanning beams respectively following the first and second optical paths;

first and second reflecting means for guiding the second ray of light to said rotary scanning means;

first focusing means for focusing the first reflected scanning beam toward a first detector; and second focusing means for focusing the second reflected scanning beam toward a second detector, wherein the source of light, the splitting means, the rotary scanning means, the first and second reflecting means, the first focusing means, and the second focusing means have a co-planar arrangement with respect to a specified plane.

* * * * *

UNITED STATES PATENT AND TRADEMARK OFFICE
CERTIFICATE OF CORRECTION

PATENT NO.     : 6,728,015 B2
DATED          : April 27, 2004
INVENTOR(S)    : Masanori Ohkawa et al.

It is certified that error appears in the above-identified patent and that said Letters Patent is hereby corrected as shown below:

Column 34,
Line 33, change "of-rotation" to -- of rotation --.

Signed and Sealed this

Twenty-first Day of September, 2004

JON W. DUDAS
*Director of the United States Patent and Trademark Office*